United States Patent
Goto et al.

(10) Patent No.: US 9,109,129 B2
(45) Date of Patent: Aug. 18, 2015

(54) INKJET INK, INKJET RECORDING METHOD, AND INKJET RECORDING APPARATUS

(71) Applicants: Hiroshi Goto, Kanagawa (JP); Hidetoshi Fujii, Kanagawa (JP); Yuuki Yokohama, Kanagawa (JP)

(72) Inventors: Hiroshi Goto, Kanagawa (JP); Hidetoshi Fujii, Kanagawa (JP); Yuuki Yokohama, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/348,794

(22) PCT Filed: Oct. 12, 2012

(86) PCT No.: PCT/JP2012/077018
§ 371 (c)(1),
(2) Date: Mar. 31, 2014

(87) PCT Pub. No.: WO2013/054948
PCT Pub. Date: Apr. 18, 2013

(65) Prior Publication Data
US 2014/0240391 A1    Aug. 28, 2014

(30) Foreign Application Priority Data
Oct. 14, 2011    (JP) ................. 2011-226368

(51) Int. Cl.
*C09D 11/38* (2014.01)
*C09D 11/322* (2014.01)
(Continued)

(52) U.S. Cl.
CPC .............. *C09D 11/30* (2013.01); *C09D 11/322* (2013.01); *C09D 11/38* (2013.01); *B41M 5/52* (2013.01); *B41M 5/5218* (2013.01);
(Continued)

(58) Field of Classification Search
CPC ..... C09D 11/38; C09D 11/322; B41M 5/502; B41J 2/01
USPC ......... 106/31.43, 31.58, 31.75, 31.86; 347/20
See application file for complete search history.

(56) References Cited

U.S. PATENT DOCUMENTS

| | | | |
|---|---|---|---|
| 5,224,987 | A | 7/1993 | Matrick |
| 5,580,373 | A | 12/1996 | Lane et al. |

(Continued)

FOREIGN PATENT DOCUMENTS

| | | |
|---|---|---|
| JP | 2003-082269 | 3/2003 |
| JP | 2004-136458 | 5/2004 |

(Continued)

OTHER PUBLICATIONS

International Search Report Issued for counterpart International Patent Application No. PCT/JP2012/077018 dated Oct. 12, 2012.

(Continued)

*Primary Examiner* — Helene Klemanski
(74) *Attorney, Agent, or Firm* — Oblon, McClelland, Maier & Neustadt, L.L.P.

(57) ABSTRACT

An inkjet ink of the present invention including: water; an organic solvent; a surfactant; and a colorant, wherein the organic solvent comprises the following (1), (2) and (3): (1) at least one polyhydric alcohol having an equilibrium moisture content of 30% by mass or higher at a temperature of 23° C. and humidity of 80% RH; (2) an amide compound expressed by the Structural Formula (I); (3) a compound expressed by the Structural Formula (II); a compound expressed by the Structural Formula (III), or a compound represented by the General Formula (I), or any combination thereof.

15 Claims, 6 Drawing Sheets

(51) Int. Cl.
*C09D 11/30* (2014.01)
*B41M 5/52* (2006.01)

(52) U.S. Cl.
CPC .......... *B41M 5/5236* (2013.01); *B41M 5/5245* (2013.01); *B41M 5/5254* (2013.01)

(56) References Cited

U.S. PATENT DOCUMENTS

| | | | |
|---|---|---|---|
| 7,582,153 B2* | 9/2009 | Ishimaru et al. | 106/31.86 |
| 7,919,544 B2 | 4/2011 | Matsuyama et al. | |
| 7,922,317 B2* | 4/2011 | Nakazawa et al. | 347/101 |
| 8,100,504 B2 | 1/2012 | Yokohama et al. | |
| 8,109,622 B2 | 2/2012 | Goto et al. | |
| 8,242,201 B2 | 8/2012 | Goto et al. | |
| 8,596,776 B2* | 12/2013 | Fukuda | 347/100 |
| 8,721,034 B2* | 5/2014 | Yokohama et al. | 347/20 |
| 8,845,800 B2* | 9/2014 | Gotou et al. | 106/31.43 |
| 2004/0231556 A1 | 11/2004 | Shimomura et al. | |
| 2004/0232262 A1* | 11/2004 | Itoh et al. | 241/1 |
| 2007/0197685 A1 | 8/2007 | Aruga et al. | |
| 2007/0291071 A1 | 12/2007 | Nakazawa et al. | |
| 2008/0233363 A1 | 9/2008 | Goto | |
| 2009/0047431 A1 | 2/2009 | Hatada et al. | |
| 2010/0112219 A1 | 5/2010 | Yokohama et al. | |
| 2010/0196601 A1 | 8/2010 | Goto et al. | |
| 2010/0196602 A1 | 8/2010 | Koyano et al. | |
| 2010/0295891 A1 | 11/2010 | Goto et al. | |
| 2011/0057981 A1 | 3/2011 | Aruga et al. | |
| 2011/0102496 A1 | 5/2011 | Fukuda | |
| 2011/0164086 A1 | 7/2011 | Goto et al. | |
| 2011/0205288 A1 | 8/2011 | Matsuyama et al. | |
| 2011/0292114 A1* | 12/2011 | Sao et al. | 347/20 |
| 2011/0310166 A1 | 12/2011 | Namba et al. | |
| 2012/0098883 A1 | 4/2012 | Matsuyama et al. | |
| 2012/0207983 A1 | 8/2012 | Matsuyama et al. | |
| 2013/0002776 A1 | 1/2013 | Nagashima et al. | |
| 2013/0065028 A1* | 3/2013 | Fujii et al. | 347/20 |
| 2013/0113860 A1* | 5/2013 | Gotou et al. | 347/20 |
| 2013/0323474 A1* | 12/2013 | Gotou et al. | 428/195.1 |
| 2014/0002539 A1* | 1/2014 | Goto et al. | 106/31.75 |

FOREIGN PATENT DOCUMENTS

| | | |
|---|---|---|
| JP | 2007-246820 | 9/2007 |
| JP | 2008-018711 | 1/2008 |
| JP | 2009-052018 | 3/2009 |
| JP | 2009-287014 | 12/2009 |
| JP | 2010-168433 A | 8/2010 |
| JP | 2010-180332 | 8/2010 |
| JP | 2010-241866 | 10/2010 |
| JP | 2011-068838 | 4/2011 |
| JP | 2012-107210 | 6/2012 |
| JP | 2012-207202 | 10/2012 |
| WO | WO 2012/124790 A1 * | 9/2012 |

OTHER PUBLICATIONS

U.S. Appl. No. 13/205,837, filed Aug. 9, 2011.
Extended European Search Report dated Apr. 7, 2015, in European Patent Application No. 12839341.0.

* cited by examiner

INKJET INK, INKJET RECORDING METHOD, AND INKJET RECORDING APPARATUS

TECHNICAL FIELD

The present invention relates to an inkjet ink, an inkjet recording method and an inkjet recording apparatus.

BACKGROUND ART

An inkjet ink containing an aqueous pigment has various advantages when it is used for printing on plain paper, such as fewer occurrences of bleeding, high image density, and less occurrences of strike through.

In the case a deposition amount of the ink is large, such as printing photographs or diagrams, on plain paper, however, the printed plain paper tends to cause back curling. The back curling is a phenomenon that paper is warped to the opposite side to the side of the printed surface.

If the back curling of plain paper occurs just after printing, a transfer failure of the paper occurs in the inkjet printer (within the apparatus) during the paper conveying process. The conveyance of the paper is very difficult especially when the back curling of the paper occurs just after high speed printing or double-sided printing.

Therefore, it has been desired to develop an inkjet ink that gives no or less back curling when it is used with a large deposition amount thereof on plain paper, such as in printing photographs and drawings on plain paper.

Especially a high-speed inkjet printer equipped with a line-head has a higher need for such ink compared to a serial printer. As the known technique for suppressing curling of paper, there is a method for applying an alcohol solution to paper prior to recording with an ink, allowing the paper to be substantially dry in a recording position, and carrying out recording with the ink (see PTL 1). PTL 1 teaches that hydroxyl groups of the alcohol solution are bonded to hydroxyl groups present at bonding points of hydrogen bonds between cellulose fibers of paper to block water molecules in the ink with hydrophobic groups of the alcohol solution. However, this method does not give the effect when a large amount of an aqueous ink is ejected during high speed printing, and therefore it has not been able to prevent curing of paper immediately after printing.

Moreover, there is a recording method for ejecting an ink and a reaction solution that reacts with the ink, and in this method the reaction solution is ejected to land on an opposite surface of a recording medium to the surface where the ink is recorded, corresponding to the data identical to the data for recording the ink (see PTL 2). In accordance with this method, however, a configuration of a recording device for use is complex, and curling of printed paper cannot be prevented unless a reaction liquid formed of the substantially same formulation to that of the ink is ejected in the same or similar amount to that of the ink. Therefore, this method is economically disadvantageous. As a large amount of water is contained on both sides of paper when a solid image is printed on almost the entire area of the paper, the paper loses its stiffness, which makes it to difficult to convey the paper.

Furthermore, PTL 3 discloses an inkjet ink composition containing diglycerin or polyglycerin in combination with polyethylene glycol monoalkyl ether.

PTL 4 discloses an inkjet ink composition containing polyethylene glycol monomethyl ether.

This inkjet ink composition however does not exhibit any effect of preventing curling of paper when the aqueous ink is ejected in a large amount with high-speed printing. Therefore, the proposed inkjet ink composition does not satisfy the demands for preventing curling of paper just after being printed. Since the organic solvent contained in the inkjet ink composition has low equilibrium moisture content, moreover, the ink composition cannot secure ejection stability.

CITATION LIST

Patent Literature

PTL 1: Japanese Patent Application Laid-Open (JP-A) No. 2004-136458
PTL 2: JP-A No. 2008-18711
PTL 3: JP-A No. 2009-52018
PTL 4: JP-A No. 2009-287014

SUMMARY OF INVENTION

Technical Problem

An object of the present invention is to provide: an inkjet ink which is capable of reducing curling of plain paper immediately after printing, is excellent in image quality and response to high-speed printing on plain paper, is good in ejection stability and storage stability and is advantageous in drying property of general-purpose printing paper; an inkjet recording apparatus; and an inkjet recording method.

Solution to Problem

The present inventors conducted extensive studies to solve the above-described problems and have found that they can be solved by incorporating a specific compound as an ink ingredient into an inkjet ink containing at least water, an organic solvent, a surfactant and a colorant. The present invention has been completed on the basis of this finding.

That is, the above problems can be solved by the inkjet ink of the present invention having the below-described constitution.

An inkjet ink of the present invention contains:
water;
an organic solvent;
a surfactant; and
a colorant,
wherein the organic solvent contains at least one polyhydric alcohol having an equilibrium moisture content of 30% by mass or higher at a temperature of 23° C. and humidity of 80% RH and an amide compound expressed by the following Structural Formula (I), and the organic solvent contains a compound expressed by the following Structural Formula (II), a compound expressed by the following Structural Formula (III), or a compound represented by the following General Formula (I), or any combination thereof:

Structural Formula (I)

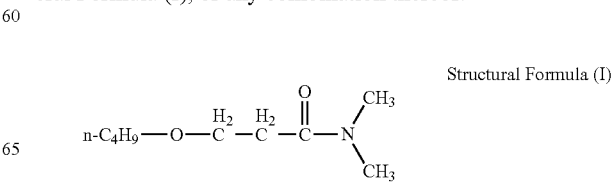

-continued

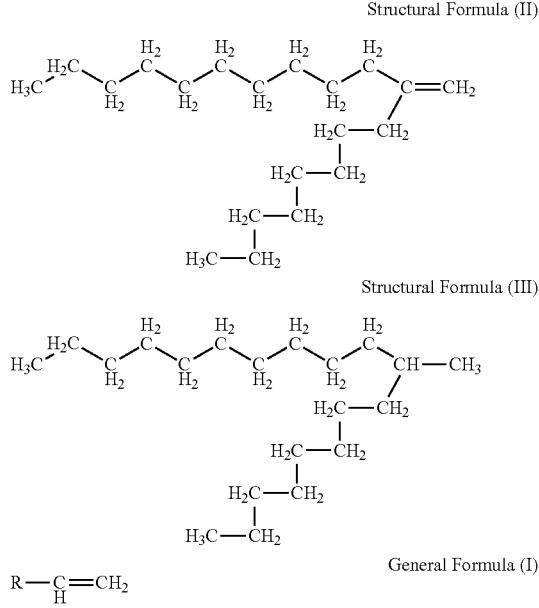

Structural Formula (II)

Structural Formula (III)

General Formula (I)

where in General Formula (I), R represents a C10-C18 alkyl group.

Advantageous Effects of Invention

The present invention can solve the above-described existing problems and can provide: an inkjet ink which is capable of reducing curling of plain paper immediately after printing, is excellent in image quality and response to high-speed printing on plain paper, is good in ejection stability and storage stability and is advantageous in drying property of general-purpose printing paper; and an inkjet recording apparatus and an inkjet recording method each using the ink.

BRIEF DESCRIPTION OF DRAWINGS

FIG. 6A depicts an elementary fibril, FIG. 6B depicts hydrogen bonds formed between two cellulose molecules, and FIG. 6C depicts hydrogen bonds formed between two cellulose molecules in the presence of water molecules therebetween.

DESCRIPTION OF EMBODIMENTS (Inkjet Ink)

An inkjet ink of the present invention contains at least water, an organic solvent, a surfactant and a colorant; and, if necessary, further contains a penetrant, a water-dispersible resin and other ingredients.

In the present invention, the organic solvent contains at least an amide compound expressed by the following Structural Formula (I) and at least one selected from the group consisting of a compound expressed by the following Structural Formula (II), a compound expressed by the following Structural Formula (III) and a compound represented by the following General Formula (I). The inkjet ink with this constitution can form a high-quality image while suppressing curling immediately after printing.

Structural Formula (I)

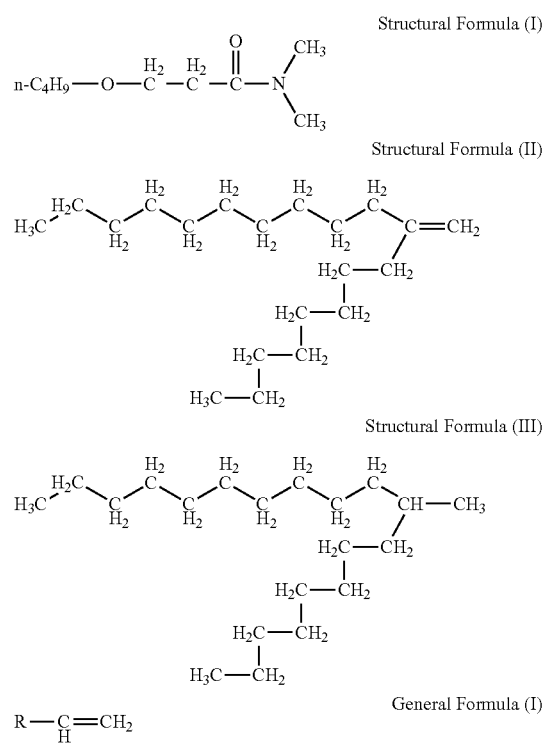

Structural Formula (II)

Structural Formula (III)

General Formula (I)

In General Formula (I), R represents a C10-C18 alkyl group.

The reason for this possibly lies in that such organic solvents as the amide compound expressed by the above Structural Formula (I), the compounds expressed by the above Structural Formulas (II) and (III), and the compounds represented by the above General Formula (I) hardly cleave hydrogen bonds between cellulose molecules even when entering the space therebetween.

Detail explanations for this will be given below. Regarding a balance between hydrophilicity and hydropobicity, the amide compound expressed by Structural Formula (I) lies on the hydrophobic side compared to the conventional organic solvents (e.g., glycerin, and butanediol) and has a low proportion of a hydrophilic group capable of forming a hydrogen bond within the molecule thereof. The compounds expressed by Structural Formulas (II) and (III) and the compound represented by General Formula (I) hardly dissolve in water and lie on the hydrophobic side relatively among organic solvents. Presumably, these solvents do not easily cleave hydrogen bonds between cellulose molecules even when entering the space between cellulose molecules. This model can be simply referred to as "low aggressiveness to hydrogen bonds between cellulose molecules."

As the aforementioned organic solvent of the hydrophobic side has a low surface tension, it primarily penetrates between cellulose molecules. The amide compound expressed by Structural Formula (I) is, as hydrogen bonds with water molecules of FIG. 6C mentioned below, forms a hydrogen bond between the amide group thereof and the hydroxyl group of a cellulose molecule to stay with the cellulose molecule part, and covers the hydrogen bond of the cellulose molecule with a hydrophobic group in the alkyl group part of the amide compound, to thereby inhibit a contact of the cellulose with water which is a volatile hydrophilic group-rich solvent. In this manner, presumably, the amide compound expressed by Structural Formula (I) makes cleavage of hydrogen bonds between cellulose molecules difficult. This model can be simply referred to as "properties for covering hydrogen bonds of cellulose molecules."

Figure 6A:
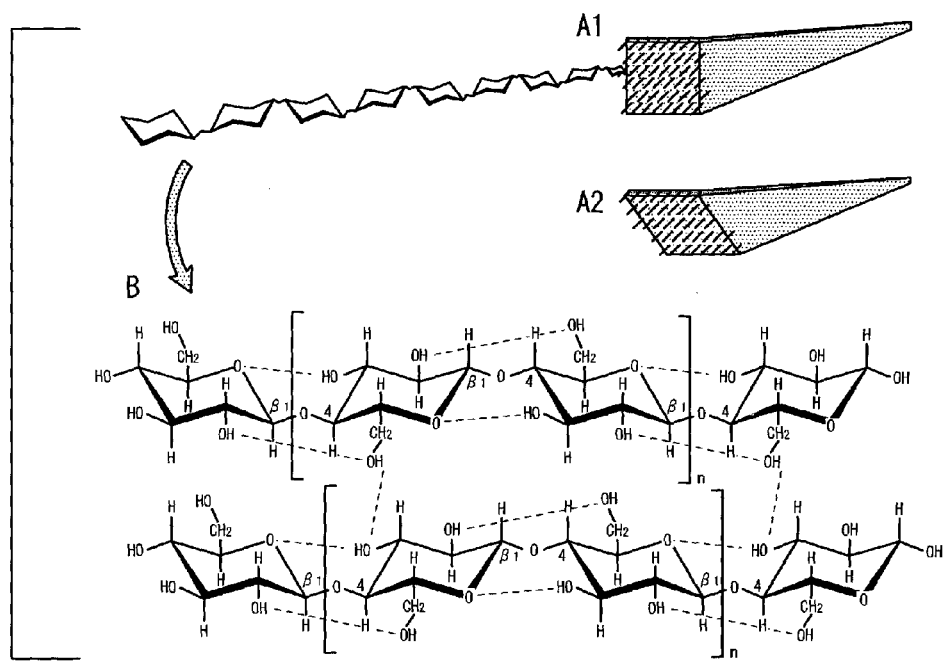
FIGS. 6A to 6C are views for explaining a difference in an effect to the interaction between cellulose molecules between water and a water-insoluble organic material containing a hydroxyl group, where
Figure 6B:
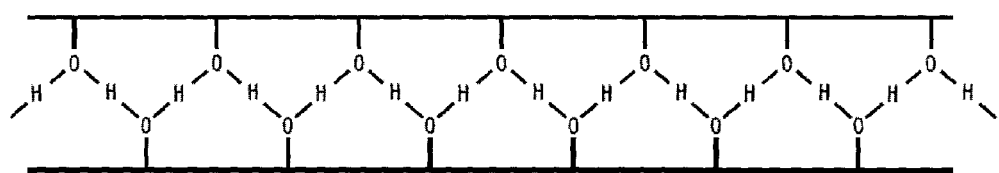
Figure 6C:
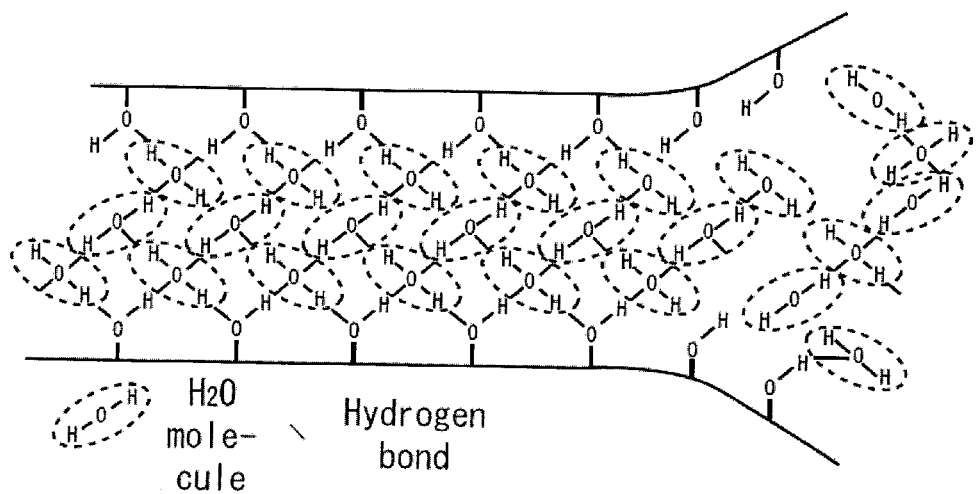

Since the compounds expressed by Structural Formulas (II) and (III) and General Formula (I) have no hydroxyl group or carbonyl group and do not involve hydrogen bonds between cellulose fibers, swelling does not occur unlike the case where water molecules are present between cellulose molecules as illustrated in FIG. 6C.

The compounds that cover hydrogen bonds of cellulose molecules and inhibit any contact with an aqueous continuous phase (e.g., alcohol, and water) are the amide compound expressed by Structural Formula (I), the compounds expressed by Structural Formulas (II) and (III) and the compound represented by General Formula (I). The organic solvent that is an auxiliary solvent to exhibit the aforementioned effect is, for example, alkyl alkane diol, or a glycol ether compound. Therefore, the ink containing these solvents as the organic solvents does not easily cause precipitation of the solids content thereof, solidification thereof, and reduction in fluidity thereof (i.e. the ink can maintain the ejection stability) even if water in the ink is evaporated.

Here, a difference in an effect to the interaction between cellulose molecules between water and a water-soluble organic material having a hydroxyl group is described with reference to FIGS. 6A to 6C.

A1 and A2 in FIG. 6A each schematically illustrate an elementary fibril. Also, B in FIG. 6A depicts the structures of cellulose molecules of one fibril.

A plant fiber is formed of a thread structure called a fibril, the fibril is formed of microfibrils each having a diameter of several nanometers to 20 nm, and length of 1 μm to several micrometers, and each microfibril is formed of a few to several tens elementary fibrils.

FIG. 6B is a schematic diagram illustrating a cellulose molecule. The elementary fibril is formed of several tens of lines in each of which cellulose molecules are aligned. Here, strong hydrogen bonds are formed between the adjacent cellulose molecules to form a bundle having a diameter of about 3 nm to about 4 nm.

FIG. 6C is a model diagram illustrating embodiments of hydrogen bonds formed between two cellulose molecules in the presence of water molecules therebetween. The dotted lines represent hydrogen bonds.

FIG. 6B illustrates a normal state of a hydrogen bond between cellulose molecules. FIG. 6C illustrates a state where water molecules are present in the hydrogen bonds between the cellulose molecules.

This phenomenon will be more specifically described hereinafter. Once the bonds between the cellulose molecules are cleaved as illustrated FIG. 6C when water permeates paper, fibers of paper loosen and are elongated (back curling phenomenon).

Then, if the water disappears due to drying or moving from there, the fibers shrink and the cleaved hydrogen bonds are rebonded.

In the course of rebonding the hydrogen bonds, however, pressure is not naturally applied to the paper unlike the time when the paper is produced, and the hydrogen bonds are formed in the free and loose state of the fibers in the drying process. Therefore, the paper forms a different form from the original form; i.e., causing face curling of the paper.

Here, the face curling is a phenomenon that the paper curls towards the surface on which images are formed or printed with the aqueous ink.

<Organic Solvent>

The object of the present invention can be achieved by the inkjet ink of the present invention containing: as organic solvents, one or more kinds of polyhydric alcohols each having an equilibrium moisture content of 30% by mass or higher at a temperature of 23° C. and humidity of 80% RH and an amide compound expressed by the following Structural Formula (I); and a compound expressed by the following Structural Formula (II), a compound expressed by the following Structural Formula (III), or a compound represented by the following General Formula (I), or any combination thereof.

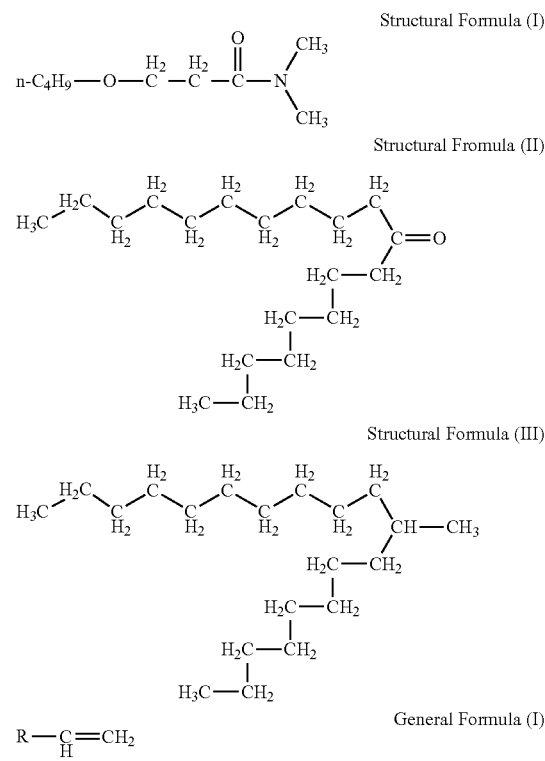

where in General Formula (I), R represents a C10-C18 alkyl group.

As described above, the amide compound expressed by Structural Formula (I) and the compounds expressed by Structural Formulas (II) and (III) and General Formula (I) are hydrophobic group rich in terms of a balance between hydrophilic groups and hydrophobic groups, and have within the molecule thereof low proportion of hydroxyl groups, which are hydrophilic groups, capable of forming hydrogen bonds. Therefore, presumably, these compounds do not easily cleave hydrogen bonds between cellulose molecules even when they permeate between cellulose molecules.

The amount of the amide compound expressed by Structural Formula (I) contained in the inkjet ink is not particularly limited and may be appropriately selected depending on the intended purpose, but is preferably 1% by mass to 50% by mass, more preferably 2% by mass to 40% by mass. When the amount thereof is smaller than 1% by mass, the resultant ink does not have an effect of suppressing curling of paper, an effect of improving image quality, or an effect of improving drying properties on general printing sheets. When the amount thereof is larger than 50% by mass, the resultant ink increases its viscosity, resulting in poor ejection stability of the ink.

Moreover, the amount of the compounds expressed by Structural Formulas (II) and (III) and General Formula (I) used in combination with the amide compound expressed by Structural Formula (I) is not particularly limited and may be appropriately selected depending on the intended purpose, but is preferably 1% by mass to 30% by mass, more preferably 2% by mass to 20% by mass. When the amount thereof is smaller than 1% by mass, the resultant ink does not have an effect of suppressing curling of paper, an effect of improving image quality, or an effect of improving drying properties on general printing sheets. When the amount thereof is larger than 30% by mass, the resultant ink increases its viscosity, resulting in poor ejection stability of the ink.

The following Table 1 gives the compound expressed by Structural Formulas (II) and (III) and exemplary compounds represented by General Formula (I).

hydrogen bonds between cellulose molecules" and "properties for covering hydrogen bonds of cellulose molecules."

Among them, 2-methyl-1,3-propanediol (bp: 214° C.), 3-methyl-1,3-butanediol (bp: 203° C.) and 3-methyl-1,5-pentanediol (bp: 250° C.) are preferable.

The amount of the alkyl alkane diol in the inkjet ink is not particularly limited and may be appropriately selected depending on the intended purpose, but is preferably 2% by mass to 40% by mass, more preferably 5% by mass to 30% by mass. When the amount thereof is smaller than 2% by mass, the resultant ink does not have an effect of suppressing curling of paper, an effect of improving image quality, or an effect of improving drying properties on general printing sheets. When the amount thereof is larger than 40% by mass, the resultant ink increases its viscosity, resulting in poor ejection stability of the ink.

The organic solvent used in combination with the amide compound expressed by Structural Formula (I), the compounds expressed by Structural Formulas (II) and (III) and General Formula (I) and a curling suppressing solvent such as an alkyl alkane diol includes an amide compound expressed by Structural Formula (IV).

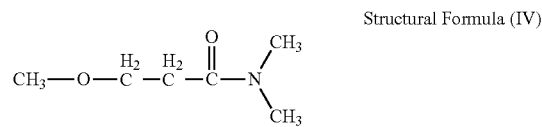

Structural Formula (IV)

The amide compound expressed Structural Formula (IV) has a high boiling point; i.e., 216° C., high equilibrium mois-

TABLE 1

| Formula | R | Compound name | Boiling point | Flash point | Product name | Manufacturer |
|---|---|---|---|---|---|---|
| (II) | — | 2-octyl-1-dodecene | 330° C. | 181° C. | LINEALENE DIMER A-20 | Idemitsu Kosan Co., Ltd. |
| (III) | — | 2-octyldodecane | 325° C. | 178° C. | LINEALENE DIMER A-20H | Idemitsu Kosan Co., Ltd. |
| General Formula (I) | $C_{10}$ | 1-dodecene | 215.8° C. | 87° C. | LINEALENE 12 | Idemitsu Kosan Co., Ltd. |
|  | $C_{12}$ | 1-tetradecene | 254.8° C. | 113° C. | LINEALENE 14 | Idemitsu Kosan Co., Ltd. |
|  | $C_{14}$ | 1-hexadecene | 289° C. | 135° C. | LINEALENE 16 | Idemitsu Kosan Co., Ltd. |
|  | $C_{16}$ | 1-octadecene | 319.2° C. | 159° C. | LINEALENE 18 | Idemitsu Kosan Co., Ltd. |
|  | $C_{18}$ | 1-eiococene | Freezing point: 25° C.-29° C. | — | — | Wako Pure Chemical Industries, Ltd. |

Furthermore, as for the organic solvent for auxiliary exhibiting an effect of suppressing curling, there is alkyl alkane diol. As long as the alkyl alkane diol has a main chain of C3-C6 alkane diol and a branched chain of C1-C2 alkyl, the balance between the hydrophilic groups and hydrophobic groups falls in the hydrophobic groups rich side, as well as alkyl alkane diol being water soluble, and thus it desirably exhibits the aforementioned models "low aggressiveness to ture content at a temperature of 23° C. and relative humidity of 80%; i.e., 39.2% by mass, and very low fluid viscosity at 25° C.; i.e., 1.48 mPa·s. Since the amide compound expressed by Structural Formula (I) and the compounds expressed by Structural Formulas (II) and (III) and General Formula (I) and the alkyl alkane diol are very easily dissolved in the organic solvent and water, the resultant inkjet ink can result in low viscosity. Therefore, these compounds are very preferable as the organic solvent for use in the inkjet ink. The inkjet ink containing the amide compound expressed by Structural Formula (IV) has a high equilibrium moisture content, and low viscosity, and thus it has desirable storage stability and ejection stability, as well as being a suitable ink used with a maintenance device of an inkjet device.

The amount of the amide compound expressed by Structural Formula (IV) contained in the inkjet ink is not particularly limited and may be appropriately selected depending on the intended purpose, but is preferably 1% by mass to 50% by mass, more preferably 2% by mass to 40% by mass. When the amount thereof is smaller than 1% by mass, the amide compound expressed by Structural Formula (IV) does not exhibit a sufficient effect of reducing the viscosity of the resultant ink, resulting in low ejection stability of the ink. When the amount thereof is larger than 50% by mass, the drying properties of the resultant ink on paper are not sufficient, which may cause formation of low character quality of a resultant image on plain paper.

Moreover, the organic solvent used in combination with the above organic solvent preferably contains at least one polyhydric alcohol having an equilibrium moisture content of 30% by mass or higher at a temperature of 23° C. and humidity of 80% RH.

Examples of the polyhydric alcohol include 1,2,3-butanetriol (bp: 175° C./33 hPa, equilibrium moisture content: 38% by mass), 1,2,4-butanetriol (bp: 190° C.-191° C./24 hPa, equilibrium moisture content: 41% by mass), glycerin (bp: 290° C., equilibrium moisture content: 49% by mass), diglycerin (bp: 270° C./20 hPa, equilibrium moisture content: 38% by mass) and triethylene glycol (bp: 285° C., equilibrium moisture content: 39% by mass), tetraethylene glycol (bp: 324° C.-330° C., equilibrium moisture content: 37% by mass), diethylene glycol (bp: 245° C., equilibrium moisture content: 43% by mass) and 1,3-butanediol (bp: 203° C.-204° C., equilibrium moisture content: 35% by mass).

Among them, glycerin and 1,3-butanediol are preferred.

The equilibrium moisture content in the present invention is an equilibrium moisture content measured using a potassium chloride/sodium chloride saturated aqueous solution and a desiccator in the following manner. The internal temperature of the desiccator is maintained at 23° C.±1° C. and the internal humidity thereof is maintained at 80% RH±3% RH. Then, 1 g of each organic solvent is weighed and placed on a dish, and the dish is placed in the desiccator and stored until there is no more change in mass of the sample, and an equilibrium moisture content of the sample can be determined by the following equation.

Equilibrium moisture content (%)=Amount of water absorbed into organic solvent/(Amount of organic solvent+Amount of water absorbed into organic solvent)×100

The amount of the polyhydric alcohol as the organic solvent contained in the inkjet ink is not particularly limited and may be appropriately selected depending on the intended purpose, but is preferably 5% by mass to 50% by mass, more preferably 10% by mass to 40% by mass. When the amount thereof is smaller than 5% by mass, the moisture retaining property cannot be secured whereby the ejection stability may degrade. When the amount thereof is larger than 50% by mass, the drying properties of the resultant ink on paper are not sufficient, which may cause formation of low character quality of a resultant image on plain paper.

The mass ratio between the colorant and the polyhydric alcohol largely affects ejection stability of the ink from a head, and also affects prevention of waste ink depositions in a maintenance device of an inkjet device.

When the solid content of the colorant is large considering a small amount of the polyhydric alcohol, evaporation of the moisture of the ink near the ink meniscus of nozzles proceeds, and as a result, ejection defects may be caused.

The amount of the organic solvent; e.g., the total amount of the amide compound expressed by Structural Formula (I), the compounds expressed by Structural Formulas (II) and (III) and General Formula (I), the alkyl alkane diol, the amide compound expressed by Structural Formula (IV) and the polyhydric alcohol, is not particularly limited and may be appropriately selected depending on the intended purpose, but is preferably 20% by mass to 80% by mass, more preferably 25% by mass to 70% by mass in the inkjet ink.

When the amount thereof is smaller than 20% by mass, the effect of suppressing curling cannot be exhibited, and it may adversely affect the ejection stability, and prevention of waste ink depositions in a maintenance device.

When the amount thereof is larger than 80% by mass, the viscosity of the resultant inkjet ink becomes very high, which may make it difficult to eject the ink from an inkjet device. In addition, drying properties of the resultant ink on paper may be impaired, which may degrade qualities of printed characters on plain paper.

Furthermore, the inkjet ink of the present invention causes less beading (nonuniformity of density), has superior drying properties and makes it possible to form high-quality images suitable for printing image quality, when general-purpose printing paper (a recording medium with low ink-absorbing ability, including a support, and a coating layer on at least one surface of the support, in which the amount of purified water transferred to a surface of the recording medium, which surface has the coating layer, at a contact period of 100 ms measured by a dynamic scanning absorptometer is 2 mL/m$^2$ to 35 mL/m$^2$ and the amount of purified water transferred to the surface of the recording medium, which surface has the coating layer, at a contact period of 400 ms measured by the dynamic scanning absorptometer is 3 mL/m$^2$ to 40 mL/m$^2$) is used.

An inkjet recording method of the present invention includes an ink jetting step of jetting the inkjet ink of the present invention on a recording medium to thereby form an image thereon, wherein the recording medium includes: a support; and a coating layer on at least one surface of the support and wherein the amount of purified water transferred to a surface of the recording medium, which surface has the coating layer, at a contact period of 100 ms measured by a dynamic scanning absorptometer is 2 mL/m$^2$ to 35 mL/m$^2$ and the amount of purified water transferred to the surface of the recording medium, which surface has the coating layer, at a contact period of 400 ms measured by the dynamic scanning absorptometer is 3 mL/m$^2$ to 40 mL/m$^2$. As a result, the inkjet recording method causes less beading (nonuniformity of density), has superior drying properties and makes it possible to form high-quality images suitable for printing image quality.

An ink cartridge for use in the present invention contains a container, and the inkjet ink of the present invention housed in the container. The ink cartridge is suitably used in printers of inkjet recording system. Use of the ink housed in the ink cartridge makes it possible to reduce the curling degree of plain paper just after printing, and to provide excellent images and excellent response to high speed printing on plain paper. Moreover, it can reduce beading (nonuniformity of density) of an image formed on printing gloss paper, and the ink has excellent drying properties as well as excellent ejection stability from a nozzle, to thereby realize image recording of the quality similar to that of vivid prints.

The inkjet recording method of the present invention includes at least an ink jetting step of applying stimuli (energy) to the inkjet ink of the present invention to make the inkjet ink jet to thereby form an image on a recording medium. In accordance with the inkjet recording method, stimuli (energy) is applied to the inkjet ink of the present invention, in the ink jetting step, to make the inkjet ink jet to form an image on a recording medium. Therefore, the inkjet recording method produces images of significantly improved color saturation, and excellent coloring ability even when the images are formed on plain paper. Furthermore, the inkjet recording method of the present invention can provide vivid images close to images of industrial prints, with less occurrences of beading (nonuniformity of density) on gloss printing paper, excellent drying properties, drying speed, and response to high-speed printing, and desirable ejection stability of the ink from a nozzle.

An inkjet recording apparatus of the present invention includes at least an ink jetting unit configured to apply stimuli (energy) to the inkjet ink of the present invention to make the inkjet ink jet to form an image on a recording medium. In the inkjet recording apparatus, the ink jetting unit applies stimuli (energy) to the inkjet ink of the present invention to make the inkjet ink jet to form an image on a recording medium. As a result, the formed image has significantly improved color saturation, and excellent coloring ability when the image is formed on plain paper. Furthermore, the inkjet recording apparatus can form vivid images close to images of industrial prints, with less occurrences of beading (nonuniformity of density) on gloss printing paper, excellent drying properties, drying speed, and response to high-speed printing, and desirable ejection stability of the ink from a nozzle.

<Colorant>

Particularly favorable embodiments in which the colorant is a pigment are exemplified by the following first to third embodiments.

(1) In a first embodiment, the colorant is a pigment containing at least one hydrophilic group on a surface thereof and exhibiting water dispersibility in the absence of a dispersant (hereinafter the pigment may also be referred to as "self-dispersible pigment").

(2) In a second embodiment, the colorant is a pigment dispersion containing a pigment, a pigment dispersant and a polymeric dispersion stabilizer, wherein the polymeric dispersion stabilizer is at least one selected from an α-olefin-maleic anhydride copolymer represented by the following General Formula (VI), a styrene-(meth)acrylic copolymer, a water-soluble polyurethane resin and a water-soluble polyester resin.

General Formula (VI)

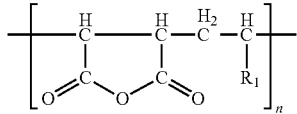

In General Formula (VI), $R_1$ represents an alkyl group having 6 to 30 carbon atoms, preferably 12 to 22 carbon atoms, still more preferably 18 to 22 carbon atoms, and "n" is an integer of 20 to 100.

(3) In a third embodiment, the colorant includes a polymer emulsion which is a polymer fine particle containing a water-insoluble or water-sparingly-soluble coloring material (the polymer emulsion is an aqueous dispersion of a polymer fine particle containing a coloring material).

The pigment may be an organic pigment or an inorganic pigment. Notably, a dye may also be contained at the same time for the purpose of adjusting color tone, provided that the addition of the dye does not degrade weatherability.

Examples of the inorganic pigment include titanium oxide, iron oxide, calcium carbonate, barium sulfate, aluminum hydroxide, barium yellow, cadmium red, chrome yellow and carbon black, with carbon black being particularly preferable. Examples of the carbon black include those produced by known methods such as the contact method, the furnace method and the thermal method.

Examples of the organic pigment include azo pigments, polycyclic pigments, dye chelates, nitro pigments, nitroso pigments and aniline black, with azo pigments and polycyclic pigments being preferable. Examples of the azo pigments include azo lakes, insoluble azo pigments, condensed azo pigments and chelate azo pigments. Examples of the polycyclic pigments include phthalocyanine pigments, perylene pigments, perinone pigments, anthraquinone pigments, quinacridone pigments, dioxazine pigments, indigo pigments, thioindigo pigments, isoindolinone pigments and quinophthalone pigments. Examples of the dye chelates include basic dye chelates and acid dye chelates.

The color of the colorant is not particularly limited and may be appropriately selected depending on the intended purpose. Examples of the colorant include those for black and those for color. These may be used alone or in combination.

Examples of the colorants for black include: carbon black (C. I. Pigment Black 7) such as furnace black, lamp black, acetylene black and channel black; metals such as copper, iron (C. I. Pigment Black 11) and titanium oxide; and organic pigments such as aniline black (C. I. Pigment Black 1).

Examples of the colorants for color include C. I. Pigment Yellow 1, 3, 12, 13, 14, 17, 24, 34, 35, 37, 42 (yellow iron oxide), 53, 55, 74, 81, 83, 95, 97, 98, 100, 101, 104, 408, 109, 110, 117, 120, 128, 138, 150, 151, 153 and 183; C. I. Pigment Orange 5, 13, 16, 17, 36, 43 and 51; C. I. Pigment Red 1, 2, 3, 5, 17, 22, 23, 31, 38, 48:2, 48:2 (Permanent Red 2B (Ca)), 48:3, 48:4, 49:1, 52:2, 53:1, 57:1 (Brilliant Carmine 6B), 60:1, 63:1, 63:2, 64:1, 81, 83, 88, 101 (red ochre), 104, 105, 106, 108 (cadmium red), 112, 114, 122 (quinacridone magenta), 123, 146, 149, 166, 168, 170, 172, 177, 178, 179, 185, 190, 193, 209 and 219; C. I. Pigment Violet 1 (rhodamine lake), 3, 5:1, 16, 19, 23 and 38; C. I. Pigment Blue 1, 2, 15 (phthalocyanine blue), 15:1, 15:2, 15:3 (phthalocyanine blue), 16, 17:1, 56, 60 and 63; and C. I. Pigment Green 1, 4, 7, 8, 10, 17, 18 and 36.

The self-dispersible pigment in the first embodiment has its surface modified such that at least one hydrophilic group is bonded to the surface directly or via other atomic group. The surface of the pigment is modified, for example, by chemically bonding a particular functional group (a functional group such as a sulfone group or a carboxyl group) to the surface or subjecting the surface to wet oxidation with the use of at least either a hypohalous acid or a salt thereof. In particular, a form in which a carboxyl group is bonded to the surface of the pigment and the pigment is dispersed in water is favorable. Thus, since the surface of the pigment is modified such that a carboxyl group is bonded thereto, not only does dispersion stability improve, but also high printing quality can be obtained and the water resistance of a recording medium after printing improves further.

Moreover, superior in redispersibility after dried, an ink containing the self-dispersible pigment in the first embodiment does not cause clogging even when there is a long hiatus in printing and an ink moisture content in the vicinity of an inkjet head nozzle evaporates, and thus the ink easily enables favorable printing with a simple cleaning operation.

The volume average particle diameter ($D_{50}$) of the self-dispersible pigment in the above inkjet ink is preferably 0.01 μm to 0.16 μm.

For instance, as self-dispersible carbon blacks, ones having ionic properties are favorable, with anionically charged ones and cationically charged ones being suitable.

Examples of anionic hydrophilic groups include —COOM, —SO$_3$M, —PO$_3$HM, —PO$_3$M$_2$, —SO$_2$NH$_2$ and —SO$_2$NHCOR (M denotes a hydrogen atom, an alkali metal, ammonium or an organic ammonium. R denotes an alkyl group having 1 to 12 carbon atoms, a phenyl group which may have a substituent, or a naphthyl group which may have a substituent). Among them, use of —COOM and —SO$_3$M, each of which is bonded to the surface of a color pigment, is preferable.

Examples of "M" in the hydrophilic groups include lithium, sodium and potassium as alkali metals. Examples of the organic ammonium include mono- to tri-methylammonium, mono- to tri-ethylammonium and mono- to tri-methanolammonium. Examples of methods for obtaining an anionically charged color pigment include a method of oxidizing a color pigment with sodium hypochlorite, a method utilizing sulfonation and a method of making the color pigment and diazonium salt react together, as methods of introducing —COONa onto the surface of the color pigment.

Preferable examples of cationic hydrophilic groups include quaternary ammonium groups, more preferably the quaternary ammonium groups shown below. In the present invention, it is desirable that any one of these groups be bonded to a carbon black surface to constitute a coloring material.

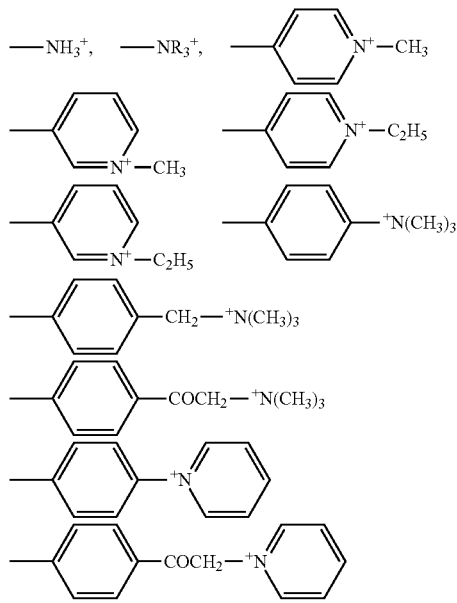

The method for producing a cationic self-dispersible carbon black to which any of the hydrophilic groups is bonded is not particularly limited and may be appropriately selected depending on the intended purpose. Examples of methods of bonding the N-ethylpyridyl group expressed by the following structural formula to carbon black include a method of treating the carbon black with 3-amino-N-ethylpyridinium bromide.

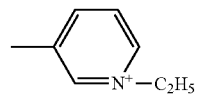

The hydrophilic groups may be bonded to the surface of the carbon black via other atomic groups. Examples of the other atomic groups include alkyl groups having 1 to 12 carbon atoms, phenyl groups which may have substituents, and naphthyl groups which may have substituents. Specific examples of the hydrophilic groups bonded via the other atomic groups to the surface of the carbon black include —C$_2$H$_4$COOM (M denotes an alkali metal or quaternary ammonium), -PhSO$_3$M (Ph denotes a phenyl group. M denotes an alkali metal or quaternary ammonium) and —C$_5$H$_{10}$NH$_3$+.

In the second embodiment, the colorant is a pigment dispersion containing: a pigment such as an inorganic pigment, an organic pigment or a complex pigment; a pigment dispersant; and a polymeric dispersion stabilizer, wherein the polymeric dispersion stabilizer is an α-olefin-maleic anhydride copolymer represented by the following General Formula (VI), a styrene-(meth)acrylic copolymer, a water-soluble polyurethane resin, or a water-soluble polyester resin, or any combination thereof.

General Formula (VI)

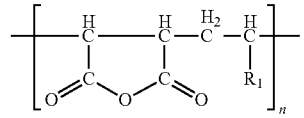

In General Formula (VI), $R_1$ represents an alkyl group having 6 to 30 carbon atoms, preferably 12 to 22 carbon atoms, still more preferably 18 to 22 carbon atoms, and "n" is an integer.

The copolymer represented by the above General Formula (VI) can be synthesized using as a starting material an olefin mixture containing olefins having different numbers of carbon atoms. In this case, the copolymer obtained is a copolymer where alkyl groups having different numbers of carbon atoms are randomly introduced as $R_1$ into the polymer chain. In the present invention, there can be used, as the α-olefin-maleic anhydride copolymer represented by General Formula (VI), not only an α-olefin-maleic anhydride copolymer where alkyl groups having the same number of carbon atoms are introduced as $R_1$ into the polymer chain, but also α-olefin-maleic anhydride copolymer where alkyl groups having different numbers of carbon atoms are randomly introduced as $R_1$ into the polymer chain as described above.

The polymeric dispersion stabilizer is a material which is effective in stabilizing the dispersed state of the pigment dispersoids finely dispersed in water in a uniform manner by the pigment dispersant. The polymeric dispersion stabilizer preferably has a molecular weight (weight average molecular weight) of 5,000 to 20,000. The α-olefin-maleic anhydride copolymer represented by General Formula (VI), the styrene-(meth)acrylic copolymer, the water-soluble polyurethane resin and the water-soluble polyester resin are solids at normal temperature and are hardly soluble in cold water.

However, when dissolved in an alkaline solution or an alkaline aqueous solution having a hydroxyl value that is equivalent to or greater than the acid value of the copolymers and the resins (preferably 1.0 to 1.5 times the acid value), the copolymers and the resins become effective as a dispersion stabilizer.

The copolymers and the resins can be easily dissolved in the alkaline solution or the alkaline aqueous solution by heating and stirring. When the olefin chain of the α-olefin-maleic anhydride copolymer is long, it is relatively difficult for them to dissolve, and so there may be insoluble matter left; nevertheless, they can be made effective as a polymeric dispersion stabilizer by removing the insoluble matter with an appropriate filter, for example.

Examples of the base in the alkaline solution or the alkaline aqueous solution include hydroxides of alkali metals, such as sodium hydroxide, potassium hydroxide and lithium hydroxide; basic substances such as ammonia, triethylamine and morpholine; and alcohol amines such as triethanolamine, diethanolamine, N-methyldiethanolamine, 2-amino-2-ethyl-1,3-propanediol and choline.

For the α-olefin-maleic anhydride copolymer represented by General Formula (VI), an appropriately synthesized compound may be used, or a commercially available product may be used. Examples of the commercially available product include T-YP112, T-YP115, T-YP114 and T-YP116 (all of which are produced by Seiko PMC Corporation).

For the styrene-(meth)acrylic copolymer, an appropriately synthesized compound may be used, or a commercially available product may be used. Examples of the commercially available product include JC-05 (produced by Seiko PMC Corporation); and ARUFON UC-3900, ARUFON UC-3910 and ARUFON UC-3920 (produced by Toagosei Co., Ltd.).

For the water-soluble polyurethane resin, an appropriately synthesized compound may be used, or a commercially available product may be used. Examples of the commercially available product include TAKELAC W-5025, TAKELAC W-6010 and TAKELAC W-5661 (produced by Mitsui Takeda Chemical Co.).

For the water-soluble polyester resin, an appropriately synthesized compound may be used, or a commercially available product may be used. Examples of the commercially available product include NICHIGO POLYESTER W-0030, NICHIGO POLYESTER W-0005S30WO and NICHIGO POLYESTER WR-961 (produced by Nippon Synthetic Chemical Industry Co., Ltd.); and PESRESIN A-210 and PESRESIN A-520 (produced by Takamatsu Oil & Fat Co., Ltd.).

The acid value of the polymeric dispersion stabilizer is not particularly limited and may be appropriately selected depending on the intended purpose, but is preferably 40 mgKOH/g to 400 mgKOH/g, more preferably 60 mgKOH/g to 350 mgKOH/g. When the acid value is less than 40 mgKOH/g, the dissolving ability of the alkaline solution may become poor. When it is greater than 400 mgKOH/g, the viscosity of the pigments becomes high, and thus ejection of ink may easily be degraded or the dispersion stability of the pigment dispersoids may easily decrease.

The mass average molecular weight of the polymeric dispersion stabilizer is not particularly limited and may be appropriately selected depending on the intended purpose, but is preferably 20,000 or less, more preferably 5,000 to 20,000. When the mass average molecular weight is less than 5,000, the dispersion stability of the pigment dispersoids may decrease. When it is greater than 20,000, the dissolving ability of the alkaline solution may become poor or there may be an increase in viscosity.

The amount of the polymeric dispersion stabilizer contained is not particularly limited and may be appropriately selected depending on the intended purpose, but is preferably 1 part by mass to 100 parts by mass (as the solid content equivalent), more preferably 5 parts by mass to 50 parts by mass, per 100 parts by mass of the pigment. When the amount is less than 1 part by mass, there may be no effect of dispersion stabilization. When it is greater than 100 parts by mass, the ink viscosity increases, and thus the ability of the ink to eject from a nozzle may easily be degraded or there may be economic inferiority —Pigment Dispersant—

In the second embodiment, it is desirable that the colorant contain a pigment dispersant. For the pigment dispersant, either an anionic surfactant or a nonionic surfactant having an HLB value of 10 to 20 is suitable.

Examples of the anionic surfactant include polyoxyethylene alkyl ether acetates, alkylbenzene sulfonates (e.g., $NH_4$, Na and Ca), alkyl diphenyl ether disulfonates (e.g., $NH_4$, Na and Ca), dialkylsuccinate sodium sulfonates, naphthalenesulfonic acid formalin condensate sodium salts, polyoxyethylene polycyclic phenylether sulfate salts (e.g., $NH_4$ and Na), laurates, polyoxyethylene alkyl ether sulfate salts and oleates. Among them, dioctylsulfosuccinate sodium salts and polyoxyethylene styrenephenylether sulfonate $NH_4$ salts are particularly preferable.

Examples of the nonionic surfactant having an HLB value of 10 to 20 include polyoxyethylene alkyl ethers, polyoxyalkylene alkyl ethers, polyoxyethylene polycyclic phenylethers, sorbitan fatty esters, polyoxyethylene sorbitan fatty acid esters, polyoxyethylene alkylphenyl ethers, polyoxyethylene alkylamines, polyoxyethylene alkylamides and acetylene glycol. Among them, polyoxyethylene lauryl ether, polyoxyethylene β-naphthylether, polyoxyethylene sorbitan monooleate and polyoxyethylene styrenephenylether are particularly preferable.

The amount of the pigment dispersant contained is not particularly limited and may be appropriately selected depending on the intended purpose, but is preferably 1 part by mass to 100 parts by mass, more preferably 10 parts by mass to 50 parts by mass, per 100 parts by mass of the pigment. When the amount of the pigment dispersant contained is small, the pigment cannot be sufficiently micronized. When it is too large, excessive dispersant components not adsorbed onto the pigments have an adverse effect on ink properties, thereby leading to image bleeding and degradation of water resistance and friction resistance.

The pigment dispersoids finely dispersed in water in a uniform manner by the pigment dispersant can be produced as follows: the pigment dispersant is dissolved in an aqueous medium; subsequently, the pigment is added for sufficient wetness, then the pigment dispersion is stirred at high speed by a homogenizer and dispersed by a dispersing device using a ball such as a bead mill or ball mill, a kneading and dispersing device utilizing shearing force such as a roll mill or an ultrasonic dispersing device.

It should be noted that after such a kneading and dispersing step, the pigment dispersion often includes coarse particles, which cause clogging of an inkjet nozzle and a supply path. Therefore, it is necessary to remove particles which are 1 μm or greater in diameter, using a filter or a centrifugal separator.

The average particle diameter ($D_{50}$) of the pigment dispersoids in the ink is not particularly limited and may be appropriately selected depending on the intended purpose, but is preferably 150 nm or less, more preferably 100 nm or less. When the average particle diameter ($D_{50}$) is greater than 150 nm, there is a dramatic decrease in ejection stability, and thus nozzle clogging and deviation of ink ejection are liable to arise. When the average particle diameter ($D_{50}$) is 100 nm or less, ejection stability improves, and image color saturation improves as well.

For the water-dispersible colorant of the third embodiment, use of a polymer emulsion in which polymer fine particles contain a pigment is favorable as well as use of any of the aforementioned pigments. The polymer emulsion in which polymer fine particles contain a pigment means either a polymer emulsion in which a pigment is encapsulated in polymer fine particles or a polymer emulsion in which a pigment is adsorbed onto surfaces of polymer fine particles. In this case, it is not that all of the pigment needs to be encapsulated or adsorbed but that the pigment may be dispersed in the emulsion to such an extent that the effects of the present invention are not impaired. Examples of the polymer constituting the polymer emulsion (the polymer of the polymer fine particles) include vinyl polymers, polyester polymers and polyurethane polymers. Among them, particular preference is given to vinyl polymers and polyester polymers, or more specifically, the polymers disclosed in JP-A Nos. 2000-53897 and 2001-139849.

In the third embodiment, complex pigments each composed of particles of a common organic or inorganic pigment covered with an organic pigment or carbon black can suitably be used. Such complex pigments can be obtained by, for example, extracting an organic pigment in the presence of particles of inorganic pigment particles or by a mechanochemical method in which inorganic pigment and organic pigment are mechanically mixed and pulverized. If necessary, a layer of organosilane compound composed of polysiloxane or alkylsilane can be provided in between a layer of an inorganic pigment and a layer of organic pigment to enhance the binding of the two layers.

Examples of the organic pigment include black pigments such as aniline black; and color pigments such as anthraquinone, phthalocyanine blue, phthalocyanine green, diazo, monoazo, pyranetron, perylene, heterocyclic yellow, quinacridone and (thio)indigoid. Among them, pigments of carbon black, phthalocyanine, quinacridone, monoazo yellow, disazo yellow and heterocyclic yellow are particularly preferable in terms of color-developing ability.

Examples of the phthalocyanine blue include copper phthalocyanine blue or derivatives thereof (C. I. Pigment Blue 15:3, 15:4) and aluminum phthalocyanine. Examples of the quinacridone include C.

I. Pigment Orange 48, C. I. Pigment Orange 49, C. I. Pigment Red 122, C. I. Pigment Red 192, C. I. Pigment Red 202, C. I. Pigment Red 206, C. I. Pigment Red 207, C. I. Pigment Red 209, C. I. Pigment Violet 19 and C. I. Pigment Violet 42. Examples of the monoazo yellow include C. I. Pigment Yellow 74, C. I. Pigment Yellow 109, C. I. Pigment Yellow 128 and C. I. Pigment Yellow 151. Examples of the disazo yellow include C. I. Pigment Yellow 14, C. I. Pigment Yellow 16, and C. I. Pigment Yellow 17. Examples of the heterocyclic yellow include C. I. Pigment Yellow 117 and C. I. Pigment Yellow 138. Other suitable pigments are found in The Color Index, the third edition (published by the Society of Dyers and Colourists, 1982).

Examples of the inorganic pigment include titanium dioxide, silica, alumina, iron oxide, iron hydroxide and tin oxide. In terms of the shape of those particles, a smaller aspect ratio is preferred, and the particles are most preferably spherical. When a coloring material is made to adhere to the surface, the color of the inorganic pigment is preferably transparent or white. When a black colorant is made to adhere to the surface, a black inorganic pigment may be used. The primary particle diameter of the particles of the inorganic pigment is preferably 100 nm or smaller, more preferably 5 nm to 50 nm.

The mass ratio of the particles of the inorganic pigment: either organic pigment (or a colorant) or carbon black as a coloring material is preferably in the range of 3:1 to 1:3, more preferably in the range of 3:2 to 1:2. When the amount of the coloring material is insufficient, the color-developing ability and coloring ability may be degraded. And when an excessive amount of the coloring material is contained, the transparency and color tone may be degraded.

Examples of such coloring particles each composed of an inorganic pigment particle covered with an organic pigment or carbon black include silica/carbon black complex material, silica/phthalocyanine PB (15:3) complex material, silica/disazo yellow complex material and silica/quinacridone PR122 complex material (all produced by Toda Kogyo Corporation). They are preferable because of their small average primary diameter.

When a particle of an inorganic pigment, having a primary particle diameter of 20 nm, is covered with an organic pigment whose amount is equal to the inorganic pigment particle, the obtained pigment particles have a primary particle diameter of about 25 nm. By using an appropriate dispersant to disperse the particles with the primary diameter, a fine pigment-dispersed ink composed of dispersed particles having a diameter of 25 nm can be prepared. In such complex pigment, not only the organic pigment provided on the surface but also the inorganic pigment covered with the thin organic pigment layer having a thickness of about 2.5 nm affects the dispersed state. Thus, it is important to select a pigment dispersant that can stably disperse both the organic and inorganic pigments at the same time.

The amount of the colorant contained in the inkjet ink is not particularly limited and may be appropriately selected depending on the intended purpose, but is preferably 2% by mass to 15% by mass, more preferably 3% by mass to 12% by mass, as a solid content. When the amount is less than 2% by mass, the color-developing ability of the ink and image density may decrease. When it is greater than 15% by mass, the ink thickens, and thus the ability of the ink to eject may degrade, which is unfavorable from an economical viewpoint as well.

<Surfactant>

For the surfactant, what is preferable is a surfactant which is low in surface tension and high in penetrability and leveling ability and does not impair dispersion stability regardless of the type of the colorant or the combination of the wetting agents. Examples of the surfactant include anionic surfactants, nonionic surfactants, silicone surfactants and fluorine-containing surfactants. These may be used alone or in combination. Among them, silicone surfactants and fluorine-containing surfactants are particularly preferable.

The fluorine-containing surfactants are not particularly limited and may be appropriately selected depending on the intended purpose. Preferable are fluorine-substituted compounds each having 2 to 16 carbon atoms, more preferable are fluorine-substituted compounds each having 4 to 16 carbon atoms. When the fluorine-substituted compound has less than two carbon atoms, the effects of the fluorine may not be obtained. When it has more than 16 carbon atoms, there may be problems with ink storage stability.

Examples of the fluorine-containing surfactants include perfluoroalkyl sulfonic acid compounds, perfluoroalkyl carboxylic acid compounds, perfluoroalkyl phosphoric acid ester compounds, perfluoroalkyl ethylene oxide adducts, and polyoxyalkylene ether polymer compounds having perfluoroalkylether groups in side chains thereof. Among them, polyoxyalkylene ether polymer compounds having perfluoroalkylether groups in side chains thereof are particularly preferable because they have low foaming properties.

Fluorine-containing surfactants represented by the following General Formula (VII) are further preferable,

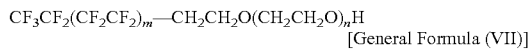
[General Formula (VII)]

In General Formula (VII), "m" denotes an integer of 0 to 10 and "n" denotes an integer of 1 to 40.

Examples of the perfluoroalkyl sulfonic acid compounds include perfluoroalkyl sulfonic acids and perfluoroalkyl sulfonates.

Examples of the perfluoroalkyl carboxylic acid compounds include perfluoroalkyl carboxylic acids and perfluoroalkyl carboxylates.

Examples of the perfluoroalkyl phosphoric acid ester compounds include perfluoroalkyl phosphoric acid esters and salts of perfluoroalkyl phosphoric acid esters.

Examples of the polyoxyalkylene ether polymer compounds having perfluoroalkylether groups in side chains thereof include polyoxyalkylene ether polymers having perfluoroalkylether groups in side chains thereof, sulfuric acid ester salts of polyoxyalkylene ether polymers having perfluoroalkylether groups in side chains thereof, and salts of polyoxyalkylene ether polymers having perfluoroalkylether groups in side chains thereof.

Examples of counter ions for salts in these fluorine-containing surfactants include Li, Na, K, $NH_4$, $NH_3CH_2CH_2OH$, $NH_2(CH_2CH_2OH)_2$ and $NH(CH_2CH_2OH)_3$.

For the fluorine-containing surfactants, suitably synthesized compounds may be used, or commercially available products may be used.

Examples of the commercially available products include SURFLON S-111, S-112, S-113, S-121, S-131, S-132, S-141 and S-145 (all of which are produced by Asahi Glass Co., Ltd.), FLUORAD FC-93, FC-95, FC-98, FC-129, FC-135, FC-170C, FC-430 and FC-431 (all of which are produced by Sumitomo 3M Limited), MEGAFAC F-470, F-1405 and F-474 (all of which are produced by Dainippon Ink And Chemicals, Incorporated), ZONYL TBS, FSP, FSA, FSN-100, FSN, FSO-100, FSO, FS-300 and UR (all of which are produced by E. I. du Pont de Nemours and Company), FT-110, FT-250, FT-251, FT-400S, FT-150 and FT-400SW (all of which are produced by Neos Company Limited), and POLYFOX PF-151N (produced by OMNOVA Solutions Inc.). Among them, FS-300 produced by E. I. du Pont de Nemours and Company, FT-110, FT-250, FT-251, FT-400S, FT-150 and FT-400SW produced by Neos Company Limited, and POLYFOX PF-151 N produced by OMNOVA Solutions Inc. are particularly preferable in that printing quality, particularly color-developing ability and uniform dying ability to paper, improves remarkably.

Specific examples of the fluorine-containing surfactants include compounds represented by the following General Formula (VIII).

(1) Anionic Fluorine-Containing Surfactant

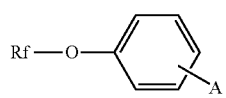
General Formula (VIII)

In General Formula (VIII), Rf denotes a mixture of fluorine-containing hydrophobic groups represented by the following General Formulas (IX) to (XI); and "A" denotes —$SO_3X$, —COOX or —$PO_3X$ (where X is a counter anion, specifically a hydrogen atom, Li, Na, K, $NH_4$, $NH_3CH_2CH_2OH$, $NH_2(CH_2CH_2OH)_2$ or $NH(CH_2CH_2OH)_3$).

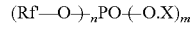
General Formula (XI)

In General Formula (XI), Rf denotes a fluorine-containing group represented by the following General Formula (XII), X denotes the same as defined above, "n" denotes an integer of 1 or 2 and "m" denotes 2–n.

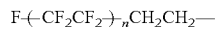
General Formula (XII)

In General Formula (XII), "n" denotes an integer of 3 to 10.

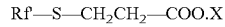
General Formula (XIII)

In General Formula (XIII), Rf and X denote the same as defined above.

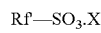
General Formula (XIV)

In General Formula (XIV), Rf and X denote the same as defined above.

(2) Nonionic Fluorine-Containing Surfactant

General Formula (XV)

In General Formula (XV), Rf denotes the same as defined above, and "n" denotes an integer of 5 to 20.

General Formula (XVI)

In General Formula (XVI), Rf' denotes the same as defined above, and "n" denotes an integer of 1 to 40.

(3) Ampholytic Fluorine-Containing Surfactant

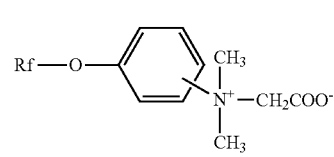
General Formula (XVII)

In General Formula (XVII), Rf denotes the same as defined above.

(4) Oligomer-Type Fluorine-Containing Surfactant

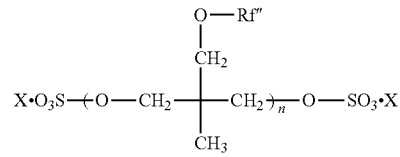
General Formula (XVIII)

In General Formula (XVIII), Rf' denotes a fluorine-containing group represented by the following General Formula (XIX), "n" denotes an integer of 0 to 10, and X denotes the same as defined above.

General Formula (XIX)

In General Formula (XIX), "n" denotes an integer of 1 to 4.

General Formula (XX)

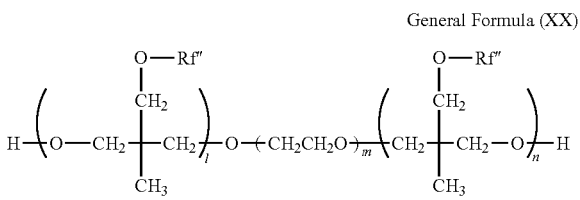

In General Formula (XX), Rf' denotes the same as defined above, "l" denotes an integer of 0 to 10, "m" denotes an integer of 0 to 10, and "n" denotes an integer of 0 to 10, with the proviso that "l" and "n" do not denote 0 at the same time.

The silicone surfactant is not particularly limited and may be appropriately selected depending on the intended purpose, with preference given to a compound which does not decompose even at high pH values. Examples thereof include side-chain-modified polydimethylsiloxane, both-end-modified polydimethylsiloxane, one-end-modified polydimethylsiloxane and side-chain-both-end-modified polydimethylsiloxane. Among them, polyether-modified silicone surfactants having polyoxyethylene groups or polyoxyethylenepolyoxypropylene groups as modifying groups are particularly preferable because they exhibit favorable properties as aqueous surfactants.

For such surfactants, appropriately synthesized compounds may be used, or commercially available products may be used.

The commercially available products can be easily obtained from BYK-Chemie, Shin-Etsu Chemical Co., Ltd. and Dow Corning Toray Co., Ltd., for instance.

General Formula (XXI)

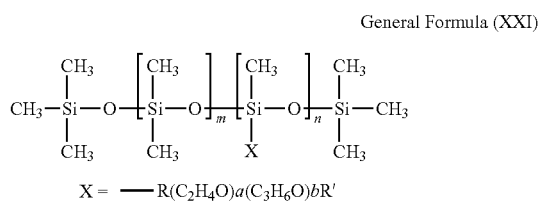

In General Formula (XXI), "m", "n", "a" and "b" each denote an integer, and R and R' each denote an alkyl group or an alkylene group.

For the polyether-modified silicone surfactants, commercially available products can be used. Examples thereof include KF-618, KF-642 and KF-643 (all of which are produced by Shin-Etsu Chemical Co., Ltd.).

Examples of the anionic surfactant include polyoxyethylene alkyl ether acetates, dodecylbenzene sulfonates, laurates, and salts of polyoxyethylene alkyl ether sulfates. Examples of the nonionic surfactant include polyoxyethylene alkyl ethers, polyoxypropylene polyoxyethylene alkyl ethers, polyoxyethylene alkyl esters, polyoxyethylene sorbitan fatty acid esters, polyoxyethylene alkylphenyl ethers, polyoxyethylene alkylamines and polyoxyethylene alkylamides.

The amount of any of the surfactants contained in the inkjet ink is not particularly limited and may be appropriately selected depending on the intended purpose. It is preferably 0.01% by mass to 3.0% by mass, more preferably 0.5% by mass to 2% by mass.

When the amount thereof is less than 0.01% by mass, the addition of the surfactant may be ineffective. When it is greater than 3.0% by mass, the ink has more penetrability to a recording medium than necessary, and thus image density may decrease or ink strike-through may arise.

<Water>

The water may be, for example, ultrapure water or pure water such as ion-exchange water, ultrafiltrated water, reverse osmosis water and distilled water.

The amount of the water contained in the inkjet ink is not particularly limited and may be appropriately selected depending on the intended purpose.

<Penetrant>

It is desirable for the inkjet ink of the present invention to contain, as a penetrant, a C8-C11 polyol compound, or a glycol ether compound, or both thereof. These compounds preferably have a solubility of 0.2% by mass to 5.0% by mass in water of 25° C. Among them, particularly preferable are 2-ethyl-1,3-hexanediol (solubility: 4.2% (25° C.)) and 2,2,4-trimethyl-1,3-pentanediol (solubility: 2.0% (25° C.)).

Other polyol compounds for the penetrant include aliphatic diols such as 2-ethyl-2-methyl-1,3-propanediol, 3,3-dimethyl-1,2-butanediol, 2,2-diethyl-1,3-propanediol, 2-methyl-2-propyl-1,3-propanediol, 2,4-dimethyl-2,4-pentanediol, 2,5-dimethyl-2,5-hexanediol and 5-hexene-1,2-diol.

As for other penetrants able to be additionally used, they are not particularly limited and may be appropriately selected depending on the intended purpose as long as they dissolve in the ink and can be adjusted to have desired properties. Examples thereof include alkyl and aryl ethers of polyhydric alcohols, such as diethylene glycol monophenyl ether, ethylene glycol monophenyl ether, ethylene glycol monoallylether, diethylene glycol monobutyl ether, propylene glycol monobutyl ether and tetraethylene glycol chlorophenyl ether; and lower alcohols such as ethanol.

The amount of the penetrant contained in the inkjet ink is not particularly limited and may be appropriately selected depending on the intended purpose, but is preferably 0.1% by mass to 4.0% by mass. When the amount thereof is less than 0.1% by mass, the ink does not have quick-drying properties and thus image bleeding may arise. When it is greater than 4.0% by mass, the dispersion stability of the colorant is impaired, and thus a nozzle becomes easily clogged; also, the ink has more penetrability to a recording medium than necessary, and thus image density may decrease or offset may arise.

<Water-dispersible Resin>

The water-dispersible resin is superior in film-forming property (image-forming property), has high water repellency, high water resistance and high weatherability and is useful for recording images with high water resistance and high density (high color-developing ability).

Examples of the water-dispersible resin include condensed synthetic resins, additional synthetic resins and natural polymer compounds.

Examples of the condensed synthetic resins include polyester resins, polyurethane resins, polyepoxy resins, polyamide resins, polyether resins, poly(meth)acrylic resins, acrylic-silicone resins and fluorine resins. Examples of the additional synthetic resins include polyolefin resins, polystyrene resins, polyvinyl alcohol resins, polyvinyl ester resins, polyacrylic resins and unsaturated carboxylic resins.

Examples of the natural polymer compounds include celluloses, rosins and natural rubbers.

These may be used alone or in combination.

Among them, polyurethane resin fine particles, acrylic-silicone resin fine particles and fluorine resin fine particles are particularly preferable. Also, the above-listed water-dispersible resins can be used in combination without any problems.

For the fluorine resins, fluorine resin fine particles having fluoroolefin units are preferable. Among them, fluorine-containing vinyl ether resin fine particles composed of fluoroolefin units and vinyl ether units are particularly preferable.

The fluoroolefin units are not particularly limited and may be appropriately selected depending on the intended purpose. Examples thereof include —$CF_2CF_2$—, —$CF_2CF(CF_3)$— and —$CF_2CFCl$—.

The vinyl ether units are not particularly limited and may be appropriately selected depending on the intended purpose. Examples thereof include compounds represented by the following structural formulae.

TABLE A (1) —$CH_2CH$— | $OCH_3$ (2) —$CH_2CH$— | $OC_2H_5$ (3) —$CH_2CH$— | $OC_3H_7$ (4) —$CH_2CH$— | $OC_4H_9$ (5) —$CH_2CH$— | $OC_5H_{11}$ (6) —$CH_2CH$— | $OCH_2OH$ (7) —$CH_2CH$— | $OC_2H_4OH$ (8) —$CH_2CH$— | $OC_3H_6OH$ (9) —$CH_2CH$— | $OC_4H_8OH$

(10) —$CH_2CH$— | $OC_5H_{10}OH$

(11) —$CH_2CH$— | $OCH_2COOH$

(12) —$CH_2CH$— | $OC_2H_4COOH$

(13) —$CH_2CH$— | $OC_3H_6COOH$

(14) —$CH_2CH$— | $OC_4H_8COOH$

(15) —$CH_2CH$— | $OC_5H_{10}COOH$

TABLE A-continued

(16) —$CHCH$— | $H_3C$ $OCH_3$

(17) —$CHCH$— | $H_3C$ $OC_2H_5$

(18) —$CHCH$— | $H_3C$ $OC_3H_7$

(19) —$CHCH$— | $H_3C$ $OC_4H_9$

(20) —$CHCH$— | $H_3C$ $OC_5H_{11}$

(21) —$CHCH$— | $H_3C$ $OCH_2OH$

(22) —$CHCH$— | $H_3C$ $OC_2H_4OH$

(23) —$CHCH$— | $H_3C$ $OC_3H_6OH$

(24) —$CHCH$— | $H_3C$ $OC_4H_8OH$

(25) —$CHCH$— | $H_3C$ $OC_5H_{10}OH$

(26) —$CHCH$— | $H_3C$ $OCH_2COOH$

(27) —$CHCH$— | $H_3C$ $OC_2H_4COOH$

(28) —$CHCH$— | $H_3C$ $OC_3H_6COOH$

(29) —$CHCH$— | $H_3C$ $OC_4H_8COOH$

(30) —$CHCH$— | $H_3C$ $OC_5H_{10}COOH$

For the fluorine-containing vinyl ether resin fine particles composed of fluoroolefin units and vinyl ether units, alternate copolymers are suitable in which the fluoroolefin units and the vinyl ether units are alternately copolymerized.

For such fluorine resin fine particles, appropriately synthesized compounds may be used, or commercially available products may be used. Examples of the commercially available products include FLUONATE FEM-500, FEM-600, DICGUARD F-52S, F-90, F-90M, F-90 N and AQUAFURAN TE-5A produced by Dainippon Ink And Chemicals, Incorporated; and LUMIFLON FE4300, FE4500, FE4400, ASAHIGUARD AG-7105, AG-950, AG-7600, AG-7000 and AG-1100 produced by Asahi Glass Co., Ltd.

The water-dispersible resin may be used as a homopolymer or may be subjected to copolymerization and used as a composite resin; and a single-phase emulsion, a core-shell emulsion or a power feed emulsion can be used therefor.

For the water-dispersible resin, what can be used is a resin in which the resin itself has a hydrophilic group and self-dispersibility, or a resin in which the resin itself does not have dispersibility, but a surfactant or a resin having a hydrophilic group gives dispersibility. Among such resins, ionomers of polyester resins and polyurethane resins, and emulsions of resin particles obtained by emulsion polymerization and suspension polymerization of unsaturated monomers are optimal. In the case of emulsion polymerization of an unsaturated monomer, since a resin emulsion is obtained by a reaction using water to which the unsaturated monomer, a polymerization initiator, a surfactant, a chain transfer agent, a chelator and a pH adjuster have been added, it is easily possible to obtain a water-dispersible resin and change the resinous structure, and thus desired properties can be easily created.

Examples of the unsaturated monomers include unsaturated carboxylic acids, monofunctional or multifunctional (meth)acrylic acid ester monomers, (meth)acrylic acid amide monomers, aromatic vinyl monomers, vinyl cyano compound monomers, vinyl monomers, allyl compound monomers, olefin monomers, diene monomers and oligomers having unsaturated carbon. These may be used alone or in combination. It is possible to improve properties flexibly by combining these monomers together, and it is also possible to improve the characteristics of the resin by producing polymerization reaction or graft reaction with the use of an oligomer-type polymerization initiator.

Examples of the unsaturated carboxylic acids include acrylic acid, methacrylic acid, itaconic acid, fumaric acid and maleic acid.

Examples of the monofunctional (meth)acrylic acid ester monomers include methyl methacrylate, ethyl methacrylate, isopropyl methacrylate, n-butyl methacrylate, isobutyl methacrylate, n-amyl methacrylate, isoamyl methacrylate, n-hexyl methacrylate, 2-ethylhexyl methacrylate, octyl methacrylate, decyl methacrylate, dodecyl methacrylate, octadecyl methacrylate, cyclohexyl methacrylate, phenyl methacrylate, benzyl methacrylate, glycidyl methacrylate, 2-hydroxyethyl methacrylate, 2-hydroxypropyl methacrylate, dimethylaminoethyl methacrylate, methacryloxyethyltrimethyl ammonium salts, 3-methacryloxypropyltrimethoxysilane, methyl acrylate, ethyl acrylate, isopropyl acrylate, n-butyl acrylate, isobutyl acrylate, n-amyl acrylate, isoamyl acrylate, n-hexyl acrylate, 2-ethylhexyl acrylate, octyl acrylate, decyl acrylate, dodecyl acrylate, octadecyl acrylate, cyclohexyl acrylate, phenyl acrylate, benzyl acrylate, glycidyl acrylate, 2-hydroxyethyl acrylate, 2-hydroxypropyl acrylate, dimethylaminoethyl acrylate and acryloxyethyltrimethyl ammonium salts.

Examples of the multifunctional (meth)acrylic acid ester monomers include ethylene glycol dimethacrylate, diethylene glycol dimethacrylate, triethylene glycol dimethacrylate, polyethylene glycol dimethacrylate, 1,3-butylene glycol dimethacrylate, 1,4-butylene glycol dimethacrylate, 1,6-hexanediol dimethacrylate, neopentyl glycol dimethacrylate, dipropylene glycol dimethacrylate, polypropylene glycol dimethacrylate, polybutylene glycol dimethacrylate, 2,2'-bis (4-methacryloxydiethoxyphenyl)propane, trimethylolpropane trimethacrylate, trimethylolethane trimethacrylate, polyethylene glycol diacrylate, triethylene glycol diacrylate, 1,3-butylene glycol diacrylate, 1,4-butylene glycol diacrylate, 1,6-hexanediol diacrylate, neopentyl glycol diacrylate, 1,9-nonanediol diacrylate, polypropylene glycol diacrylate, 2,2'-bis(4-acryloxypropyloxyphenyl)propane, 2,2'-bis(4-acryloxydiethoxyphenyl)propane trimethylolpropane triacrylate, trimethylolethane triacrylate, tetramethylolmethane triacrylate, ditrimethylol tetraacrylate, tetramethylolmethane tetraacrylate, pentaerythritol tetraacrylate and dipentaerythritol hexaacrylate.

Examples of the (meth)acrylic acid amide monomers include acrylamide, methacrylamide, N,N-dimethyl acrylamide, methylenebisacrylamide and 2-acrylamide-2-methylpropanesulfonic acid.

Examples of the aromatic vinyl monomers include styrene, α-methylstyrene, vinyltoluene, 4-t-butylstyrene, chlorostyrene, vinylanisole, vinylnaphthalene and divinylbenzene.

Examples of the vinyl cyano compound monomers include acrylonitrile and methacrylonitrile.

Examples of the vinyl monomers include vinyl acetate, vinylidene chloride, vinyl chloride, vinyl ether, vinyl ketone, vinylpyrrolidone, vinyl sulfonic acid or salts thereof, vinyltrimethoxysilane and vinyltriethoxysilane.

Examples of the allyl compound monomers include allyl sulfonic acid or salts thereof, allylamine, allyl chloride, diallylamine and diallyldimethylammonium salts.

Examples of the olefin monomers include ethylene and propylene.

Examples of the diene monomers include butadiene and chloroprene.

Examples of the oligomers having unsaturated carbon include styrene oligomers having methacryloyl groups, styrene-acrylonitrile oligomers having methacryloyl groups, methyl methacrylate oligomers having methacryloyl groups, dimethylsiloxane oligomers having methacryloyl groups, and polyester oligomers having acryloyl groups.

Since the water-dispersible resin has its molecular chains broken by dispersion destruction or hydrolysis under strongly alkaline or acidic conditions, the pH thereof is preferably 4 to 12, more preferably 6 to 11, even more preferably 7 to 9 especially in view of its miscibility with the water-dispersible colorant.

The average particle diameter ($D_{50}$) of the water-dispersible resin is related to the viscosity of dispersion liquid. As to water-dispersible resins having the same composition, the smaller the average particle diameter is, the greater the viscosity is in the case of the same solid content. In order to avoid excessively high ink viscosity when ink has been formed, it is desirable for the average particle diameter ($D_{50}$) of the water-dispersible resin to be 50 nm or greater.

Also, when the water-dispersible resin has a particle diameter that reaches up to several tens of micrometers, particles become larger in size than a nozzle orifice of the inkjet head, and thus the water-dispersible resin is impossible to use. When particles which are smaller in size than the nozzle orifice but still large in diameter are present in the ink, the ability of the ink to eject is degraded. Accordingly, in order to prevent the ink ejection ability from being impaired, it is desirable for the average particle diameter ($D_{50}$) to be 200 nm or less, more desirably 150 nm or less.

The water-dispersible resin preferably has a function of fixing the water-dispersible colorant onto paper and forms into a coating at normal temperature so as to enhance coloring material fixing properties. For that reason, the minimum film-forming temperature (MFT) of the water-dispersible resin is preferably 30° C. or lower. Also, when the water-dispersible resin has a glass transition temperature of −40° C. or lower, the resin coating becomes highly viscous, and so printed matter becomes tacky; therefore, the water-dispersible resin preferably has a glass transition temperature of −30° C. or higher.

The amount of the water-dispersible resin contained in the inkjet ink is not particularly limited and may be appropriately selected depending on the intended purpose, but is preferably 2% by mass to 30% by mass, more preferably 5% by mass to 25% by mass, as a solid content.

Here, the amounts of the colorant, pigment in the colorant, and the water-dispersible resin contained in the ink as solid contents can be measured, for example, by separating only the colorant and the water-dispersible resin from the ink. When a pigment is used as the colorant, it is possible to measure the ratio between the colorant and the water-dispersible resin by evaluating the mass decrease rate according to thermogravimetric analysis. Also, when the molecular structure of the colorant is obvious, it is possible in the case of pigment and dye to determine the amount of the colorant as a solid content by means of NMR, and it is possible in the case of inorganic pigment, gold-containing organic pigment and gold-containing dye contained in heavy-metal atoms and molecular skeletons to determine the amount of the colorant as a solid content by means of fluorescent X-ray analysis.

<Other Components>

The other components are not particularly limited and may be appropriately selected depending on the intended purpose. Examples thereof include pH adjusters, antiseptic/antifungal agents, chelating reagents, antirust agents, antioxidants, UV absorbers, oxygen absorbers and light stabilizers.

The pH adjuster is not particularly limited and may be appropriately selected depending on the intended purpose, as long as it can adjust the pH to the range of 7 to 11 without having an adverse effect on an inkjet ink to be prepared. Examples thereof include alcohol amines, hydroxides of alkali metals, ammonium hydroxides, phosphonium hydroxides, and carbonates of alkali metals. When the pH is less than 7 or greater than 11, the inkjet head and/or an ink supply unit are/is dissolved in large amounts, and thus troubles such as degradation or leakage of the ink and ejection failure may arise.

Examples of the alcohol amines include diethanolamine, triethanolamine and 2-amino-2-ethyl-1,3-propanediol.

Examples of the hydroxides of alkali metals include lithium hydroxide, sodium hydroxide and potassium hydroxide.

Examples of the ammonium hydroxides include ammonium hydroxide, quaternary ammonium hydroxide and quaternary phosphonium hydroxide.

Examples of the carbonates of alkali metals include lithium carbonate, sodium carbonate and potassium carbonate.

Examples of the antiseptic/antifungal agent include sodium dehydroacetate, sodium sorbate, sodium 2-pyridinethiol-1-oxide, sodium benzoate and sodium pentachlorophenol.

Examples of the chelating reagent include sodium ethylenediamine tetraacetate, sodium nitrilotriacetate, sodium hydroxyethylethylenediamine triacetate, sodium diethylenetriamine pentaacetate and sodium uramil diacetate.

Examples of the antirust agent include acid sulfites, sodium thiosulfate, ammonium thiodiglycolate, diisopropylammonium nitrate, pentaerythritol tetranitrate and dicyclohexylammonium nitrate.

Examples of the antioxidant include phenolic antioxidants (including hindered phenol antioxidants), amine antioxidants, sulfur antioxidants and phosphorus antioxidants.

Examples of the phenolic antioxidants (including hindered phenol antioxidants) include butylated hydroxyanisole, 2,6-di-tert-butyl-4-ethylphenol, stearyl-β-(3,5-di-tert-butyl-4-hydroxyphenyl)propionate, 2,2'-methylenebis(4-methyl-6-tert-butylphenol), 2,2'-methylenebis(4-ethyl-6-tert-butylphenol), 4,4'-butylidenebis(3-methyl-6-tert-butylphenol), 3,9-bis[1,1-dimethyl-2-[β-(3-tert-butyl-4-hydroxy-5-methyphenyl)propionyloxy]ethyl]-2,4,8,10-tetraoxaspiro[5.5]undecane, 1,1,3-tris(2-methyl-4-hydroxy-5-tert-butylphenyl)butane, 1,3,5-trimethyl-2,4,6-tris(3,5-di-tert-butyl-4-hydroxybenzyl)benzene and tetrakis[methylene-3-(3',5'-di-tert-butyl-4'-hydroxyphenyl)propionate]methane.

Examples of the amine antioxidants include phenyl-β-naphthylamine, α-naphthylamine, N,N'-di-sec-butyl-p-phenylenediamine, phenothiazine, N,N'-diphenyl-p-phenylenediamine, 2,6-di-tert-butyl-p-cresol, 2,6-di-tert-butylphenol, 2,4-dimethyl-6-tert-butyl-phenol, butyl hydroxyanisole, 2,2'-methylenebis(4-methyl-6-tert-butylphenol), 4,4'-butylidenebis(3-methyl-6-tert-butylphenol), 4,4'-thiobis(3-methyl-6-tert-butylphenol), tetrakis[methylene-3-(3,5-di-tert-butyl-4-dihydroxyphenyl)propionate]methane and 1,1,3-tris (2-methyl-4-hydroxy-5-tert-butylphenyl)butane.

Examples of the sulfur antioxidants include dilauryl 3,3'-thiodipropionate, distearyl thiodipropionate, lauryl stearyl thiodipropionate, dimyristyl-3,3'-thiodipropionate, distearyl β,β'-thiodipropionate, 2-mercaptobenzimidazole and dilauryl sulfide.

Examples of the phosphorus antioxidants include triphenyl phosphite, octadecyl phosphite, triisodecyl phosphite, trilauryl trithiophosphite and trinonylphenyl phosphite.

Examples of the UV absorber include benzophenone UV absorbers, benzotriazole UV absorbers, salicylate UV absorbers, cyanoacrylate UV absorbers and nickel complex salt UV absorbers.

Examples of the benzophenone UV absorbers include 2-hydroxy-4-n-octoxybenzophenone, 2-hydroxy-4-n-dodecyloxybenzophenone, 2,4-dihydroxybenzophenone, 2-hydroxy-4-methoxybenzophenone and 2,2',4,4'-tetrahydroxybenzophenone.

Examples of the benzotriazole UV absorbers include 2-(2'-hydroxy-5'-tert-octylphenyl)benzotriazole, 2-(2'-hydroxy-5'-methylphenyl)benzotriazole, 2-(2'-hydroxy-4'-octoxyphenyl)benzotriazole and 2-(2'-hydroxy-3'-tert-butyl-5'-methylphenyl)-5-chlorobenzotriazole.

Examples of the salicylate UV absorbers include phenyl salicylate, p-tert-butylphenyl salicylate and p-octylphenyl salicylate.

Examples of the cyanoacrylate UV absorbers include ethyl-2-cyano-3,3'-diphenyl acrylate, methyl-2-cyano-3-methyl-3-(p-methoxyphenyl) acrylate and butyl-2-cyano-3-methyl-3-(p-methoxyphenyl) acrylate.

Examples of the nickel complex salt UV absorbers include nickel bis(octylphenyl) sulfide, 2,2'-thiobis(4-tert-octylphelate)-n-butylamine nickel(II), 2,2'-thiobis(4-tert-octylphelate)-2-ethylhexylamine nickel(II) and 2,2'-thiobis(4-tert-octylphelate) triethanolamine nickel(II).

The inkjet ink of the present invention is produced by dispersing or dissolving in an aqueous medium an organic solvent, a colorant, a surfactant, water and optionally a penetrant, a water-dispersible resin and other ingredients and by, if necessary, stirring and mixing the resultant mixture. The dispersion can be performed with, for example, a sand mill, a homogenizer, a ball mill, a paint shaker or an ultrasonic dispersing device, and the stirring and mixing can be performed with, for example, an ordinary stirrer using stirring blades, a magnetic stirrer or a high-speed dispersing device.

The properties of the inkjet ink of the present invention are not particularly limited and may be appropriately selected depending on the intended purpose. For instance, it is desirable that the viscosity and the surface tension of the inkjet ink be in the following ranges.

The viscosity of the inkjet ink at 25° C. is not particularly limited and may be appropriately selected depending on the intended purpose, but is preferably 5 mPa·s to 25 mPa·s, more preferably 7 mPa·s to 20 mPa·s. By making the ink viscosity equal to or greater than 5 mPa·s, it is possible to obtain the effects of increasing printing density and the quality of letters/ characters. By making it equal to or less than 25 mPa·s, it is possible to secure ejection stability.

Here, the viscosity can be measured at 25° C., using a viscometer (RE-550L, produced by Toki Sangyo Co., Ltd.), for instance. The surface tension of the inkjet ink is not particularly limited and may be appropriately selected depending on the intended purpose, but is preferably 35 mN/m or less, more preferably 32 mN/m or less, at 25° C. When the surface tension is greater than 35 mN/m, leveling of the ink on a recording medium hardly takes place, and thus it may take a longer time for the ink to dry.

The coloring of the inkjet ink of the present invention is not particularly limited and may be appropriately selected depending on the intended purpose. For instance, the inkjet ink is colored yellow, magenta, cyan or black. When recording is performed using an ink set in which two or more of the colors are used together, it is possible to form a multicolor image, and when recording is performed using an ink set in which all the colors are used together, it is possible to form a full-color image.

The inkjet ink of the present invention can be suitably used for printers equipped with inkjet heads of any type, including the piezo type in which ink droplets are ejected by deforming a diaphragm that forms a wall surface of an ink flow path, with the use of a piezoelectric element as a pressure generating unit that pressurizes ink in the ink flow path, and thusly changing the volume of the ink flow path (see JP-A No. 02-51734); the thermal type in which bubbles are generated by heating ink in an ink flow path with the use of an exothermic resistive element (see JP-A No. 61-59911); and the electrostatic type in which ink droplets are ejected by placing a diaphragm and an electrode, which form a wall surface of an ink flow path, to face each other, then deforming the diaphragm by electrostatic force generated between the diaphragm and the electrode, and thusly changing the volume of the ink flow path (see JP-A No. 06-71882).

The inkjet ink of the present invention can be suitably used in image-forming apparatuses (e.g., printers) each employing an inkjet recording method. For instance, the inkjet ink can be used in a printer which has a function of encouraging printing fixation by heating recording paper and the inkjet ink to a temperature of 50° C. to 200° C. during, before or after printing. The inkjet ink can be particularly suitably used in the ink media set, the ink cartridge, the inkjet recording method, the inkjet recording apparatus and the ink recorded matter.

(Ink Media Set)

The inkjet ink of the present invention may be combined with a recording medium to form an ink media set.

<Recording Medium>

The recording medium is not particularly limited and may be appropriately selected depending on the intended purpose. Suitable examples thereof include plain paper, gloss paper, special paper, cloth, films, OHP sheets and general-purpose printing paper.

In order to obtain an exquisite ink recorded matter such as a printed image, what is used among these is a recording medium including a support, and a coating layer on at least one surface of the support, in which the amount of purified water transferred to a surface of the recording medium, which surface has the coating layer, at a contact period of 100 ms measured by a dynamic scanning absorptometer is 2 mL/m$^2$ to 35 mL/m$^2$ and the amount of purified water transferred to the surface of the recording medium, which surface has the coating layer, at a contact period of 400 ms measured by the dynamic scanning absorptometer is 3 mL/m$^2$ to 40 mL/m$^2$.

The amount of purified water transferred to the surface of the recording medium, which surface has the coating layer, at a contact period of 100 ms measured by the dynamic scanning absorptometer is preferably 2 mL/m$^2$ to 5 mL/m$^2$ and the amount of purified water transferred to the surface of the recording medium, which surface has the coating layer, at a contact period of 400 ms measured by the dynamic scanning absorptometer is preferably 3 mL/m$^2$ to 10 mL/m$^2$.

When the amount of the ink and purified water transferred at the contact period of 100 ms is too small, beading (nonuniformity of density) may easily arise. When it is too large, the ink dot diameter after recording may become far smaller than desired.

When the amount of the ink and purified water transferred at the contact period of 400 ms is too small, sufficient drying properties cannot be obtained, and thus spur marks may easily appear. When it is too large, the glossiness of an image portion after dried may easily lower.

Here, the dynamic scanning absorptometer (DSA, Japan TAPPI Journal, Vol. 48, May 1994, pp. 88-92, Shigenori Kuga) is an apparatus which can precisely measure the amount of liquid absorbed in a very short period of time. The dynamic scanning absorptometer automatically conducts the measurement by a method in which the rate of liquid absorption is directly read on the basis of the transfer of a meniscus in a capillary, a sample is shaped like a disc, a liquid absorption head is spirally moved for scanning on the sample, the scanning rate is automatically changed in accordance with a preset pattern, and measurement is repeated according to the required number of points per sample. A head for supplying liquid to a paper sample is connected to the capillary via a TEFLON (trademark) tube, and the position of the meniscus in the capillary is automatically read by an optical sensor. Specifically, the amount of purified water transferred was measured using a dynamic scanning absorptometer (K350 series, Model D, produced by Kyowaseiko Corporation). The transfer amount at a contact period of 100 ms and the transfer amount at a contact period of 400 ms can be calculated by means of interpolation based upon the measurement values of the transfer amounts at contact periods close to the above-mentioned contact periods.

—Support—

The support is not particularly limited and may be appropriately selected depending on the intended purpose. Examples thereof include paper made mainly from wood fiber, and sheet-like materials such as unwoven fabrics made mainly from wood fiber and synthetic fiber.

The paper is not particularly limited and may be appropriately selected from known materials depending on the intended purpose. For instance, wood pulp or recycled pulp is used therefor. Examples of the wood pulp include leaf bleached kraft pulp (LBKP), needle bleached kraft pulp (NBKP), NBSP, LBSP, GP and TMP.

Examples of the raw material for the recycled pulp include articles shown in the "Used Paper Standard Quality Specification List" released by Paper Recycling Promotion Center, such as high-quality white paper, white paper with lines and marks, cream-colored paper, card, medium-quality white paper, low-quality white paper, simili paper, white-colored paper, Kent paper, white art paper, medium-quality colored paper, low-quality colored paper, newspaper and magazine. Specific examples thereof include used paperboards and used papers of the following papers: printer papers such as uncoated computer paper, thermosensitive paper and pressure-sensitive paper that are related to information; OA (office automation) related papers such as paper for PPC (plain paper copier); coated papers such as art paper, coated paper, finely coated paper and matte paper; and uncoated papers such as high-quality paper, high color quality paper, notebook, letter paper, packing paper, fancy paper, medium-quality paper, newspaper, woody paper, super wrapping paper, simili paper, pure white roll paper and milk carton. More specific examples thereof include chemical pulp paper and high-yield pulp-containing paper. These may be used alone or in combination.

The recycled pulp is generally produced by a combination of the following four steps.
(1) Defibration: used paper is treated with mechanical force and chemicals using a pulper and thusly fiberized, and printing ink is separated from the fiber.
(2) Dust removal: foreign matter (e.g., plastic) and dust contained in the used paper is removed by, for example, a screen or a cleaner.
(3) Ink removal: the printing ink that has been separated from the fiber using a surfactant is removed from the system by a flotation method or washing method.
(4) Bleaching: the whiteness of the fiber is enhanced utilizing oxidation or reduction.

When the recycled pulp is mixed with other pulp, it is desirable that the mixture ratio of the recycled pulp in the whole pulp be 40% or less so as to prevent curl after recording.

For an internally added filler used in the support, a conventionally known pigment as a white pigment is used, for instance. Examples of the white pigment include white inorganic pigments such as light calcium carbonate, heavy calcium carbonate, kaolin, clay, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic silica, aluminum hydroxide, alumina, lithopone, zeolite, magnesium carbonate and magnesium hydroxide; and organic pigments such as styrene-based plastic pigments, acrylic plastic pigments, polyethylene, microcapsules, urea resins and melamine resins. These may be used alone or in combination.

Examples of an internally added sizing agent used in producing the support include neutral rosin sizing agents used in neutral papermaking, alkenyl succinic anhydrides (ASA), alkyl ketene dimers (AKD) and petroleum resin sizing agents. Among them, neutral rosin sizing agents and alkenyl succinic anhydrides are particularly suitable. Although any of the alkyl ketene dimers only needs to be added in small amounts due to its strong sizing effect, it may be unfavorable in terms of conveyance at the time of inkjet recording because the friction coefficient of a recording paper (medium) surface decreases and the surface easily becomes slippery.

The thickness of the support is not particularly limited and may be appropriately selected depending on the intended purpose, with the range of 50 μm to 300 μm being preferable. The basis weight of the support is preferably 45 g/m² to 290 g/m².

—Coating Layer—

The coating layer includes a pigment and a binder; and, if necessary, further includes a surfactant and other components.

For the pigment, an inorganic pigment or a combination of an inorganic pigment and an organic pigment can be used.

Examples of the inorganic pigment include kaolin, talc, heavy calcium carbonate, light calcium carbonate, calcium sulfite, amorphous silica, titanium white, magnesium carbonate, titanium dioxide, aluminum hydroxide, calcium hydroxide, magnesium hydroxide, zinc hydroxide and chlorites. Among them, kaolin is particularly preferable in that it is superior in gloss developing property and makes it possible to yield a texture which is comparable to that of paper for offset printing.

Examples of the kaolin include delaminated kaolin, calcined kaolin, and engineered kaolin produced by, for example, surface modification. In view of gloss developing property, it is desirable that 50% by mass or more of the whole kaolin be occupied by kaolin having a particle size distribution in which 80% by mass or more of the particles are 2 μm or less in diameter.

The amount of the kaolin added is not particularly limited and may be appropriately selected depending on the intended purpose, but is preferably 50 parts by mass or more per 100 parts by mass of the binder. When the amount is less than 50 parts by mass, sufficient effectiveness may not be obtained with respect to glossiness. Although the maximum value of the amount is not particularly limited, it is desirable in terms of coating suitability that the amount be 90 parts by mass or less, in view of the kaolin's fluidity, especially thickening properties under application of high shearing force.

Examples of the organic pigment include water-soluble dispersions containing, for example, styrene-acrylic copolymer particles, styrene-butadiene copolymer particles, polystyrene particles or polyethylene particles. These organic pigments may be used in combination.

The amount of the organic pigment added is not particularly limited and may be appropriately selected depending on the intended purpose, but is preferably 2 parts by mass to 20 parts by mass per 100 parts by mass of the whole pigment of the coating layer. The organic pigment is superior in gloss developing property and smaller in specific gravity than an inorganic pigment, thereby making it possible to obtain a coating layer which is bulky, highly glossy and excellent in surface coating property. When the amount is less than 2 parts by mass, such effects cannot be obtained. When it is greater than 20 parts by mass, the fluidity of a coating liquid degrades, which leads to decrease in coating operationality and which is economically unfavorable as well.

Examples of the form of the organic pigment include dense type, hollow type and doughnut type. However, in light of a balance among the gloss developing property, the surface coating property, and the fluidity of the coating solution, it is desirable that the average particle diameter ($D_{50}$) be 0.2 μm to 3.0 μm, and it is further desirable to employ a hollow type with a void ratio of 40% or more.

For the binder, an aqueous resin is preferably used.

For the aqueous resin, a water-soluble resin or a water-dispersible resin or a combination thereof can be suitably used. The water-soluble resin is not particularly limited and may be appropriately selected depending on the intended purpose. Examples thereof include polyvinyl alcohol and modified products of polyvinyl alcohol such as anion-modified polyvinyl alcohol, cation-modified polyvinyl alcohol and acetal-modified polyvinyl alcohol; polyurethane; polyvinylpyrrolidone and modified products of polyvinylpyrrolidone such as copolymers of polyvinylpyrrolidone and vinyl acetate, copolymers of vinylpyrrolidone and dimethylaminoethyl methacrylate, copolymers of quaternized vinylpyrrolidone and dimethylaminoethyl methacrylate and copolymers of vinylpyrrolidone and methacrylamide propyl trimethyl ammonium chloride; celluloses such as carboxymethyl cellulose, hydroxyethyl cellulose and hydroxypropyl cellulose; modified products of cellulose such as cationated hydroxyethyl cellulose; synthetic resins such as polyester, polyacrylic acid (ester), melamine resins, modified products thereof, and copolymers of polyester and polyurethane; and poly(meth)

acrylic acid, poly(meth)acrylamide, oxidized starch, phosphoric acid-esterified starch, self-modifying starch, cationated starch, various types of modified starch, polyethylene oxide, sodium polyacrylate and sodium alginate. These may be used alone or in combination.

Among them, polyvinyl alcohol, cation-modified polyvinyl alcohol, acetal-modified polyvinyl alcohol, polyester, polyurethane and copolymers of polyester and polyurethane are particularly preferable in terms of ink absorption.

The water-dispersible resin is not particularly limited and may be appropriately selected depending on the intended purpose. Examples thereof include polyvinyl acetate, ethylene-vinyl acetate copolymers, polystyrene, styrene-(meth)acrylic acid ester copolymers, (meth)acrylic acid ester polymers, vinyl acetate-(meth)acrylic acid (ester) copolymers, styrene-butadiene copolymers, ethylene-propylene copolymers, polyvinyl ethers and silicone-acrylic copolymers. Also, the water-dispersible resin may contain a crosslinking agent such as methylolated melamine, methylolated urea, methylolated hydroxypropylene urea or isocyanate or may be a copolymer with self-crosslinking ability that includes N-methylolacrylamide or other unit. A plurality of these aqueous resins can be used at the same time.

The amount of the aqueous resin added is preferably 2 parts by mass to 100 parts by mass, more preferably 3 parts by mass to 50 parts by mass, per 100 parts by mass of the pigment. The amount of the aqueous resin added is determined such that the liquid absorption properties of the recording medium are within a desired range.

When a water-dispersible colorant is used as the colorant, a cationic organic compound is not necessarily required for the coating layer, and a cationic organic compound mixed into the coating layer is not particularly limited and may be appropriately selected depending on the intended purpose. Examples of the cationic organic compound mixed into the coating layer include monomers, oligomers and polymers of primary to tertiary amines and quaternary ammonium salts, that form insoluble salts by reacting with functional groups such as sulfonic acid group, carboxyl group and amino group in direct dye or acid dye present in water-soluble ink. Among them, oligomers and polymers are preferable.

Examples of the cationic organic compound include dimethylamine-epichlorhydrin polycondensates, dimethylamine-ammonia-epichlorhydrin condensates, poly(trimethylaminoethyl methacrylate-methylsulfate), diallylamine hydrochloride-acrylamide copolymers, poly(diallylamine hydrochloride-sulfur dioxide), polyallylamine hydrochloride, poly(allylamine hydrochloride-diallylamine hydrochloride), acrylamide-diallylamine copolymers, polyvinylamine copolymers, dicyandiamide, dicyandiamide-ammonium chloride-urea-formaldehyde condensates, polyalkylene polyamine-dicyandiamide ammonium salt condensates, dimethyldiallylammonium chloride, polydiallylmethylamine hydrochloride, poly(diallyldimethylammonium chloride), poly(diallyldimethylammonium chloride-sulfur dioxide), poly(diallyldimethylammonium chloride-diallylamine hydrochloride derivatives), acrylamide-diallyldimethylammonium chloride copolymers, acrylate-acrylamide-diallylamine hydrochloride copolymers, polyethylenimine, ethylenimine derivatives such as acrylamine polymers, and modified products of polyethylenimine alkylene oxides. These may be used alone or in combination.

Among them, any one of low-molecular-weight cationic organic compounds such as dimethylamine-epichlorhydrin polycondensates and polyallylamine hydrochloride and any one of relatively high-molecular-weight cationic organic compounds such as poly(diallyldimethylammonium chloride) are preferably combined together. The combinational use makes it possible to increase image density more than in the case of independent use and further reduce feathering.

The cation equivalent of the cationic organic compound measured in accordance with a colloid titration method (using potassium polyvinyl sulfate and toluidine blue) is preferably 3 meq/g to 8 meq/g. When the cation equivalent is in this range, a favorable result can be obtained with respect to the range of the amount of the cationic organic compound dried and attached.

Here, in the measurement of the cation equivalent in accordance with the colloid titration method, the cationic organic compound is diluted with distilled water such that the solid content stands at 0.1% by mass, and pH adjustment is not made.

The amount of the cationic organic compound dried and attached is not particularly limited and may be appropriately selected depending on the intended purpose, but is preferably $0.3 \, g/m^2$ to $2.0 \, g/m^2$. When the amount of the cationic organic compound dried and attached is less than $0.3 \, g/m^2$, such effects as sufficient increase in image density and reduction in feathering may not be obtained.

The surfactant included in the coating layer in accordance with the necessity is not particularly limited and may be appropriately selected depending on the intended purpose, and any one of an anionic surfactant, a cationic surfactant, an amphoteric surfactant and a nonionic surfactant can be used therefor. Among them, a nonionic surfactant is particularly preferable. By addition of the surfactant, the water resistance of images improves, image density increases, and bleeding can be reduced.

Examples of the nonionic surfactant include higher alcohol ethylene oxide adducts, alkylphenol ethylene oxide adducts, fatty acid ethylene oxide adducts, polyhydric alcohol fatty acid ester ethylene oxide adducts, higher aliphatic amine ethylene oxide adducts, fatty acid amide ethylene oxide adducts, ethylene oxide adducts of fats and oils, polypropylene glycol ethylene oxide adducts, fatty acid esters of glycerol, fatty acid esters of pentaerythritol, fatty acid esters of sorbitol and sorbitan, fatty acid esters of sucrose, alkyl ethers of polyhydric alcohols, and fatty acid amides of alkanolamines. These may be used alone or in combination.

The polyhydric alcohols are not particularly limited and may be appropriately selected depending on the intended purpose. Examples thereof include glycerol, trimethylolpropane, pentaerythrite, sorbitol and sucrose. As to the ethylene oxide adducts, ones in which an alkylene oxide, for example propylene oxide or butylene oxide, is substituted for part of ethylene oxide to such an extent that their water solubility can be maintained are also effective. The substitution ratio is preferably 50% or less. The HLB (hydrophile-lipophile balance) of the nonionic surfactant is preferably 4 to 15, more preferably 7 to 13.

The amount of the surfactant added is not particularly limited and may be appropriately selected depending on the intended purpose, but is preferably 10 parts by mass or lower, more preferably 0.1 parts by mass to 1.0 part by mass, per 100 parts by mass of the cationic organic compound.

Furthermore, other components may be added to the coating layer in accordance with the necessity, to such an extent that the object and effects of the present invention are not impaired. Examples of the other components include additives such as alumina powder, a pH adjuster, an antiseptic agent and an antioxidant.

The method for forming the coating layer is not particularly limited and may be appropriately selected depending on the intended purpose. For instance, a method in which the support is impregnated or coated with a coating layer solution can be employed. The method of impregnating or coating the support with the coating layer solution is not particularly limited and may be appropriately selected depending on the intended purpose. For instance, the impregnation or the coating can be performed using a coating device such as a conventional size press, a gate roll size press, a film transfer size press, a blade coater, a rod coater, an air knife coater or a curtain coater. Also, in view of cost, the support may be impregnated or coated with the coating layer solution using a conventional size press, a gate roll size press or a film transfer size press installed in a papermaking machine and may be finished using an on-machine coater.

The amount of the coating layer solution applied is not particularly limited and may be appropriately selected depending on the intended purpose. It is preferably 0.5 g/m$^2$ to 20 g/m$^2$, more preferably 1 g/m$^2$ to 15 g/m$^2$, as a solid content.

If necessary, the coating layer solution may be dried after the impregnation or the coating, in which the drying temperature is not particularly limited and may be appropriately selected depending on the intended purpose, with the range of approximately 100° C. to 250° C. being preferable.

The recording medium may further include a back layer formed on the back surface of the support, and other layers formed between the support and the coating layer and between the support and the back layer. It is also possible to provide a protective layer on the coating layer. These layers may be composed of a single layer or a plurality of layers.

For the recording medium, it is possible to use commercially available general-purpose printing paper, coated paper for offset printing and coated paper for gravure printing besides an inkjet recording medium.

The commercially available coated paper for printing denotes coated paper such as cast-coated paper, so-called art paper (A0 size and A1 size), A2 size coated paper, A3 size coated paper, B2 size coated paper, lightweight coated paper or finely coated paper, used for commercial printing or publication printing, e.g. offset printing or gravure printing.

Specific examples thereof include AURORA COAT (produced by Nippon Paper Industries Co., Ltd.) and POD GLOSS COAT (produced by Oji Paper Company, Limited).

(Ink Cartridge)

An ink cartridge of the present invention includes a container to house the inkjet ink of the present invention, and further includes other members appropriately selected in accordance with the necessity.

The container is not particularly limited, and the shape, structure, size and material thereof may be appropriately selected depending on the intended purpose. Suitable examples thereof include a container having at least an ink bag formed of, for example, an aluminum laminated film or a resin film.

Next, the ink cartridge will be described with reference to FIGS. 1 and 2. Here, FIG. 1 is a schematic diagram exemplarily showing the ink cartridge of the present invention, and FIG. 2 is a schematic diagram exemplarily showing a modified example of the ink cartridge in FIG. 1.

Figure 1:
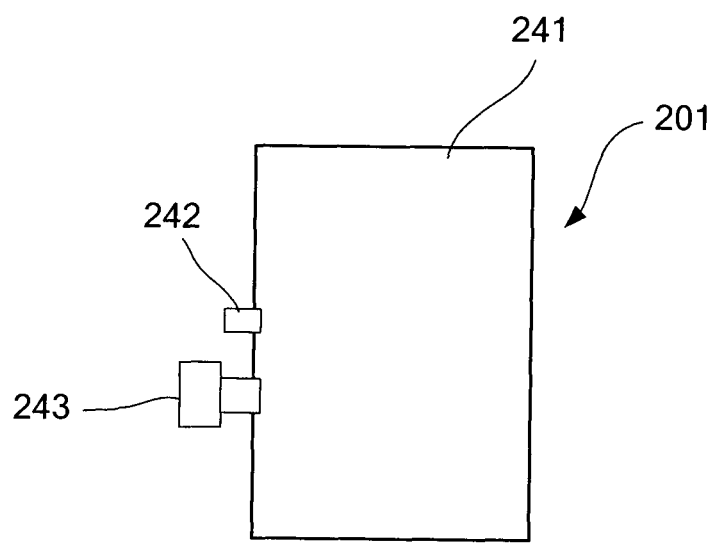
FIG. 1 is a schematic view of one example of an ink cartridge containing an ink of the present invention.
Figure 2:
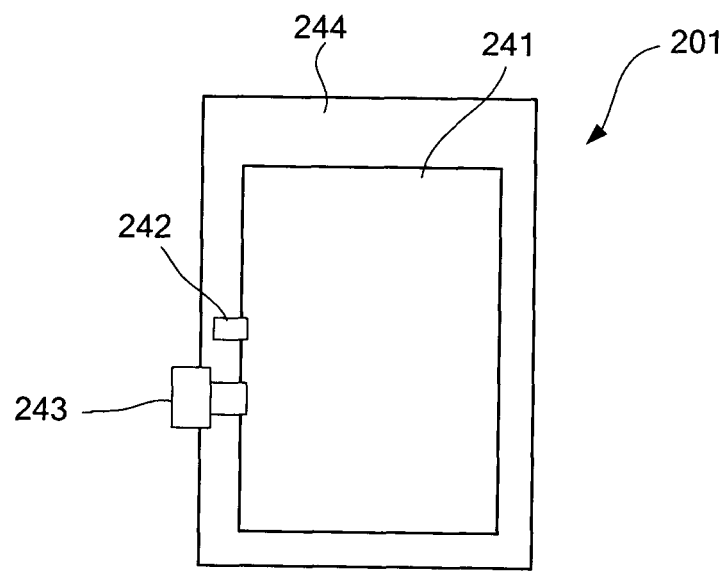
FIG. 2 is a schematic view of a modification example of the ink cartridge of FIG. 1.
Figure 3:
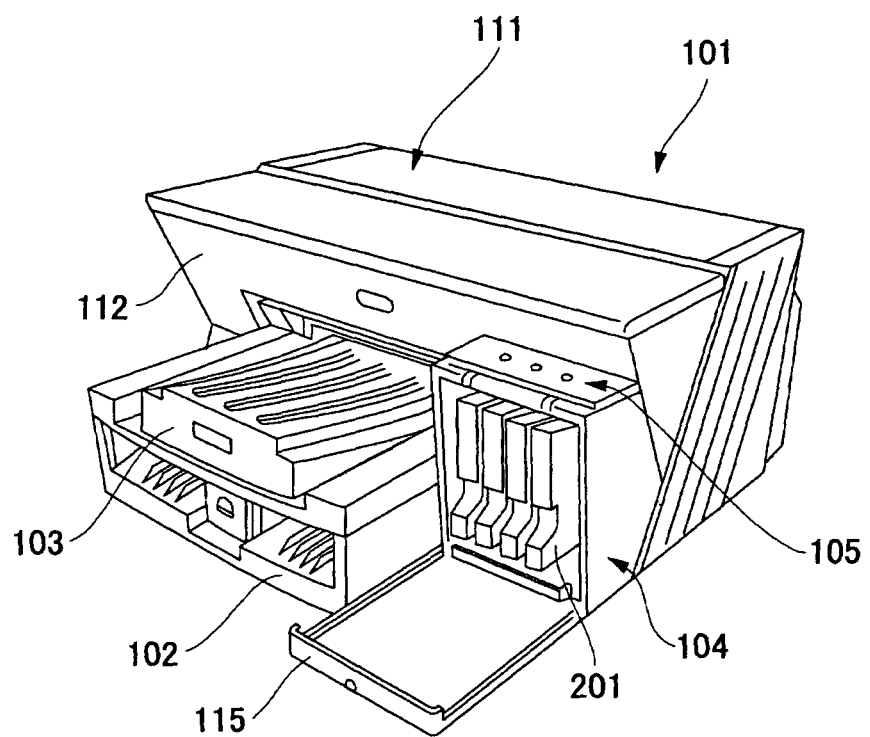
FIG. 3 is a perspective view of one example of an inkjet recording apparatus in the state where the cover of the loading section of the ink cartridge is open.

As shown in FIG. 1, the inkjet ink of the present invention is supplied from an ink inlet (242) into an ink bag (241), and the ink inlet (242) is closed by means of fusion bonding after air is discharged. When the ink cartridge is used, an ink ejection outlet (243) made of a rubber member is pricked with a needle of an inkjet recording apparatus main body (101) described below with reference to FIG. 3, and the ink is thus supplied to the apparatus main body (101).

The ink bag (241) is formed of an air-impermeable packing member such as an aluminum laminated film. As shown in FIG. 2, this ink bag (241) is normally housed in a plastic cartridge case (244) and detachably mounted on a variety of inkjet recording apparatuses.

The ink cartridge (201) of the present invention houses the inkjet ink of the present invention and can be detachably mounted on a variety of inkjet recording apparatuses. It is particularly desirable that the ink cartridge (201) be detachably mounted on the below-mentioned inkjet recording apparatus of the present invention.

(Inkjet Recording Method and Inkjet Recording Apparatus)

The inkjet recording method of the present invention includes at least an ink jetting step, and further includes other steps appropriately selected in accordance with the necessity, such as a stimulus generating step and a controlling step.

The inkjet recording apparatus of the present invention includes at least an ink jetting unit, and further includes other units appropriately selected in accordance with the necessity, such as a stimulus generating unit and a controlling unit.

The inkjet recording method of the present invention can be suitably performed by the inkjet recording apparatus of the present invention, and the ink jetting step can be suitably performed by the ink jetting unit. Also, the other steps can be suitably performed by the other units.

—Ink Jetting Step and Ink Jetting Unit—

The ink jetting step is a step of applying a stimulus (energy) to the inkjet ink of the present invention to make the inkjet ink jet, to thereby form an image on a recording medium.

The ink jetting unit is a unit configured to apply a stimulus (energy) to the inkjet ink of the present invention to make the inkjet ink jet, to thereby form an image on a recording medium. The ink jetting unit is not particularly limited, and examples thereof include nozzles for ejecting ink.

In the present invention, at least part of a liquid chamber, a fluid resistance unit, a diaphragm and a nozzle member of the inkjet head is preferably formed of a material containing silicone or nickel or both thereof.

Also, the diameter of the inkjet nozzle is not particularly limited and may be appropriately selected depending on the intended purpose, but is preferably 30 μm or less, more preferably 1 μm to 20 μm.

The stimulus (energy) can, for example, be generated by the stimulus generating unit, and the stimulus is not particularly limited and may be appropriately selected depending on the intended purpose. Examples thereof include heat (temperature), pressure, vibration and light. These may be used alone or in combination. Among them, heat and pressure are suitable.

Examples of the stimulus generating unit include heaters, pressurizers, piezoelectric elements, vibration generators, ultrasonic oscillators and lights. Specific examples thereof include a piezoelectric actuator such as a piezoelectric element, a thermal actuator that uses a thermoelectric conversion element such as an exothermic resistive element and utilizes phase change caused by film boiling of a liquid, a shape-memory-alloy actuator that utilizes metal phase change caused by temperature change, and an electrostatic actuator that utilizes electrostatic force.

The aspect of the jetting of the inkjet ink is not particularly limited and varies with, for example, the type of the stimulus. In the case where the stimulus is "heat", there is, for example, a method in which thermal energy corresponding to a recording signal is given to the recording ink in a recording head, using for example a thermal head, bubbles are generated in the inkjet ink by the thermal energy, and the inkjet ink is ejected as droplets from nozzle holes of the recording head by the pressure of the bubbles. Meanwhile, in the case where the stimulus is "pressure", there is, for example, a method in which by applying voltage to a piezoelectric element bonded to a site called a pressure chamber that lies in an ink flow path in a recording head, the piezoelectric element bends, the volume of the pressure chamber decreases, and thus the recording ink is ejected as droplets from nozzle holes of the recording head It is desirable that the inkjet ink droplets jetted be, for example, $3 \times 10^{-15}$ m$^3$ to $40 \times 10^{-15}$ m$^3$ (3 pL to 40 pL) in size, 5 m/s to 20 m/s in ejection velocity, 1 kHz or greater in drive frequency and 300 dpi or greater in resolution.

The controlling unit is not particularly limited and may be appropriately selected depending on the intended purpose, as long as it can control operations of the aforementioned units. Examples thereof include devices such as a sequencer and a computer.

Here, one aspect of performing the inkjet recording method of the present invention by a serial-type inkjet recording apparatus will be described with reference to the drawings. The inkjet recording apparatus in FIG. 3 includes an apparatus main body (101), a paper feed tray (102) for feeding paper into the apparatus main body (101), a paper discharge tray (103) for storing paper which has been fed into the apparatus main body (101) and on which images have been formed (recorded), and an ink cartridge loading section (104). An operation unit (105) composed of, for example, operation keys and a display is placed on the upper surface of the ink cartridge loading section (104). The ink cartridge loading section (104) has a front cover (115) capable of opening and closing to attach and detach the ink cartridge (201).

Figure 4:
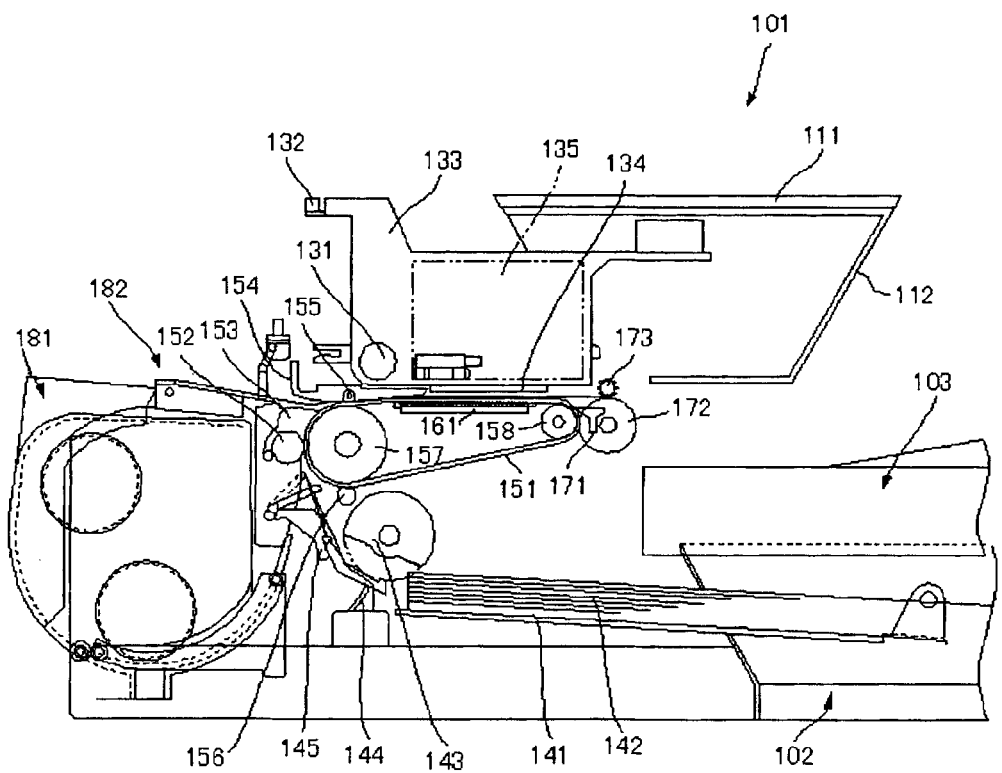
FIG. 4 is a cross-sectional view for explaining the entire structure of the inkjet recording device of FIG. 3.
Figure 5:
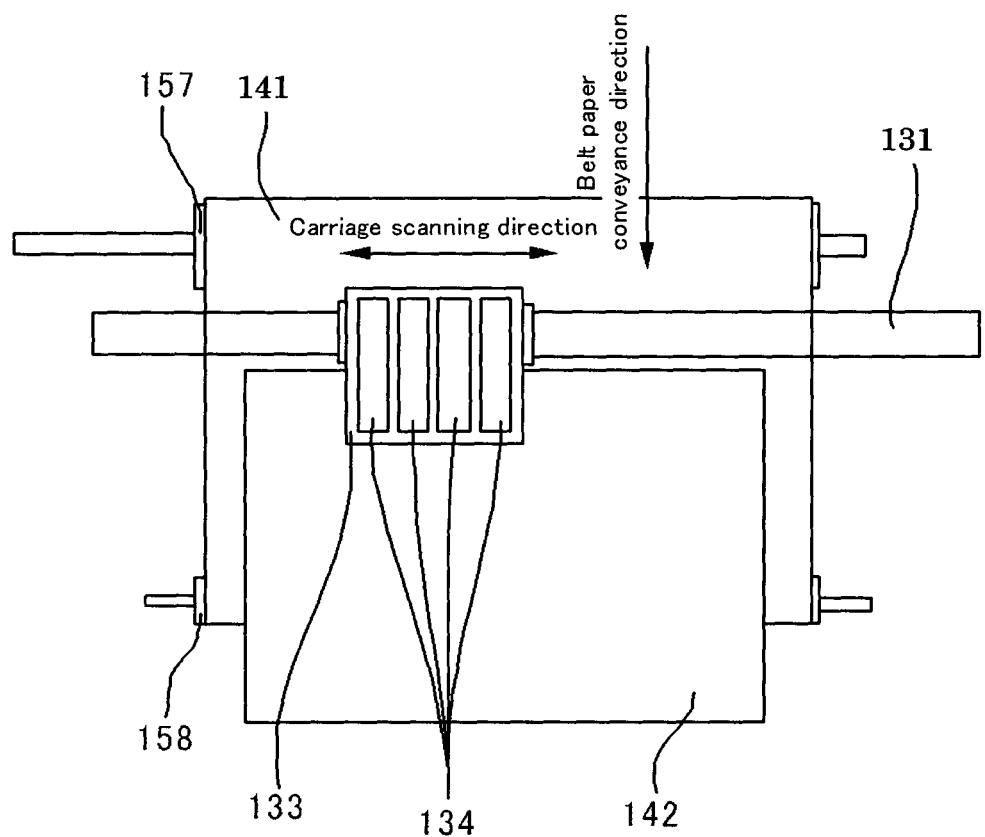
FIG. 5 is a schematic enlarged view of an inkjet head of an inkjet recording apparatus.

In the apparatus main body (101), as shown in FIGS. 4 and 5, a carriage (133) is freely slidably held in the main scanning direction by a guide rod (131), which is a guide member laterally passed between left and right side plates (not depicted), and a stay (132); and the carriage (133) is moved for scanning in the arrow direction in FIG. 5 by a main scanning motor (not depicted).

A recording head (134) composed of four inkjet recording heads which eject recording ink droplets of yellow (Y), cyan (C), magenta (M) and black (Bk) is installed in the carriage (133) such that a plurality of ink ejection outlets are aligned in the direction intersecting the main scanning direction and that the ink droplet ejection direction faces downward.

For each of the inkjet recording heads composing the recording head (134), it is possible to use, for example, a head provided with any of the following actuators as a energy-generating unit for ejecting ink: a piezoelectric actuator such as a piezoelectric element, a thermal actuator that uses a thermoelectric conversion element such as an exothermic resistive element and utilizes phase change caused by film boiling of a liquid, a shape-memory-alloy actuator that utilizes metal phase change caused by temperature change, and an electrostatic actuator that utilizes electrostatic force.

Also, the carriage (133) incorporates sub-tanks (135) of each color for supplying the inks of each color to the recording head (134). Each sub-tank (135) is supplied and replenished with the inkjet ink of the present invention from the ink cartridge (201) of the present invention loaded into the ink cartridge loading section (104), via a recording ink supply tube (not depicted).

Meanwhile, as a paper feed unit for feeding sheets of paper (142) loaded on a paper loading section (pressure plate) (141) of the paper feed tray (102), there are provided a half-moon roller (paper feed roller 143) which feeds the sheets of paper (142) one by one from the paper loading section (141), and a separation pad (144) which faces the paper feed roller (143) and is formed of a material with a large friction coefficient. This separation pad (144) is biased toward the paper feed roller (143) side.

As a conveyance unit for conveying the paper (142), which has been fed from this paper feed unit, under the recording head (134), there are provided a conveyance belt (151) for conveying the paper (142) by means of electrostatic adsorption; a counter roller (152) for conveying the paper (142), which is sent from the paper feed unit via a guide (145), such that the paper (142) is sandwiched between the counter roller (152) and the conveyance belt (151); a conveyance guide (153) for making the paper (142), which is sent upward in the substantially vertical direction, change its direction by approximately 90° and thusly correspond with the conveyance belt (151); and an end pressurizing roller (155) biased toward the conveyance belt (151) side by a pressing member (154). Also, there is provided a charging roller (156) as a charging unit for charging the surface of the conveyance belt (151).

The conveyance belt (151) is an endless belt and is capable of moving in circles in the belt conveyance direction, with being wound around a conveyance roller (157) and a tension roller (158) in a stretched manner. The conveyance belt (151) has, for example, a surface layer serving as a paper adsorbing surface, that is formed of a resinous material such as an ethylene-tetrafluoroethylene copolymer (ETFE) having a thickness of approximately 40 μm for which resistance control has not been conducted, and a back layer (intermediate resistance layer, ground layer) that is formed of the same material as this surface layer, for which resistance control has been conducted using carbon. On the back of the conveyance belt (151), a guide member (161) is placed correspondingly to a region where printing is performed by the recording head (134). Additionally, as a paper discharge unit for discharging the paper (142) on which images have been recorded by the recording head (134), there are provided a separation pawl (171) for separating the paper (142) from the conveyance belt (151), a paper discharge roller (172) and a paper discharge small roller (173), with the paper discharge tray (103) being placed below the paper discharge roller (172).

A double-sided paper feed unit (181) is mounted on a rear surface portion of the apparatus main body (101) in a freely detachable manner. The double-sided paper feed unit (181) takes in the paper (142) returned by rotation of the conveyance belt (151) in the opposite direction and reverses it, then refeeds it between the counter roller (152) and the conveyance belt (151). Additionally, a manual paper feed unit (182) is provided on an upper surface of the double-sided paper feed unit (181).

In this inkjet recording apparatus, the sheets of paper (142) are fed one by one from the paper feed unit, and the paper (142) fed upward in the substantially vertical direction is guided by the guide (145) and conveyed between the conveyance belt (151) and the counter roller (152). Furthermore, the conveyance direction of the paper (142) is changed by approximately 90°, as an end of the paper (142) is guided by the conveyance guide (153) and pressed onto the conveyance belt (151) by the end pressurizing roller (155).

On this occasion, the conveyance belt (151) is charged by the charging roller (156), and the paper (142) is electrostatically adsorbed onto the conveyance belt (151) and thusly conveyed. Here, by driving the recording head (134) according to image signals while moving the carriage (133), ink droplets are ejected onto the paper (142) having stopped so as to perform recording for one line, and after the paper (142) is conveyed by a predetermined distance, recording for the next line is performed. On receipt of a recording completion signal or such a signal as indicates that the rear end of the paper (142) has reached the recording region, recording operation is finished, and the paper (142) is discharged onto the paper discharge tray (103).

Once the amount of recording ink remaining in the sub-tanks (135) has been detected as too small, a required amount of recording ink is supplied from the ink cartridge (201) into the sub-tanks (135).

As to this inkjet recording apparatus, when recording ink in the ink cartridge (201) has been used up, it is possible to replace only the ink bag (241) inside the ink cartridge (201) by dismantling the housing of the ink cartridge (201). Also, even when the ink cartridge (201) is longitudinally placed and employs a front-loading structure, it is possible to supply recording ink stably. Therefore, even when the apparatus main body (101) is installed with little space over it, for example when the apparatus main body (101) is stored in a rack or when an object is placed over the apparatus main body (101), it is possible to replace the ink cartridge (201) with ease.

It should be noted that although the inkjet recording method of the present invention has been described referring to an example in which it is applied to a serial-type (shuttle-type) inkjet recording apparatus where a carriage performs scanning, the inkjet recording method of the present invention can also be applied to line-type inkjet recording apparatuses provided with line-type heads.

Also, the inkjet recording apparatus and the inkjet recording method of the present invention can be applied to a variety of types of recording based upon inkjet recording systems. For example, they can be particularly suitably applied to inkjet recording printers, facsimile apparatuses, copiers, printer/fax/copier complex machines, and so forth.

(Ink Recorded Matter)

An ink recorded matter of the present invention is a recorded matter recorded by the inkjet recording apparatus and the inkjet recording method of the present invention.

The ink recorded matter of the present invention includes an image formed on a recording medium, using the recording ink of the present invention.

Also, the ink recorded matter of the present invention includes an image formed on a recording medium in the ink media set of the present invention, using a recording ink in the ink media set of the present invention.

The recording medium is not particularly limited and may be appropriately selected depending on the intended purpose. Examples thereof include plain paper, gloss paper, special paper, cloth, films, OHP sheets and general-purpose printing paper. These may be used alone or in combination.

The ink recorded matter is high in image quality, free of bleeding and superior in stability over time and can be suitably used for a variety of purposes as a material on which letters/characters or images of any type are recorded.

EXAMPLES

The present invention will next be described by way of Examples, which should not be construed as limiting the present invention thereto.

The average molecular weight of an α-olefin-maleic anhydride copolymer represented by the above General Formula (VI) used in the present invention was measured in the following manner.

<Measurement of the Average Molecular Weight>

A GPC (gel permeation chromatography) system was used to measure the average molecular weight of the copolymer (resin).

First, the copolymer was dissolved in tetrahydrofuran which is the same as an eluent, and a GPC column used was KF-806L (for THF). Three kinds of polystyrenes having different known molecular weights (molecular weights: 1,000, 2,400 and 8,500) were used as molecular weight standard substances and measured to prepare a calibration curve in advance.

The copolymer was measured through GPC. The obtained SEC chromatogram, the differential molecular weight distribution curve and the calibration curve obtained using the molecular weight standard substances were reflected on a graph, from which the weight average molecular weight of the copolymer was calculated.

Production Example 1

A 300 mL-separable flask equipped with a stirrer, a thermocouple, and a nitrogen-introducing tube was charged with 19.828 g of N,N-dimethylacryl amide and 14.824 g of 1-butanol, and the resultant mixture was stirred while introducing the nitrogen gas into the flask. Subsequently, 0.338 g of sodium t-butoxide was added to the flask, and the resultant mixture was allowed to react at 35° C. for 4 hours. Upon completion of heating, 150 mg of phosphoric acid was added to the reaction solution, and the solution was then homogenized, followed by being left to stand for 3 hours. The solution was then filtrated to remove precipitates, and unreacted products were removed with an evaporator. The yield amount was found to be 30.5 g (yield rate: 88%). The obtained material was subjected to measurement by $^1$H-NMR, and peaks were observed at 0.95 ppm (3H), 1.3 ppm to 1.5 ppm (4H), 2.4 ppm (2H), 2.9 ppm (6H), 3.4 ppm (2H) and 3.7 ppm (2H). It was found from these results that the obtained material had a structure expressed by the following formula (1).

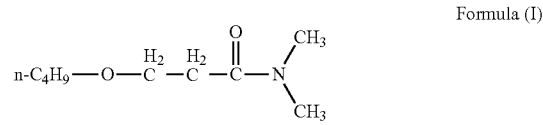

Formula (I)

Preparation Example 1

—Preparation of Water-soluble Polymeric Compound Aqueous Solution A—

α-olefin-maleic anhydride copolymer represented by the above General Formula (VI) (produced by Seiko PMC Corporation, T-YP112, olefin chain (R): 20 to 24 carbon atoms (copolymer represented by the above General Formula (VI) where $R_1$ is an alkyl group having 18 to 22 carbon atoms), 190 mgKOH/g in acid value, weight average molecular weight=10,000): 10.0 parts by mass 1N LiOH aqueous solution (1.2 times the amount of the acid value of the α-olefin-maleic anhydride copolymer represented by the above General Formula (VD): 17.34 parts by mass Ion-exchange water: 72.66 parts by mass Next, the mixture was heated and stirred with a stirrer to dissolve the α-olefin-maleic anhydride copolymer represented by General Formula (VI), and a trace amount of insoluble matter was filtrated using a filter of 5 μm in average pore diameter to prepare a water-soluble polymeric compound aqueous solution A.

Preparation Example 2

—Preparation of Surface-treated Black Pigment Dispersion Liquid—

Into 3,000 mL of 2.5N sodium sulfate solution, 90 g of carbon black having a CTAB specific surface area of 150 m$^2$/g and a DBP oil absorption of 100 mL/100 g was added, then the mixture was stirred at a temperature of 60° C. and a rotational speed of 300 rpm and subjected to reaction for 10 hr, and the carbon black was thus oxidized. This reaction mixture was filtrated, then the carbon black which had been filtrated was neutralized with a sodium hydroxide solution and subjected to ultrafiltration.

The carbon black obtained was washed with water, dried and dispersed into purified water such that the solid content was 30% by mass, the mixture was sufficiently stirred, and a black pigment dispersion liquid was thus obtained. The average particle diameter ($D_{50}$) of a pigment dispersoids in this black pigment dispersion liquid measured 103 nm. Additionally, the average particle diameter ($D_5O$) was measured using a particle size distribution analyzer (NANOTRAC UPA-EX150, produced by Nikkiso Co., Ltd.).

Preparation Example 3

—Preparation of Magenta Pigment-containing Polymer Fine Particle Dispersion Liquid—
<Preparation of Polymer Solution A>

Gas inside a 1-L flask equipped with a mechanical stirrer, a thermometer, a nitrogen gas-introducing tube, a reflux tube and a dripping funnel was sufficiently substituted with nitrogen gas, then 11.2 g of styrene, 2.8 g of acrylic acid, 12.0 g of lauryl methacrylate, 4.0 g of polyethylene glycol methacrylate, 4.0 g of styrene macromer and 0.4 g of mercaptoethanol were mixed together therein, and the temperature was raised to 65° C.

Subsequently, a mixed solution containing 100.8 g of styrene, 25.2 g of acrylic acid, 108.0 g of lauryl methacrylate, 36.0 g of polyethylene glycol methacrylate, 60.0 g of hydroxyethyl methacrylate, 36.0 g of styrene macromer, 3.6 g of mercaptoethanol, 2.4 g of azobismethylvaleronitrile and 18 g of methyl ethyl ketone was kept being added dropwise into the flask for 2.5 hours. Thereafter, a mixed solution containing 0.8 g of azobismethylvaleronitrile and 18 g of methyl ethyl ketone was kept being added dropwise into the flask for 0.5 hr. The ingredients were aged at 65° C. for 1 hr, then 0.8 g of azobismethylvaleronitrile was added, and further, the ingredients were aged for 1 hr. After completion of reaction, 364 g of methyl ethyl ketone was added into the flask, and 800 g of a polymer solution A having a concentration of 50% by mass was thus obtained.
<Preparation of Pigment-containing Polymer Fine Particle Dispersion Liquid>

After 28 g of the polymer solution A, 42 g of C. I. Pigment Red 122, 13.6 g of 1 mol/L potassium hydroxide aqueous solution, 20 g of methyl ethyl ketone and 13.6 g of ion-exchange water had been sufficiently stirred, they were kneaded using a roll mill. The paste obtained was put into 200 g of purified water and sufficiently stirred, then the methyl ethyl ketone and the water were removed by distillation using an evaporator, this dispersion liquid was filtered under pressure using a polyvinylidene fluoride membrane filter of 5.0 μm in average pore diameter to remove coarse particles, and a magenta pigment-containing polymer fine particle dispersion liquid incorporating a pigment in an amount of 15% by mass and having a solid content of 20% by mass was thus obtained. The average particle diameter (D50) of polymer fine particles in the obtained magenta pigment-containing polymer fine particle dispersion liquid measured 127 nm. Additionally, the average particle diameter ($D_{50}$) was measured using a particle size distribution analyzer (NANOTRAC UPA-EX150, produced by Nikkiso Co., Ltd.).

Preparation Example 4

—Preparation of Cyan Pigment-containing Polymer Fine Particle Dispersion Liquid—

A cyan pigment-containing polymer fine particle dispersion liquid was prepared in the same manner as in Preparation Example 3, except that the C. I. Pigment Red 122 as a pigment was changed to a phthalocyanine pigment (C. I. Pigment Blue 15:3).

The average particle diameter (DO of polymer fine particles in the obtained cyan pigment-containing polymer fine particle dispersion liquid, measured using a particle size distribution analyzer (NANOTRAC UPA-EX150, produced by Nikkiso Co., Ltd.), was 93 nm.

Preparation Example 5

—Preparation of Yellow Pigment-containing Polymer Fine Particle Dispersion Liquid—

A yellow pigment-containing polymer fine particle dispersion liquid was prepared in the same manner as in Preparation Example 3, except that the C. I. Pigment Red 122 as a pigment was changed to a monoazo yellow pigment (C. I. Pigment Yellow 74).

The average particle diameter ($D_m$) of polymer fine particles in the obtained yellow pigment-containing polymer fine particle dispersion liquid, measured using a particle size distribution analyzer (NANOTRAC UPA-EX150, produced by Nikkiso Co., Ltd.), was 76 nm.

Preparation Example 6

—Preparation of Carbon Black Pigment-containing Polymer Fine Particle Dispersion Liquid—

A carbon black pigment-containing polymer fine particle dispersion liquid was prepared in the same manner as in Preparation Example 3, except that the C. I. Pigment Red 122 as a pigment was changed to carbon black (FW100, produced by Degussa GmbH).

The average particle diameter ($D_5O$) of polymer fine particles in the obtained carbon black pigment-containing polymer fine particle dispersion liquid, measured using a particle size distribution measuring apparatus (NANOTRAC UPA-EX150, produced by Nikkiso Co., Ltd.), was 104 nm.

Preparation Example 7

—Preparation of Yellow Pigment Surfactant Dispersion Liquid—

Monoazo yellow pigment: 30.0 parts by mass
(C. I. Pigment Yellow 74, produced by Dainichiseika Color & Chemicals Mfg. Co., Ltd.)
Polyoxyethylene styrenephenylether: 10.0 parts by mass
(nonionic surfactant, NOIGEN EA-177, HLB value=15.7, produced by Dai-ichi Kogyo Seiyaku Co., Ltd.)
Ion-exchange water: 60.0 parts by mass First, the surfactant was dissolved in the ion-exchange water, and the pigment was mixed therewith such that it was sufficiently wetted. Then, zirconia beads having a diameter of 0.5 mm were supplied to a wet dispersing device (DYNO-MILL KDL Model A, produced by WAB (Willy A. Bachofen AG)) and dispersed at 2,000 rpm for 2 hours, and a primary pigment dispersion was thus obtained.

Second, 4.26 parts by mass of a water-soluble polyurethane resin (TAKELAC W-5661, active ingredient: 35.2% by mass, acid value: 40 mgKOH/g, molecular weight: 18,000, produced by Mitsui Takeda Chemicals, Inc.) was added as a water-soluble polymeric compound aqueous solution to the primary pigment dispersion, the mixture was sufficiently stirred, and a yellow pigment surfactant dispersion liquid was thus obtained. The average particle diameter ($D_m$) of pigment dispersoids in the obtained yellow pigment surfactant dispersion liquid measured 62 nm. Additionally, the average particle diameter ($D_m$) was measured using a particle size distribution analyzer (NANOTRAC UPA-EX150, produced by Nikkiso Co., Ltd.).

Preparation Example 8

—Preparation of Magenta Pigment Surfactant Dispersion Liquid—
Quinacridone pigment: 30.0 parts by mass
(C. I. Pigment Red 122, produced by Dainichiseika Color & Chemicals Mfg. Co., Ltd.)
Polyoxyethylene β-naphthylether: 10.0 parts by mass
(nonionic surfactant, RT-100, HLB value=18.5, produced by Takemoto Oil & Fat Co., Ltd.)
Ion-exchange water: 60.0 parts by mass
First, the surfactant was dissolved in the ion-exchange water, and the pigment was mixed therewith such that it was sufficiently wetted. Then, zirconia beads having a diameter of 0.5 mm were supplied to a wet dispersing device (DYNO-MILL KDL Model A, produced by WAB (Willy A. Bachofen AG)) and dispersed at 2,000 rpm for 2 hours, and a primary pigment dispersion was thus obtained.

Second, 7.14 parts by mass of a water-soluble styrene-(meth)acrylic copolymer (JC-05, active ingredient: 21% by mass, acid value: 170 mgKOH/g, weight average molecular weight: 16,000, produced by Seiko PMC Corporation) was added to the primary pigment dispersion, the mixture was sufficiently stirred, and a magenta pigment surfactant dispersion liquid was thus obtained. The average particle diameter ($D_{50}$) of pigment dispersoids in the obtained magenta pigment surfactant dispersion liquid measured 83 nm. Additionally, the average particle diameter ($D_{50}$) was measured using a particle size distribution analyzer (NANOTRAC UPA-EX150, produced by Nikkiso Co., Ltd.).

Preparation Example 9

—Preparation of Cyan Pigment Surfactant Dispersion Liquid A—
Phthalocyanine pigment: 30.0 parts by mass
(C. I. Pigment Blue 15:3, produced by Dainichiseika Color & Chemicals Mfg. Co., Ltd.)
Polyoxyethylene styrenephenylether: 10.0 parts by mass
(nonionic surfactant, NOIGEN EA-177, HLB value=15.7, produced by Dai-ichi Kogyo Seiyaku Co., Ltd.)
Ion-exchange water: 60.0 parts by mass
First, the surfactant was dissolved in the ion-exchange water, and the pigment was mixed therewith such that it was sufficiently wetted. Then, zirconia beads having a diameter of 0.5 mm were supplied to a wet dispersing device (DYNO-MILL KDL Model A, produced by WAB (Willy A. Bachofen AG)) and dispersed at 2,000 rpm for 2 hours, and a primary pigment dispersion was thus obtained.

Second, 7.51 parts by mass of the water-soluble polymeric compound aqueous solution A of Preparation Example 1 and 2.51 parts by mass of a water-soluble polyester resin (NICHIGO POLYESTER W-0030, active ingredient: 29.9% by mass, acid value: 100 mgKOH/g, weight average molecular weight: 7,000, produced by Nippon Synthetic Chemical Industry Co., Ltd.) were added to the primary pigment dispersion, the mixture was sufficiently stirred, and a cyan pigment surfactant dispersion liquid A was thus obtained. The average particle diameter (DO of pigment dispersoids in the obtained cyan pigment surfactant dispersion liquid A measured 78 nm. Additionally, the average particle diameter ($D_{50}$) was measured using a particle size distribution analyzer (NANOTRAC UPA-EX150, produced by Nikkiso Co., Ltd.).

Example 1

—Preparation of Inkjet Ink—
The ingredients shown in Table 2-1 were used to prepare an inkjet ink of Example 1. Specifically, 10.00 parts by mass of the amide compound produced in Production Example 1 and having a structure expressed by the formula (I), 10.00 parts by mass of the compound having a structure expressed by the above formula (II), 10.00 parts by mass of glycerin, 10.00 parts by mass of 1.3-butanediol, 2.00 parts by mass of 2-ethyl-1,3-hexanediol serving as a penetrant, 1.25 parts by mass of ZONYL FS-300 serving as a surfactant (see the below Note 4) and 0.10 parts by mass of a silicone defoamer serving as a defoamer were mixed together, and the resultant mixture was stirred for 1 hour and homogeneously mixed.

To the obtained mixture were added 0.05 parts by mass of PROXEL GXL (see the below Note 6) serving as an antifungal agent, 0.3 parts by mass of 2-amino-2-ethyl-1,3-propanediol serving as a pH adjuster, and purified water as balance in such an amount that the total amount of the ink became 100 parts by mass. After stirred for 1 hour, the resultant mixture was mixed with 50.00 parts by mass of the black pigment-containing polymer dispersion liquid prepared in Preparation Example 6 serving as a pigment dispersion, followed by stirring for 1 hour. The resultant mixture was filtrated with application of pressure using a polyvinylidene fluoride membrane filter of 0.8 μM in average pore diameter to remove coarse particles and dust therefrom, whereby an inkjet ink of Example 1 was produced.

Examples 2 to 19 and Comparative Examples 1 to 12

—Production of Inkjet Inks—
Inkjet inks of Examples 2 to 19 and Comparative Examples 1 to 12 were produced in the same manner as in Example 1 except that the ingredients shown in Tables 2-1 to 2-7 were mixed and stirred.

TABLE 2-1

| | Ingredients (% by mass) | Ex. 1 | Ex. 2 | Ex. 3 | Ex. 4 | Ex. 5 |
|---|---|---|---|---|---|---|
| Pigment Disperion Liquid | Surface-treated Black Pigment Dispersion Liquid (PE 2) | — | — | — | — | — |
| | Magenta Pigment-containing Polymer Fine Particle Dispersion Liquid (PE 3) | — | — | — | — | — |

TABLE 2-1-continued

| | Ingredients (% by mass) | Ex. 1 | Ex. 2 | Ex. 3 | Ex. 4 | Ex. 5 |
|---|---|---|---|---|---|---|
| | Cyan Pigment-containing Polymer Fine Particle Dispersion Liquid (PE 4) | — | — | — | — | — |
| | Yellow Pigment-containing Polymer Fine Particle Dispersion Liquid (PE 5) | — | — | — | — | — |
| | Black Pigment-containing Polymer Fine Particle Dispersion Liquid (PE 6) | 50.00 | 50.00 | 50.00 | 50.00 | 50.00 |
| | Yellow Pigment Surfactant Dispersion Liquid (PE 7) | — | — | — | — | — |
| | Magenta Pigment Surfactant Dispersion Liquid (PE 8) | — | — | — | — | — |
| | Cyan Pigment Surfactant Dispersion Liquid (PE 9) | — | — | — | — | — |
| Water-Dispersible Resin | Acrylic-Silicone Resin Emulsion | — | — | — | — | — |
| | Polyurethane Emulsion | — | — | — | — | — |
| Organic Solvent | Amide Compound of Formula (I) | 10.00 | 10.00 | 10.00 | 10.00 | 10.00 |
| | Compound of Formula (II) | 10.00 | — | — | — | — |
| | Compound of Formula (III) | — | 10.00 | — | — | — |
| | Compound of GF (I) (10 carbon atoms) | — | — | 10.00 | — | — |
| | Compound of GF (I) (14 carbon atoms) | — | — | — | 10.00 | — |
| | Compound of GF (I) (16 carbon atoms) | — | — | — | — | 10.00 |
| | Compound of GF (I) (18 carbon atoms) | — | — | — | — | — |
| | Amide Compound of Formula (IV) | — | — | — | — | — |
| | 2-Methyl-1,3-Propanediol | — | — | — | — | — |
| | 3-Methyl-1,3-Butanediol | — | — | — | — | — |
| | 3-Methyl-1,5-Pentanediol | — | — | — | — | — |
| | Propylene Glycol | — | — | — | — | — |
| | Glycerin | 10.00 | 10.00 | 10.00 | 10.00 | 10.00 |
| | 1,3-Butanediol | 10.00 | 10.00 | 10.00 | 10.00 | 10.00 |
| Penetrant | 2-Ethyl-1,3-Hexanediol | 2.00 | 2.00 | 2.00 | 2.00 | 2.00 |
| | 2,2,4-Trimethyl-1,3-Pentanediol | — | — | — | — | — |
| Surfactant | KF-643 | — | — | — | — | — |
| | ZONYL FS-300 | 1.25 | 1.25 | 1.25 | 1.25 | 1.25 |
| | SOFTANOL EP-7025 | — | — | — | — | — |
| Antifungal Agent | PROXEL GXL | 0.05 | 0.05 | 0.05 | 0.05 | 0.05 |
| Defoamer | Silicone Defoamer KM-72F | 0.10 | 0.10 | 0.10 | 0.10 | 0.10 |
| pH Adjuster | 2-Amino-2-Ethyl-1,3-Propanediol | 0.3 | 0.3 | 0.3 | 0.3 | 0.3 |
| | Purified Water | Balance | Balance | Balance | Balance | Balance |
| | Total (% by mass) | 100 | 100 | 100 | 100 | 100 |

TABLE 2-2

| | Ingredients (% by mass) | Ex. 6 | Ex. 7 | Ex. 8 | Ex. 9 | Ex. 10 |
|---|---|---|---|---|---|---|
| Pigment Disperion Liquid | Surface-treated Black Pigment Dispersion Liquid (PE 2) | — | — | — | 30.00 | — |
| | Magenta Pigment-containing Polymer Fine Particle Dispersion Liquid (PE 3) | — | — | — | — | 53.33 |
| | Cyan Pigment-containing Polymer Fine Particle Dispersion Liquid (PE 4) | — | — | — | — | — |
| | Yellow Pigment-containing Polymer Fine Particle Dispersion Liquid (PE 5) | — | — | — | — | — |
| | Black Pigment-containing Polymer Fine Particle Dispersion Liquid (PE 6) | 50.00 | 50.00 | 50.00 | — | — |
| | Yellow Pigment Surfactant Dispersion Liquid (PE 7) | — | — | — | — | — |
| | Magenta Pigment Surfactant Dispersion Liquid (PE 8) | — | — | — | — | — |
| | Cyan Pigment Surfactant Dispersion Liquid (PE 9) | — | — | — | — | — |
| Water-Dispersible Resin | Acrylic-Silicone Resin Emulsion | — | — | — | — | — |
| | Polyurethane Emulsion | — | — | — | — | — |
| Organic Solvent | Amide Compound of Formula (I) | 10.00 | 10.00 | 10.00 | 20.00 | 30.00 |
| | Compound of Formula (II) | 10.00 | 10.00 | 10.00 | — | — |
| | Compound of Formula (III) | — | — | — | — | 5.00 |
| | Compound of GF (I) (10 carbon atoms) | — | — | — | — | — |
| | Compound of GF (I) (14 carbon atoms) | — | — | — | — | — |
| | Compound of GF (I) (16 carbon atoms) | — | — | — | 10.00 | — |
| | Compound of GF (I) (18 carbon atoms) | — | — | — | — | — |

TABLE 2-2-continued

| | Ingredients (% by mass) | Ex. 6 | Ex. 7 | Ex. 8 | Ex. 9 | Ex. 10 |
|---|---|---|---|---|---|---|
| | Amide Compound of Formula (IV) | 5.00 | — | 5.00 | 5.00 | 5.00 |
| | 2-Methyl-1,3-Propanediol | — | 10.00 | 10.00 | — | — |
| | 3-Methyl-1,3-Butanediol | — | — | — | — | — |
| | 3-Methyl-1,5-Pentanediol | — | — | — | — | — |
| | Propylene Glycol | — | — | — | — | — |
| | Glycerin | 10.00 | 10.00 | 10.00 | 10.00 | 10.00 |
| | 1,3-Butanediol | 10.00 | 10.00 | — | — | — |
| Penetrant | 2-Ethyl-1,3-Hexanediol | 2.00 | 2.00 | 2.00 | — | 1.00 |
| | 2,2,4-Trimethyl-1,3-Pentanediol | — | — | — | 2.00 | 1.00 |
| Surfactant | KF-643 | — | — | — | — | — |
| | ZONYL FS-300 | 1.25 | 1.25 | 1.25 | 1.25 | 1.25 |
| | SOFTANOL EP-7025 | — | — | — | — | — |
| Antifungal Agent | PROXEL GXL | 0.05 | 0.05 | 0.05 | 0.05 | 0.05 |
| Defoamer | Silicone Defoamer KM-72F | 0.10 | 0.10 | 0.10 | 0.10 | 0.10 |
| pH Adjuster | 2-Amino-2-Ethyl-1,3-Propanediol | 0.3 | 0.3 | 0.3 | 0.3 | 0.3 |
| | Purified Water | Balance | Balance | Balance | Balance | Balance |
| | Total (% by mass) | 100 | 100 | 100 | 100 | 100 |

TABLE 2-3

| | Ingredients (% by mass) | Ex. 11 | Ex. 12 | Ex. 13 | Ex. 14 | Ex. 15 |
|---|---|---|---|---|---|---|
| Pigment Dispersion Liquid | Surface-treated Black Pigment Dispersion Liquid (PE 2) | — | — | — | — | — |
| | Magenta Pigment-containing Polymer Fine Particle Dispersion Liquid (PE 3) | — | — | — | — | — |
| | Cyan Pigment-containing Polymer Fine Particle Dispersion Liquid (PE 4) | 33.33 | — | — | — | — |
| | Yellow Pigment-containing Polymer Fine Particle Dispersion Liquid (PE 5) | — | 33.33 | — | — | — |
| | Black Pigment-containing Polymer Fine Particle Dispersion Liquid (PE 6) | — | — | — | — | — |
| | Yellow Pigment Surfactant Dispersion Liquid (PE 7) | — | — | 13.90 | — | — |
| | Magenta Pigment Surfactant Dispersion Liquid (PE 8) | — | — | — | 28.57 | — |
| | Cyan Pigment Surfactant Dispersion Liquid (PE 9) | — | — | — | — | 14.67 |
| Water-Dispersible Resin | Acrylic-Silicone Resin Emulsion | — | — | 5.38 | 5.38 | — |
| | Polyurethane Emulsion | — | — | — | — | 4.44 |
| Organic Solvent | Amide Compound of Formula (I) | 10.00 | 10.00 | 7.50 | 7.50 | 7.50 |
| | Compound of Formula (II) | — | 10.00 | — | — | — |
| | Compound of Formula (III) | 7.50 | — | — | — | — |
| | Compound of GF (I) (10 carbon atoms) | — | — | 12.50 | — | — |
| | Compound of GF (I) (14 carbon atoms) | — | — | — | 12.50 | — |
| | Compound of GF (I) (16 carbon atoms) | — | — | — | — | 12.50 |
| | Compound of GF (I) (18 carbon atoms) | — | — | — | — | — |
| | Amide Compound of Formula (IV) | 10.00 | 10.00 | 7.50 | 7.50 | 7.50 |
| | 2-Methyl-1,3-Propanediol | — | 10.00 | — | — | — |
| | 3-Methyl-1,3-Butanediol | — | — | — | — | — |
| | 3-Methyl-1,5-Pentanediol | — | — | 12.50 | 7.50 | 12.50 |
| | Propylene Glycol | — | — | — | — | — |
| | Glycerin | 10.00 | 10.00 | 10.00 | 10.00 | 10.00 |
| | 1,3-Butanediol | — | — | — | — | — |
| Penetrant | 2-Ethyl-1,3-Hexanediol | 2.00 | 2.00 | 2.00 | 2.00 | 2.00 |
| | 2,2,4-Trimethyl-1,3-Pentanediol | — | — | — | — | — |
| Surfactant | KF-643 | 1.00 | 1.00 | 1.00 | 1.00 | 1.00 |
| | ZONYL FS-300 | — | — | — | — | — |
| | SOFTANOL EP-7025 | — | — | — | — | — |
| Antifungal Agent | PROXEL GXL | 0.05 | 0.05 | 0.05 | 0.05 | 0.05 |
| Defoamer | Silicone Defoamer KM-72F | 0.10 | 0.10 | 0.10 | 0.10 | 0.10 |
| pH Adjuster | 2-Amino-2-Ethyl-1,3-Propanediol | 0.3 | 0.3 | 0.3 | 0.3 | 0.3 |
| | Purified Water | Balance | Balance | Balance | Balance | Balance |
| | Total (% by mass) | 100 | 100 | 100 | 100 | 100 |

TABLE 2-4

| | Ingredients (% by mass) | Ex. 16 | Ex. 17 | Ex. 18 | Ex. 19 |
|---|---|---|---|---|---|
| Pigment Disperion Liquid | Surface-treated Black Pigment Dispersion Liquid (PE 2) | 30.00 | — | — | — |
| | Magenta Pigment-containing Polymer Fine Particle Dispersion Liquid (PE 3) | — | — | — | — |
| | Cyan Pigment-containing Polymer Fine Particle Dispersion Liquid (PE 4) | — | — | — | — |
| | Yellow Pigment-containing Polymer Fine Particle Dispersion Liquid (PE 5) | — | — | — | — |
| | Black Pigment-containing Polymer Fine Particle Dispersion Liquid (PE 6) | — | — | 50.00 | 50.00 |
| | Yellow Pigment Surfactant Dispersion Liquid (PE 7) | — | — | — | — |
| | Magenta Pigment Surfactant Dispersion Liquid (PE 8) | — | — | — | — |
| | Cyan Pigment Surfactant Dispersion Liquid (PE 9) | — | 14.67 | — | — |
| Water-Dispersible Resin | Acrylic-Silicone Resin Emulsion | 5.38 | — | — | — |
| | Polyurethane Emulsion | — | 4.44 | — | — |
| Organic Solvent | Amide Compound of Formula (I) | 5.00 | 10.00 | 10.00 | 10.00 |
| | Compound of Formula (II) | 5.00 | — | — | 10.00 |
| | Compound of Formula (III) | 5.00 | 3.00 | — | — |
| | Compound of GF (I) (10 carbon atoms) | — | — | — | — |
| | Compound of GF (I) (14 carbon atoms) | — | — | — | — |
| | Compound of GF (I) (16 carbon atoms) | — | — | — | — |
| | Compound of GF (I) (18 carbon atoms) | — | — | 10.00 | — |
| | Amide Compound of Formula (IV) | 7.50 | 50.00 | — | — |
| | 2-Methyl-1,3-Propanediol | — | — | — | — |
| | 3-Methyl-1,3-Butanediol | 7.50 | — | — | — |
| | 3-Methyl-1,5-Pentanediol | — | — | — | — |
| | Propylene Glycol | — | — | — | — |
| | Glycerin | 10.00 | 10.00 | 10.00 | 10.00 |
| | 1,3-Butanediol | — | — | 10.00 | 10.00 |
| Penetrant | 2-Ethyl-1,3-Hexanediol | 2.00 | — | 2.00 | — |
| | 2,2,4-Trimethyl-1,3-Pentanediol | — | 2.00 | — | — |
| Surfactant | KF-643 | — | — | — | — |
| | ZONYL FS-300 | 2.50 | — | 1.25 | 1.25 |
| | SOFTANOL EP-7025 | — | 0.05 | — | — |
| Antifungal Agent | PROXEL GXL | 0.05 | 0.05 | 0.05 | 0.05 |
| Defoamer | Silicone Defoamer KM-72F | 0.10 | 0.10 | 0.10 | 0.10 |
| pH Adjuster | 2-Amino-2-Ethyl-1,3-Propanediol | 0.3 | 0.3 | 0.3 | 0.3 |
| | Purified Water | Balance | Balance | Balance | Balance |
| | Total (% by mass) | 100 | 100 | 100 | 100 |

TABLE 2-5

| | Ingredients (% by mass) | Com. Ex. 1 | Com. Ex. 2 | Com. Ex. 3 | Com. Ex. 4 | Com. Ex. 5 |
|---|---|---|---|---|---|---|
| Pigment Disperion Liquid | Surface-treated Black Pigment Dispersion Liquid (PE 2) | — | 26.67 | 30.00 | — | — |
| | Magenta Pigment-containing Polymer Fine Particle Dispersion Liquid (PE 3) | — | — | — | — | — |
| | Cyan Pigment-containing Polymer Fine Particle Dispersion Liquid (PE 4) | — | — | — | — | — |
| | Yellow Pigment-containing Polymer Fine Particle Dispersion Liquid (PE 5) | — | — | — | — | — |
| | Black Pigment-containing Polymer Fine Particle Dispersion Liquid (PE 6) | 50.00 | — | — | 55.33 | 50.00 |
| | Yellow Pigment Surfactant Dispersion Liquid (PE 7) | — | — | — | — | — |
| | Magenta Pigment Surfactant Dispersion Liquid (PE 8) | — | — | — | — | — |
| | Cyan Pigment Surfactant Dispersion Liquid (PE 9) | — | — | — | — | — |
| Water-Dispersible Resin | Acrylic-Silicone Resin Emulsion | — | — | — | — | — |
| | Polyurethane Emulsion | — | — | — | — | — |
| Organic Solvent | Amide Compound of Formula (I) | — | — | — | — | 10.00 |
| | Compound of Formula (II) | — | — | — | — | — |

TABLE 2-5-continued

| | Ingredients (% by mass) | Com. Ex. 1 | Com. Ex. 2 | Com. Ex. 3 | Com. Ex. 4 | Com. Ex. 5 |
|---|---|---|---|---|---|---|
| | Compound of Formula (III) | — | — | — | — | — |
| | Compound of GF (I) (10 carbon atoms) | — | — | — | — | — |
| | Compound of GF (I) (14 carbon atoms) | — | — | — | — | — |
| | Compound of GF (I) (16 carbon atoms) | — | — | — | — | — |
| | Compound of GF (I) (18 carbon atoms) | — | — | — | — | — |
| | Amide Compound of Formula (IV) | — | 10.00 | — | — | — |
| | 2-Methyl-1,3-Propanediol | — | 5.00 | 7.50 | 27.50 | — |
| | 3-Methyl-1,3-Butanediol | — | — | — | — | — |
| | 3-Methyl-1,5-Pentanediol | — | — | — | — | — |
| | Propylene Glycol | — | — | — | 5.00 | — |
| | Glycerin | 17.50 | 20.00 | 30.00 | — | 20.00 |
| | 1,3-Butanediol | 17.50 | 5.00 | 15.00 | 10.00 | 17.50 |
| Penetrant | 2-Ethyl-1,3-Hexanediol | 2.00 | 2.00 | 1.00 | — | 2.00 |
| | 2,2,4-Trimethyl-1,3-Pentanediol | — | — | — | — | — |
| Surfactant | KF-643 | — | — | — | 1.00 | — |
| | ZONYL FS-300 | 2.50 | 2.50 | 1.25 | — | 2.50 |
| | SOFTANOL EP-7025 | — | — | — | — | — |
| Antifungal Agent | PROXEL GXL | 0.05 | 0.05 | 0.05 | 0.05 | 0.05 |
| Defoamer | Silicone Defoamer KM-72F | 0.10 | 0.10 | 0.10 | 0.10 | 0.10 |
| pH Adjuster | 2-Amino-2-Ethyl-1,3-Propanediol | 0.3 | 0.3 | 0.3 | 0.3 | 0.3 |
| | Purified Water | Balance | Balance | Balance | Balance | Balance |
| | Total (% by mass) | 100 | 100 | 100 | 100 | 100 |

TABLE 2-6

| | Ingredients (% by mass) | Com. Ex. 6 | Com. Ex. 7 | Com. Ex. 8 | Com. Ex. 9 |
|---|---|---|---|---|---|
| Pigment Disperion Liquid | Surface-treated Black Pigment Dispersion Liquid (PE 2) | — | — | — | — |
| | Magenta Pigment-containing Polymer Fine Particle Dispersion Liquid (PE 3) | — | — | — | — |
| | Cyan Pigment-containing Polymer Fine Particle Dispersion Liquid (PE 4) | — | — | — | — |
| | Yellow Pigment-containing Polymer Fine Particle Dispersion Liquid (PE 5) | — | — | — | — |
| | Black Pigment-containing Polymer Fine Particle Dispersion Liquid (PE 6) | 50.00 | 50.00 | 50.00 | 50.00 |
| | Yellow Pigment Surfactant Dispersion Liquid (PE 7) | — | — | — | — |
| | Magenta Pigment Surfactant Dispersion Liquid (PE 8) | — | — | — | — |
| | Cyan Pigment Surfactant Dispersion Liquid (PE 9) | — | — | — | — |
| Water-Dispersible Resin | Acrylic-Silicone Resin Emulsion | — | — | — | — |
| | Polyurethane Emulsion | — | — | — | — |
| Organic Solvent | Amide Compound of Formula (I) | — | — | — | — |
| | Compound of Formula (II) | 10.00 | — | — | — |
| | Compound of Formula (III) | — | 10.00 | — | — |
| | Compound of GF (I) (10 carbon atoms) | — | — | 10.00 | — |
| | Compound of GF (I) (14 carbon atoms) | — | — | — | — |
| | Compound of GF (I) (16 carbon atoms) | — | — | — | — |
| | Compound of GF (I) (18 carbon atoms) | — | — | — | — |
| | Amide Compound of Formula (IV) | — | — | — | — |
| | 2-Methyl-1,3-Propanediol | — | — | — | — |
| | 3-Methyl-1,3-Butanediol | — | — | — | 22.00 |
| | 3-Methyl-1,5-Pentanediol | — | — | — | — |
| | Propylene Glycol | — | — | — | — |
| | Glycerin | 20.00 | 20.00 | 20.00 | 22.00 |
| | 1,3-Butanediol | 17.50 | 17.50 | 17.50 | — |
| Penetrant | 2-Ethyl-1,3-Hexanediol | 2.00 | 2.00 | 2.00 | 2.00 |
| | 2,2,4-Trimethyl-1,3-Pentanediol | — | — | — | — |
| Surfactant | KF-643 | — | — | — | — |
| | ZONYL FS-300 | 2.50 | 2.50 | 2.50 | 2.50 |
| | SOFTANOL EP-7025 | — | — | — | — |
| Antifungal Agent | PROXEL GXL | 0.05 | 0.05 | 0.05 | 0.05 |

TABLE 2-6-continued

| Ingredients (% by mass) | | Com. Ex. 6 | Com. Ex. 7 | Com. Ex. 8 | Com. Ex. 9 |
|---|---|---|---|---|---|
| Defoamer | Silicone Defoamer KM-72F | 0.10 | 0.10 | 0.10 | 0.10 |
| pH Adjuster | 2-Amino-2-Ethyl-1,3-Propanediol | 0.3 | 0.3 | 0.3 | 0.3 |
| | Purified Water | Balance | Balance | Balance | Balance |
| | Total (% by mass) | 100 | 100 | 100 | 100 |

TABLE 2-7

| Ingredients (% by mass) | | Com. Ex. 10 | Com. Ex. 11 | Com. Ex. 12 |
|---|---|---|---|---|
| Pigment Disperion Liquid | Surface-treated Black Pigment Dispersion Liquid (PE 2) | — | — | — |
| | Magenta Pigment-containing Polymer Fine Particle Dispersion Liquid (PE 3) | — | — | — |
| | Cyan Pigment-containing Polymer Fine Particle Dispersion Liquid (PE 4) | — | — | — |
| | Yellow Pigment-containing Polymer Fine Particle Dispersion Liquid (PE 5) | — | — | — |
| | Black Pigment-containing Polymer Fine Particle Dispersion Liquid (PE 6) | 50.00 | 50.00 | 50.00 |
| | Yellow Pigment Surfactant Dispersion Liquid (PE 7) | — | — | — |
| | Magenta Pigment Surfactant Dispersion Liquid (PE 8) | — | — | — |
| | Cyan Pigment Surfactant Dispersion Liquid (PE 9) | — | — | — |
| Water-Dispersible Resin | Acrylic-Silicone Resin Emulsion | — | — | — |
| | Polyurethane Emulsion | — | — | — |
| Organic Solvent | Amide Compound of Formula (I) | 10.00 | 10.00 | 10.00 |
| | Compound of Formula (II) | 10.00 | 10.00 | 10.00 |
| | Compound of Formula (III) | — | — | — |
| | Compound of GF (I) (10 carbon atoms) | — | — | — |
| | Compound of GF (I) (14 carbon atoms) | — | — | — |
| | Compound of GF (I) (16 carbon atoms) | — | — | — |
| | Compound of GF (I) (18 carbon atoms) | — | — | — |
| | Amide Compound of Formula (IV) | — | — | — |
| | 2-Methyl-1,3-Propanediol | — | — | — |
| | 3-Methyl-1,3-Butanediol | — | — | — |
| | 3-Methyl-1,5-Pentanediol | — | — | — |
| | Propylene Glycol | — | 20.00 | — |
| | Glycerin | — | — | 10.00 |
| | 1,3-Butanediol | — | — | 10.00 |
| Penetrant | 2-Ethyl-1,3-Hexanediol | 2.00 | 2.00 | 2.00 |
| | 2,2,4-Trimethyl-1,3-Pentanediol | — | — | — |
| Surfactant | KF-643 | — | — | — |
| | ZONYL FS-300 | 1.25 | 1.25 | — |
| | SOFTANOL EP-7025 | — | — | — |
| Antifungal Agent | PROXEL GXL | 0.05 | 0.05 | 0.05 |
| Defoamer | Silicone Defoamer KM-72F | 0.10 | 0.10 | 0.10 |
| pH Adjuster | 2-Amino-2-Ethyl-1,3-Propanediol | 0.3 | 0.3 | 0.3 |
| | Purified Water | Balance | Balance | Balance |
| | Total (% by mass) | 100 | 100 | 100 |

The abbreviations in Tables 2-1 to 2-7 have the following meanings.

Note 1*: Acrylic-Silicone Resin Emulsion: POLYSOL ROY6312, solid content=37.2% by mass, 171 nm in average particle diameter, minimum film-forming temperature (MFT)=20° C., produced by Showa Highpolymer Co., Ltd.

Note 2*: Polyurethane Emulsion: HYDRAN APX-101H, solid content=45% by mass, 160 nm in average particle diameter, minimum film-forming temperature (MFT)=20° C., produced by DIC Corporation Note 3*: KF-643: polyether-modified silicone compound (produced by Shin-Etsu Chemical Co., Ltd., ingredient: 100% by mass)

Note 4*: ZONYL FS-300: polyoxyethylene perfluoroalkylether (produced by E. I. du Pont de Nemours and Company, ingredient: 40% by mass)

Note 5*: SOFTANOL EP-7025: polyoxyalkylene alkyl ether (produced by Nippon Shokubai Co., Ltd., ingredient: 100% by mass)

Note 6*: Proxel GXL: antifungal agent containing 1,2-benzisothiazolin-3-one as a main component (produced by Avecia Biologics Limited, ingredient: 20% by mass, with dipropylene glycol contained)

Note 7*: KM-72F: self-emulsifying silicone defoamer (produced by Silicone Division of Shin-Etsu Chemical Co., Ltd., ingredient: 100% by mass)

In addition, the abbreviations "PE," "GF (I)" and "Com. Ex." mean "Preparation Example," "General Formula (I)" and "Comparative Example," respectively.

Next, each of the inkjet inks of Examples 1 to 19 and Comparative Examples 1 to 12 was evaluated with the below-described evaluation methods. The results are shown in Tables 3 and 4.

<Measurement of Ink Viscosity>

The viscosity of each ink was measured at 25° C. using a viscometer (RE-550L, produced by Toki Sangyo Co., Ltd.).

<Measurement of Surface Tension of Ink>

The surface tension of each ink was measured at 25° C. using an automatic surface tensiometer (CBVP-Z, produced by Kyowa Interface Science Co., Ltd.).

—Preparation of Printing Evaluation—

In an adjusted environment where the temperature was 23° C.±0.5° C. and the relative humidity was 50%±5%, the drive voltage of a piezoelectric element was changed such that the amount of ink ejected became uniform, using an inkjet printer (IPSIO GXe-5500, produced by Ricoh Company, Ltd.), and settings were made such that the same amount of ink was attached onto each recording medium (MYPAPER produced by Ricoh Company, Ltd.).

<Image Density>

A chart including a 64-point character "■", produced using MICROSOFT WORD 2000 (produced by Microsoft Corporation), was printed onto sheets of MYPAPER (produced by Ricoh Company, Ltd.), and the "■" portions on printing surfaces were measured for color by means of the densitometer X-Rite 938 (produced by X-Rite Co.) and judged according to the following evaluation criteria. The worst evaluation among the four colors of black, yellow, magenta and cyan is shown in Table 4. As for the printing mode, "Plain Paper—

Standard Speed" mode was changed to "No Color Correction" mode in user settings for plain paper by using a driver that accompanied a printer.

[Evaluation Criteria]

A: 1.20 or greater with respect to black, 0.80 or greater with respect to yellow, 1.00 or greater with respect to magenta, 1.00 or greater with respect to cyan B: 1.10 or greater but less than 1.20 with respect to black, 0.70 or greater but less than 0.80 with respect to yellow, 0.90 or greater but less than 1.00 with respect to magenta, 0.90 or greater but less than 1.00 with respect to cyan C: less than 1.10 with respect to black, less than 0.70 with respect to yellow, less than 0.90 with respect to magenta, less than 0.90 with respect to cyan <Color Saturation>

A chart was printed on MYPAPER (produced by Ricoh Company, Ltd.) in the same manner as in the evaluation test for image density, and the "■" portions on a printed surface were measured by X-Rite939 (produced by X-Rite Co.) and evaluated according to the following evaluation criteria. As for the printing mode, "Plain Paper—Standard Speed" mode was changed to "No Color Correction" mode in user settings for plain paper by using a driver that accompanied a printer. The ratio of the measured color saturation values and the color saturation values (yellow: 91.34, magenta: 74.55, cyan: 62.82) of the standard colors (Japan color ver. 2) was calculated, and the coloring ability was evaluated according to the following criteria. The worst evaluation among the three colors of yellow, magenta and cyan is shown in Table 4.

[Evaluation Criteria]

1) For yellow, A: 0.9 or higher; B: 0.8 or higher but lower than 0.9; C: lower than 0.8
2) For magenta, A: 0.8 or higher; B: 0.75 or higher but lower than 0.8; C: lower than 0.75
3) For cyan, A: 0.85 or higher, B: 0.8 or higher but lower than 0.85; C: lower than 0.8

<Evaluation of Curling>

Figure 7:
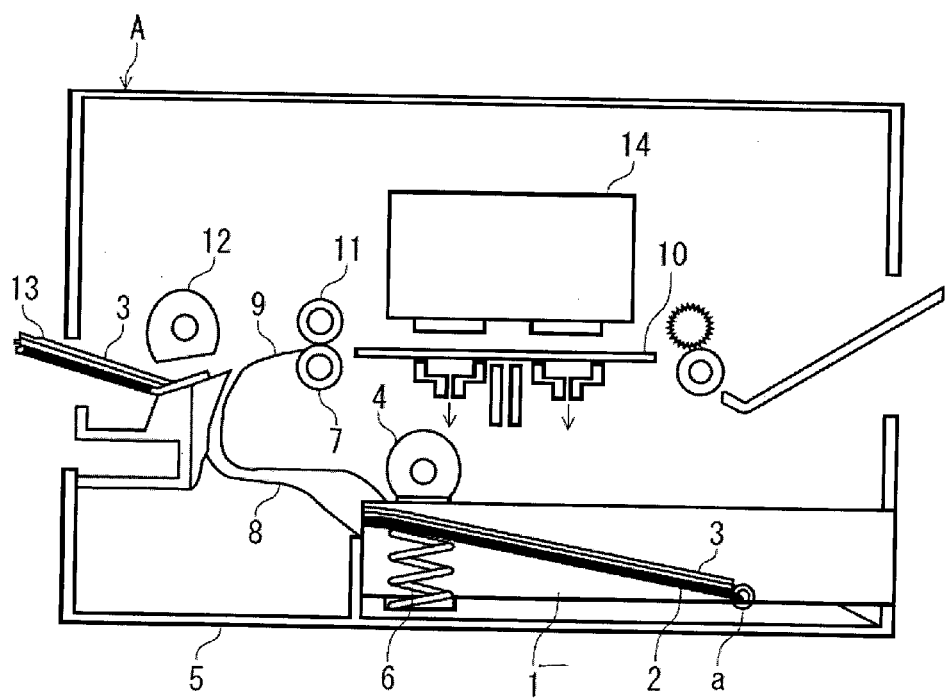
FIG. 7 is a schematic view of a prototype line head printing device used in the evaluation for curling in Examples.

A solid image was printed by means of the prototype line-head printer as illustrated in FIG. 7 under the following printing conditions, and the height of back curling (curl of the paper when the paper was placed on a flat desk with the printed surface facing down) of the printed paper just after printed (within 10 sec after discharged from the printer) and the height of the curling of the paper after the printed paper had been left for 1 day on a flat desk with the printed surface facing down were evaluated.

(1) Evaluation Printer: Prototype Line-Head Printer (See FIG. 7)

FIG. 7 is a schematic diagram illustrating an internal structure of the prototype line-head printing device (image recording device A).

The image recording device A has a paper feeding tray 1 having the structure that a pressure plate 2, and a paper feeding roller 4 for feeding recording paper 3 are mounted on a base 5.

The pressure plate 2 is rotatable around the rotational axis (a) mounted on the base 5, and pressed against the paper feeding roller 4 by a pressure plate spring 6.

A separation pad formed of a material having a large friction coefficient such as a synthetic leather is provided at the portion of the pressure plate 2 facing the paper feeding roller 4 to prevent feeding of multiple recording paper 3.

Moreover, a release cam is provided, and the release cam is configured to release the abutment of the paper feeding roller 4 on the pressure roller 2.

In the structure above, the pressure plate 2 is pressed down by the release cam to come into a certain position in the stand-by state, by which the abutment of the paper feeding roller 4 on the pressure roller 2 is released.

In this state, the release cam is released from the pressure plate 2 and the pressure plate 2 is lifted, as the driving force from the conveyance roller 7 is transmitted to the paper feeding roller 4 and release cam by a gear, to thereby abut the recording paper 3 on the paper feeding roller 4.

The recording paper 3 is picked up in accordance with the rotation of the paper feeding roller 4 to start feeding paper, and is separated one by one with a separation pawl.

The paper feeding roller 4 rotates to send the recording paper 3 to a platen 10 through the conveyance guides 8 and 9.

The recording paper 3 is passed through between the conveyance guides 8 and 9 to be guided to the conveyance roller 7, and is then conveyed to the platen 10 by the conveyance roller 7 and the pinching roller 11.

Thereafter, the device is again in the stand-by state where the abutment of the recording paper 3 on the paper feeding roller 4 is released, and the driving force from the conveyance roller 7 is disconnected.

The paper feeding roller for manual paper feeding 12 is to feed the recording paper 3 on a manual feeding tray 13 according to recording instruction signals given by a computer to thereby convey the recording paper 3 to the conveyance roller 7.

The recording paper 3 conveyed to the platen 10 is passed under a line-head 14.

Here, the conveyance speed of the recording paper and timing of droplets ejection are adjusted based on a signal controlled by an electric circuit to form an intended image.

(2) Evaluation Media: MYPAPER (PPC) produced by Ricoh Company, Ltd.

(3) Printing conditions: recording density of 118 dpc×236 dpc (300 dpi×600 dpi), printing area of 526.3 cm$^2$/A4, and ink ejection and deposition amount of 5.6 g/m$^2$ (4) Evaluation Environment: 23° C.±0.5° C., 50% RH±5% RH (5) Measurement of curl: Just after printing (within 10 sec after discharged from the printer) or after being left for 1 day, the A4 size recording medium was quietly placed on a flat desk with the curled face facing up, and the height of curl was measured by measuring the heights of the four corners of the recording medium with a JIS 1 scale, and obtaining the average value from the measured values from the four corners. When the recording medium significantly curled to form into a cylindrical shape, a diameter of the cylinder was measured.

[Evaluation Criteria]

The evaluation results were rated as the following four ranks.

A: less than 10 mm
B: 10 mm or more but less than 40 mm
C: 40 mm or more
D: Curled into a cylindrical shape <Ejection Stability>

A chart to be formed by painting 5% in area of A4 size paper with a solid image per color, produced using MICROSOFT WORD 2000 (produced by Microsoft Corporation), was continuously printed onto 200 sheets of MYPAPER (produced by Ricoh Company, Ltd.) and evaluations were performed based on ejection nonuniformity of each nozzle after the printing. As for the printing mode, "Plain Paper—Standard Speed" mode was changed to "No Color Correction" mode in user settings for plain paper by using a driver that accompanied a printer.

[Evaluation Criteria]
A: there was no ejection nonuniformity
B: there was a little ejection nonuniformity
C: there was ejection nonuniformity or there were parts where no ejection took place <Storage Stability of Ink>

The viscosity of the ink before storage, and the viscosity of the ink after being stored for 7 days at 70° C. in a sealed container were measured by a viscometer, and the degree of the storage stability was determined from the measured viscosities by the following equation. The results were evaluated according to the following evaluation criteria.

Ink storage stability (%)=[(viscosity after storage)/(viscosity before storage)]×100

[Evaluation Criteria]
A: 100%±10% or less
B: 100%±more than 10% but less than 20%
C: 100%±20% or more

TABLE 3

| | Initial values | | |
|---|---|---|---|
| | Viscosity (mPa·s) | pH | Surface tension (mN/m) |
| Ex. 1 | 13.5 | 9.5 | 26.6 |
| Ex. 2 | 13.7 | 9.3 | 26.2 |
| Ex. 3 | 13.2 | 9.6 | 26.1 |
| Ex. 4 | 13.4 | 9.5 | 26.5 |
| Ex. 5 | 13.6 | 9.4 | 26.7 |
| Ex. 6 | 13.9 | 9.8 | 26.2 |
| Ex. 7 | 15.6 | 9.3 | 25.7 |
| Ex. 8 | 14.2 | 9.7 | 25.8 |
| Ex. 9 | 12.2 | 8.8 | 26.6 |
| Ex. 10 | 15.0 | 9.2 | 25.4 |
| Ex. 11 | 13.3 | 9.3 | 22.9 |
| Ex. 12 | 13.1 | 9.2 | 22.6 |
| Ex. 13 | 11.5 | 9.0 | 22.4 |
| Ex. 14 | 11.9 | 9.2 | 22.7 |
| Ex. 15 | 11.7 | 9.1 | 22.8 |
| Ex. 16 | 8.2 | 9.3 | 24.6 |
| Ex. 17 | 17.2 | 9.5 | 31.9 |
| Ex. 18 | 13.9 | 9.4 | 26.8 |
| Ex. 19 | 13.1 | 9.5 | 26.7 |
| Comp. Ex. 1 | 8.4 | 9.1 | 25.4 |
| Comp. Ex. 2 | 8.9 | 9.2 | 26.2 |
| Comp. Ex. 3 | 20.5 | 9.2 | 26.8 |
| Comp. Ex. 4 | 26.7 | 9.3 | 22.9 |
| Comp. Ex. 5 | 13.5 | 9.5 | 25.2 |
| Comp. Ex. 6 | 15.9 | 9.6 | 25.3 |
| Comp. Ex. 7 | 16.2 | 9.4 | 25.2 |
| Comp. Ex. 8 | 17.0 | 9.3 | 25.5 |
| Comp. Ex. 9 | 15.1 | 9.8 | 25.4 |
| Comp. Ex. 10 | 8.8 | 9.4 | 24.9 |
| Comp. Ex. 11 | 14.4 | 9.5 | 26.7 |
| Comp. Ex. 12 | 13.4 | 9.7 | 38.6 |

TABLE 4

| | | | Curling | | | |
|---|---|---|---|---|---|---|
| | Image density | Color saturation | Just after printing | 1 day after printing | Ejection stability | Storage stability |
| Ex. 1 | A | — | B | A | B | A |
| Ex. 2 | A | — | B | A | B | A |
| Ex. 3 | A | — | B | A | B | B |
| Ex. 4 | A | — | B | A | B | B |
| Ex. 5 | A | — | B | A | B | B |
| Ex. 6 | A | — | B | A | A | A |
| Ex. 7 | A | — | A | A | B | A |
| Ex. 8 | A | — | A | A | A | A |
| Ex. 9 | A | — | A | A | A | A |
| Ex. 10 | A | A | A | A | B | B |
| Ex. 11 | A | A | B | A | A | A |
| Ex. 12 | A | A | A | A | A | A |
| Ex. 13 | A | A | A | A | A | A |
| Ex. 14 | A | A | A | A | A | B |
| Ex. 15 | A | A | A | A | A | A |
| Ex. 16 | A | — | C | A | A | A |
| Ex. 17 | A | A | A | A | A | A |
| Ex. 18 | A | — | B | A | B | B |
| Ex. 19 | A | — | B | A | B | A |
| Comp. Ex. 1 | B | — | D | B | A | A |
| Comp. Ex. 2 | B | — | D | B | A | A |
| Comp. Ex. 3 | A | — | D | B | B | B |
| Comp. Ex. 4 | * | * | * | * | C | C |
| Comp. Ex. 5 | B | — | D | B | A | A |
| Comp. Ex. 6 | B | — | D | B | A | A |
| Comp. Ex. 7 | B | — | D | B | A | A |
| Comp. Ex. 8 | B | — | D | B | C | B |
| Comp. Ex. 9 | B | — | D | B | A | A |
| Comp. Ex. 10 | A | — | C | B | C | A |
| Comp. Ex. 11 | A | — | B | A | C | B |
| Comp. Ex. 12 | C | — | B | A | B | A |

* The ink produced in Comparative Example 4 had high viscosity and could not form a clear printed image as formed with the other inks. Thus, the evaluations could not be performed.

Next, the inkjet ink (black) of Example 8 was used on the following recording papers (1) to (5) respectively, and image quality evaluations were performed in the following manner.

—Recording Paper (1)—
Commercially available paper (product name: AURORA COAT, basis weight=104.7 g/m$^2$, produced by Nippon Paper Industries Co., Ltd.)

—Recording Paper (2)—
POD GLOSS COAT, basis weight=100 g/m$^2$, produced by Oji Paper Company, Limited —Recording Paper (3)—
SPACE DX (gravure paper), basis weight=56.5 g/m$^2$, produced by Nippon Paper Industries Co., Ltd.

—Recording Paper (4)—
Commercially available inkjet matte coated paper (product name: SUPER FINE PAPER, produced by Seiko Epson Corporation)

—Recording Paper (5)—
Transparent polyester film (product name: LUMIRROR U10, 100 μm in thickness, produced by Toray Industries, Inc.)

The amount of purified water transferred was measured in the following manner, with respect to each of the recording papers (1) to (5). The results are shown in Table 5.

<Measurement of Transfer Amount of Purified Water by Dynamic Scanning Absorptometer>

The absorption curve of purified water was measured using a dynamic scanning absorptometer (Model: KS350D, produced by Kyowaseiko Corporation), with respect to each of the recording papers (1) to (5). The absorption curve was made as a straight line with a fixed inclination by plotting transfer amount (mL/m$^2$) against the square root of contact period (ms), and the values of the transfer amount after two different predetermined periods of time were measured by means of interpolation.

TABLE 5

| | Purified water | |
| --- | --- | --- |
| | At contact period of 100 ms | At contact period of 400 ms |
| Recording paper (1) | 2.8 | 3.4 |
| Recording paper (2) | 3.1 | 3.5 |
| Recording paper (3) | 9.9 | 21.5 |
| Recording paper (4) | 41.0 | 44.8 |
| Recording paper (5) | 0.1 | 0.1 |

<Image Quality Evaluation>

Using the inkjet ink (black) of Example 8 and the inkjet printer (IPSIO GXe-5500, produced by Ricoh Company, Ltd.), a chart to be formed by painting 5% in area of A4 size sheets of the recording papers (1) to (5) with a solid image was printed one by one for each evaluation. The printed black solid image was evaluated in the following manner for image qualities (beading, spur mark and glossiness) and drying property. The results are shown in Table 6.

<Beading>

The extent of beading (nonuniformity of density) at each black solid portion obtained was evaluated by visual observation. Evaluations with ranks were performed using a classification sample (rank: 1.0 (poor) to 5.0 (excellent)).

<Spur Mark>

The extent of offset smear that spread from each black solid portion to each background portion obtained, which was caused by a spur, was evaluated by visual observation. Evaluations with ranks were performed according to the following criteria.

Rank 1: spur mark was clearly visible
Rank 2: spur mark was barely visible
Rank 3: spur mark was none whatsoever <Glossiness>

The 60-degree glossiness of each black solid portion obtained was measured using a glossmeter (4501, produced by BYK-Gardener GmbH).

<Drying Property>

Six seconds after discharging of the printed product, filter paper was pressed against the black solid portion thereof, and the degree of stains transferred onto the filter paper was visually observed and evaluated according to the following evaluation criteria.

[Evaluation Criteria]
A: No stain transferred was observed.
B: Slight stain transferred was observed.
C: Stain transferred was observed.

TABLE 6

| | Beading | Spur mark | Glossiness | Drying property |
| --- | --- | --- | --- | --- |
| Recording paper (1) | 5.0 | 3.0 | 34.5 | B |
| Recording paper (2) | 4.0 | 3.0 | 26.9 | A |
| Recording paper (3) | 5.0 | 3.0 | 21.7 | A |
| Recording paper (4) | 5.0 | 3.0 | 1.5 | A |
| Recording paper (5) | 1.0 | 1.0 | Not measurable* | C |

*The glossiness of the recording paper (5) could not be measured because it did not dry.

The inkjet ink of the present invention can form an image excellent in quality to plain paper, particularly in image density, chromaticness and image durability such as water resistance and light resistance, is superior in drying rate and adaptability to high-speed printing, is excellent in ejection stability from a nozzle, and can perform high-quality image formation. Thus, it can suitably be used for an ink cartridge, an ink recorded matter, an inkjet recording apparatus and an inkjet recording method.

Furthermore, the inkjet ink causes less beading (nonuniformity of density), has superior drying properties and makes it possible to form images of high quality such as printing image quality, when general-purpose printing paper (a recording medium with low ink-absorbing ability, including a support, and a coating layer on at least one surface of the support, in which the amount of purified water transferred to the surface of the recording medium, which surface has the coating layer, at a contact period of 100 ms measured by a dynamic scanning absorptometer is 2 mL/m$^2$ to 35 mL/m$^2$ and the amount of purified water transferred to the surface of the recording medium, which surface has the coating layer, at a contact period of 400 ms measured by the dynamic scanning absorptometer is 3 mL/m$^2$ to 40 mL/m$^2$) is used.

The inkjet recording apparatus and the inkjet recording method of the present invention can be applied to a variety of types of recording based upon inkjet recording systems. For example, they can be particularly suitably applied to inkjet recording printers, facsimiles, copiers, printer/fax/copier complex machines, and so forth.

Embodiments of the present invention are as follows.

<1> An inkjet ink including:

water;

an organic solvent;

a surfactant; and a colorant, wherein the organic solvent contains the following (1), (2) and (3):

(1) at least one polyhydric alcohol having an equilibrium moisture content of 30% by mass or higher at a temperature of 23° C. and humidity of 80% RH;

(2) an amide compound expressed by the following Structural Formula (I);

(3) a compound expressed by the following Structural Formula (II), a compound expressed by the following Structural Formula (III), or a compound represented by the following General Formula (I), or any combination thereof:

Structural Formula (I)

$$\text{n-C}_4\text{H}_9-\text{O}-\overset{H_2}{C}-\overset{H_2}{C}-\overset{O}{\overset{\|}{C}}-\text{N}\begin{matrix}\text{CH}_3\\\text{CH}_3\end{matrix}$$

Structural Formula (II)

$$\text{H}_3\text{C}-\text{CH}_2-(\text{CH}_2)_n-\text{C}=\text{O}$$
(cyclic ketone structure as drawn)

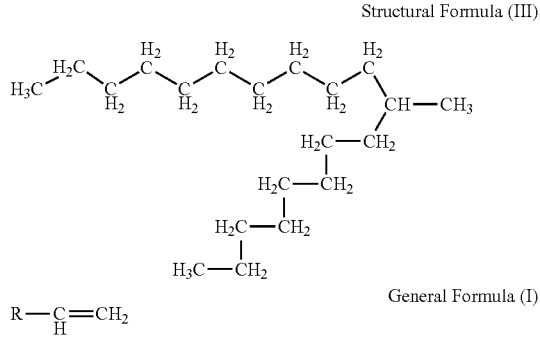

Structural Formula (III)

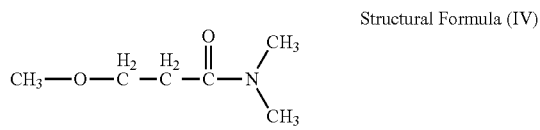

General Formula (I)

where in General Formula (I), R represents a C10-C18 alkyl group.

<2> The inkjet ink according to <1>, wherein the organic solvent further contains an amide compound expressed by the following Structural Formula (IV):

$$CH_3-O-\underset{H_2}{C}-\underset{H_2}{C}-\underset{\parallel}{\overset{O}{C}}-N\underset{CH_3}{\overset{CH_3}{\diagup}}$$

Structural Formula (IV)

<3> The inkjet ink according to <1> or <2>, wherein the organic solvent further contains at least one alkyl alkane diol containing a main chain of a C3-C6 alkane diol and a branched chain of C1-C2 alkyl.

<4> The inkjet ink according to <3>, wherein the alkyl alkane diol is 2-methyl-1,3-propanediol, 3-methyl-1,3-butanediol, or 3-methyl-1,5-pentanediol, or any combination thereof.

<5> The inkjet ink according to any one of <1> to <4>, wherein the polyhydric alcohol is glycerin, or 1,3-butanediol, or both thereof.

<6> The inkjet ink according to any one of <1> to <5>, wherein an amount of the amide compound expressed by Structural Formula (I) contained in the inkjet ink is 1% by mass to 50% by mass.

<7> The inkjet ink according to any one of <1> to <6>, wherein an amount of the organic solvent contained in the inkjet ink is 20% by mass to 80% by mass.

<8> The inkjet ink according to any one of <1> to <7>, wherein the surfactant is a fluorine-containing surfactant, or a silicone surfactant, or both thereof.

<9> The inkjet ink according to any one of <1> to <8>, wherein the colorant contains the following (1), (2) or (3):

(1) a pigment containing at least one hydrophilic group on a surface thereof and exhibiting water dispersibility in absence of a dispersant;

(2) a pigment dispersion containing a pigment, a pigment dispersant and a polymeric dispersion stabilizer;

(3) an aqueous dispersion of water-insoluble vinyl polymer particles containing a pigment.

<10> The inkjet ink according to any one of <1> to <9>, wherein the inkjet ink further contains a penetrant, and the penetrant contains at least one C8-C11 polyol compound.

<11> The inkjet ink according to any one of <1> to <10>, wherein the inkjet ink further contains a water-dispersible resin, and the water-dispersible resin is a polyurethane resin, or an acrylic-silicone resin, or both thereof.

<12> An inkjet recording apparatus including: an ink jetting unit configured to apply stimuli to the inkjet ink according to any one of <1> to <11> to make the inkjet ink jet, to thereby form an image on a recording medium.

<13> The inkjet recording apparatus according to <12>, wherein the recording medium includes:

a support; and a coating layer on at least one surface of the support, and wherein an amount of purified water transferred to a surface of the recording medium, which surface has the coating layer, at a contact period of 100 ms measured by a dynamic scanning absorptometer is 2 mL/m$^2$ to 35 mL/m$^2$ and an amount of purified water transferred to the surface of the recording medium, which surface has the coating layer, at a contact period of 400 ms measured by the dynamic scanning absorptometer is 3 mL/m$^2$ to 40 mL/m$^2$.

<14> An inkjet recording method including:

applying stimuli to the inkjet ink according to any one of <1> to <11> to make the inkjet ink jet, to thereby form an image on a recording medium.

<15> The inkjet recording method according to <14>, wherein the recording medium includes:

a support; and a coating layer on at least one surface of the support, and wherein the amount of purified water transferred to a surface of the recording medium, which surface has the coating layer, at a contact period of 100 ms measured by a dynamic scanning absorptometer is 2 mL/m$^2$ to 35 mL/m$^2$ and the amount of purified water transferred to the surface of the recording medium, which surface has the coating layer, at a contact period of 400 ms measured by the dynamic scanning absorptometer is 3 mL/m$^2$ to 40 mL/m$^2$.

REFERENCE SIGNS LIST

1 Paper feeding tray
2 Pressure plate
3 Recording paper
4 Paper feeding roller
5 Base
6 Pressure plate spring
7 Conveyance roller
8 Conveyance guide
9 Conveyance guide
10 Platen
11 Pinching roller
12 Paper feeding roller for manual paper feeding
13 Manual feeding tray
14 Line head
101 Apparatus main body
102 Paper feeding tray
103 Paper discharging tray
104 Ink cartridge loading section
111 Top cover
112 Front face
115 Front cover
131 Guide rod
132 Stay
133 Carriage
134 Recording head
135 Sub-tank
141 Paper loading section
142 Paper
144 Separation pad
151 Conveyance belt
152 Re-counter roller
156 Charging roller 157 Conveyance roller
158 Tension roller
171 Separation pawl
172 Paper discharge roller
173 Paper discharge small roller
181 Double-sided paper feed unit
201 Ink cartridge
241 Ink bag
242 Ink inlet
243 Ink outlet
244 Cartridge case
A Image recording apparatus
a Rotational axis

The invention claimed is:
1. An inkjet ink comprising:
water;
an organic solvent;
a surfactant; and
a colorant,
wherein the organic solvent comprises:
at least one polyhydric alcohol having an equilibrium moisture content of 30% by mass or higher at a temperature of 23° C. and humidity of 80% RH;
an amide compound expressed by Structural Formula (I); and
at least one compound having a formula selected from the group consisting of Structural Formula (II), Structural Formula (III), and General Formula (I):

Structural Formula (I)
n-C$_4$H$_9$—O—CH$_2$—CH$_2$—C(=O)—N(CH$_3$)$_2$

Structural Formula (II)
[structure of branched alkene]

Structural Formula (III)
[structure of branched alkane with CH—CH$_3$]

General Formula (I)
R—CH=CH$_2$ wherein R is a C10-C18 alkyl group.

2. The inkjet ink of claim 1, wherein the organic solvent further comprises an amide compound expressed by Structural Formula (IV):

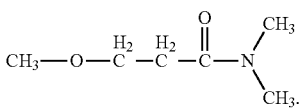

Structural Formula (IV)
CH$_3$—O—CH$_2$—CH$_2$—C(=O)—N(CH$_3$)$_2$.

3. The inkjet ink of claim 1, wherein the organic solvent further comprises at least one alkyl alkane diol comprising a main chain of a C3-C6 alkane diol and a branched chain of a C1-C2 alkyl.

4. The inkjet ink of claim 3, wherein the alkyl alkane diol is
2-methyl-1,3-propanediol;
3-methyl-1,3-butanediol; or
3-methyl-1,5-pentanediol; or
any combination thereof.

5. The inkjet ink of claim 1, wherein the polyhydric alcohol is glycerin; or
1,3-butanediol; or
any combination thereof.

6. The inkjet ink of claim 1, wherein the amide compound expressed by Structural Formula (I) contained in the inkjet ink is in the range of 1% by mass to 50% by mass.

7. The inkjet ink of claim 1, wherein the organic solvent present in the inkjet ink is 20% by mass to 80% by mass.

8. The inkjet ink of claim 1, wherein the surfactant is a fluorine-containing surfactant, or a silicone surfactant, or any combination thereof.

9. The inkjet ink of claim 1, wherein the colorant comprises:
a pigment containing at least one hydrophilic group on a surface thereof and exhibiting water dispersibility in absence of a dispersant;
a pigment dispersion containing a pigment, a pigment dispersant and a polymeric dispersion stabilizer; or
an aqueous dispersion of water-insoluble vinyl polymer particles comprising a pigment.

10. The inkjet ink of claim 1, wherein the inkjet ink further comprises a penetrant, and the penetrant comprises at least one C8-C11 polyol compound.

11. The inkjet ink of claim 1, wherein the inkjet ink further comprises:
a water-dispersible resin, wherein
the water-dispersible resin is a polyurethane resin, or an acrylic-silicone resin, or any combination thereof.

12. An inkjet recording apparatus comprising:
an ink jetting unit configured to apply stimuli to an inkjet ink to make the inkjet ink jet, to thereby form an image on a recording medium,
wherein the inkjet ink comprises:
water;
an organic solvent;
a surfactant; and
a colorant,
wherein the organic solvent comprises:
at least one polyhydric alcohol having an equilibrium moisture content of 30% by mass or higher at a temperature of 23° C. and humidity of 80% RH;
an amide compound expressed by the Structural Formula (I); and
at least one compound having a formula selected from the group consisting of Structural Formula (II), Structural Formula (III), and General Formula (I):

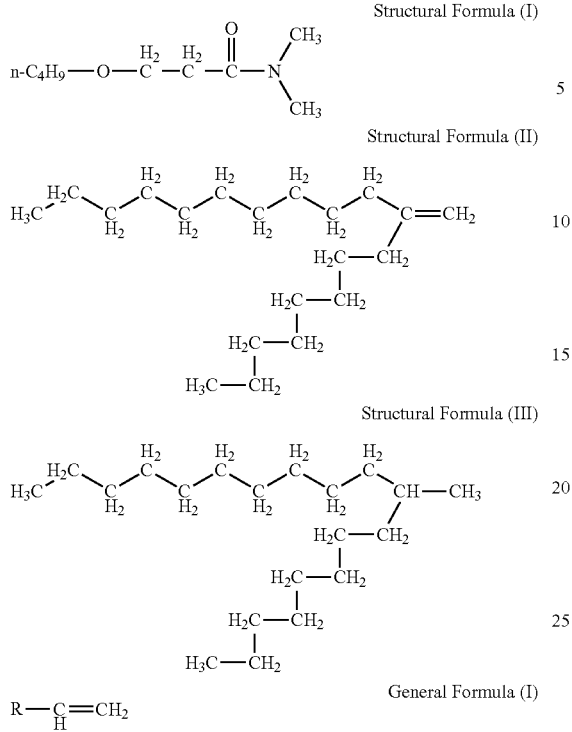

wherein R represents a C10-C18 alkyl group in General Formula (I).

13. The inkjet recording apparatus of claim 12, wherein the recording medium comprises:
a support; and
a coating layer on at least one surface of the support;
wherein an amount of purified water transferred to a surface of the recording medium, which surface has the coating layer, at a contact period of 100 ms measured by a dynamic scanning absorptometer is 2 mL/m² to 35 mL/m² and an amount of purified water transferred to the surface of the recording medium, which surface has the coating layer, at a contact period of 400 ms measured by the dynamic scanning absorptometer is 3 mL/m² to 40 mL/m².

14. An inkjet recording method comprising:
applying stimuli to an inkjet ink to make the inkjet ink jet, to form an image on a recording medium;
wherein the inkjet ink comprises:
water;
an organic solvent;
a surfactant; and
a colorant,
wherein the organic solvent comprises:
at least one polyhydric alcohol having an equilibrium moisture content of 30% by mass or higher at a temperature of 23° C. and humidity of 80% RH;
an amide compound expressed by Structural Formula (I); and
at least one compound having a formula selected from the group consisting of Structural Formula (II), Structural Formula (III), and General Formula (I):

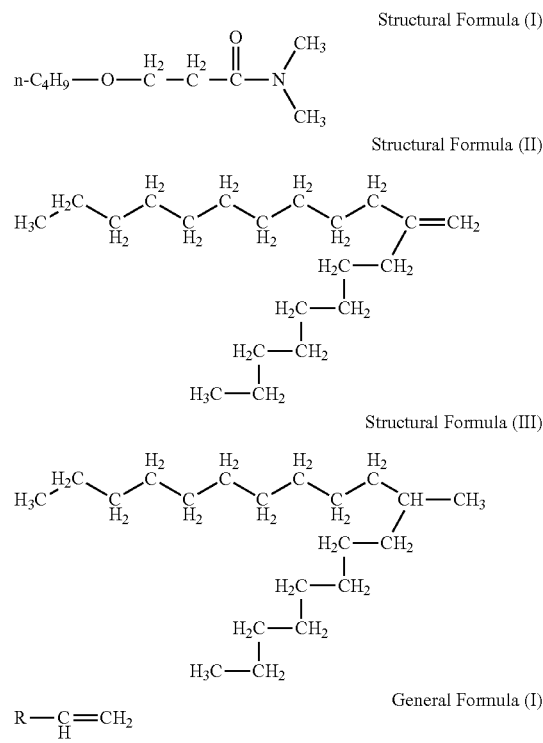

wherein R represents a C10-C18 alkyl group in General Formula (I).

15. The inkjet recording method of claim 14, wherein the recording medium comprises:
a support; and
a coating layer on at least one surface of the support; and
wherein an amount of purified water transferred to a surface of the recording medium, which surface has the coating layer, at a contact period of 100 ms measured by a dynamic scanning absorptometer is 2 mL/m² to 35 mL/m² and an amount of purified water transferred to the surface of the recording medium, which surface has the coating layer, at a contact period of 400 ms measured by the dynamic scanning absorptometer is 3 mL/m² to 40 mL/m².

* * * * *